(12) United States Patent
Pavlovic et al.

(10) Patent No.: US 11,398,696 B2
(45) Date of Patent: Jul. 26, 2022

(54) ELECTRICAL CONNECTOR ASSEMBLY WITH INTERNAL SPRING COMPONENT

(71) Applicant: Royal Precision Products LLC, Carol Stream, IL (US)

(72) Inventors: Slobodan Pavlovic, Novi, MI (US); Mohamad Zeidan, Bloomfield, MI (US); James Dawson, Carol Stream, IL (US); Brantley Natter, Brighton, MI (US)

(73) Assignee: Eaton Intelligent Power Limited, Dublin (IE)

( * ) Notice: Subject to any disclaimer, the term of this patent is extended or adjusted under 35 U.S.C. 154(b) by 42 days.

(21) Appl. No.: 17/113,798

(22) Filed: Dec. 7, 2020

(65) Prior Publication Data

US 2021/0167538 A1 Jun. 3, 2021

Related U.S. Application Data

(63) Continuation of application No. PCT/US2019/036010, filed on Jun. 7, 2019.
(Continued)

(51) Int. Cl.
*H01R 13/40* (2006.01)
*H01R 13/187* (2006.01)
(Continued)

(52) U.S. Cl.
CPC ......... *H01R 13/187* (2013.01); *H01R 13/03* (2013.01); *H01R 13/055* (2013.01);
(Continued)

(58) Field of Classification Search
CPC ...... H01R 13/03; H01R 13/057; H01R 13/10; H01R 13/15; H01R 13/50; H01R 13/187;
(Continued)

(56) References Cited

U.S. PATENT DOCUMENTS 4,534,610 A * 8/1985 Takihara ............... H01R 13/187
439/712
4,540,234 A * 9/1985 Konnemann .......... H01R 13/18
439/839

(Continued)

FOREIGN PATENT DOCUMENTS

CN 103141000 6/2013
CN 203193080 9/2013
(Continued)

OTHER PUBLICATIONS

International Search Report from PCT/US2018/019787 dated Nov. 26, 2018 (3 pages).
(Continued)

*Primary Examiner* — Abdullah A Riyami
*Assistant Examiner* — Vladimir Imas
(74) *Attorney, Agent, or Firm* — Barnes & Thornburg LLP

(57) ABSTRACT

An electrical connector assembly for electrically and mechanically connecting a component to a power source is disclosed. The connector assembly includes a male terminal with side walls defining a receiver. The side wall includes a contact arm that extends across an aperture in the side wall. The assembly also includes an internal spring member dimensioned to reside within the receiver of the male terminal. The spring member has at least one spring arm that extends from a base portion. The assembly further includes a female terminal with a receptacle dimensioned to receive both the male terminal and the spring member residing within the receiver of the male connector to define a connected position. In the connected position, the spring arm exerts an outwardly directed biasing force on the contact arm of the male terminal to outwardly displace it into
(Continued)

engagement with an inner surface of the receptacle to ensure connectivity.

31 Claims, 47 Drawing Sheets

Related U.S. Application Data

(60) Provisional application No. 62/681,973, filed on Jun. 7, 2018.

(51) Int. Cl.

| | |
|---|---|
| *H01R 13/24* | (2006.01) |
| *H01R 13/502* | (2006.01) |
| *H01R 13/629* | (2006.01) |
| *H01R 13/641* | (2006.01) |
| *H01R 13/03* | (2006.01) |
| *H01R 13/05* | (2006.01) |
| *H01R 13/10* | (2006.01) |
| *H01R 13/15* | (2006.01) |
| *B60R 16/03* | (2006.01) |
| *H01R 13/50* | (2006.01) |

(52) U.S. Cl.
 CPC .......... *H01R 13/057* (2013.01); *H01R 13/10* (2013.01); *H01R 13/15* (2013.01); *H01R 13/24* (2013.01); *H01R 13/502* (2013.01); *H01R 13/629* (2013.01); *H01R 13/641* (2013.01); *B60R 16/03* (2013.01); *H01R 13/50* (2013.01); *H01R 2201/26* (2013.01)

(58) Field of Classification Search
 CPC .... H01R 13/24; H01R 13/502; H01R 13/629; H01R 13/641; H01R 2201/26; B60R 16/03
 USPC ...................................................... 439/733.1
 See application file for complete search history.

(56) References Cited

U.S. PATENT DOCUMENTS

| | | | |
|---|---|---|---|
| 4,540,235 A | 9/1985 | Lolic | |
| 4,583,812 A | 4/1986 | Gross, Jr. | |
| 4,593,464 A * | 6/1986 | Williams | H01R 24/38 |
| | | | 228/136 |
| 4,632,483 A | 12/1986 | Verin | |
| 4,713,018 A | 12/1987 | Sutton | |
| 4,895,531 A | 1/1990 | Vignoli | |
| 4,902,244 A | 2/1990 | Endo | |
| 4,932,877 A | 6/1990 | Zinn | |
| 4,938,720 A | 7/1990 | Romak | |
| 4,975,066 A | 12/1990 | Sucheski | |
| 4,983,127 A | 1/1991 | Kawai | |
| 5,007,865 A | 4/1991 | Jakobeit | |
| 5,035,661 A | 7/1991 | Steinhardt | |
| 5,042,433 A | 8/1991 | Monnier | |
| 5,062,918 A | 11/1991 | Zodrow | |
| 5,094,636 A | 3/1992 | Zinn | |
| 5,102,752 A | 4/1992 | Hope | |
| 5,120,255 A | 6/1992 | Kouda | |
| 5,162,004 A | 11/1992 | Kuzuno | |
| 5,169,336 A | 12/1992 | Taguchi | |
| 5,188,545 A | 2/1993 | Hass | |
| 5,240,439 A | 8/1993 | Egenolf | |
| 5,273,766 A | 12/1993 | Long | |
| 5,288,252 A | 2/1994 | Steinhardt | |
| 5,295,873 A | 3/1994 | Walbrecht | |
| 5,334,058 A | 8/1994 | Hotea | |
| 5,338,229 A | 8/1994 | Egenolf | |
| 5,361,377 A | 11/1994 | Miller | |
| 5,362,262 A | 11/1994 | Hotea | |
| 5,415,571 A | 5/1995 | Lutsch | |
| 5,419,723 A | 5/1995 | Villiers | |
| 5,437,566 A | 8/1995 | Zinn | |
| 5,486,123 A | 1/1996 | Miyazaki | |
| 5,516,299 A * | 5/1996 | Fukuda | H01R 13/7032 |
| | | | 200/51.1 |
| 5,536,184 A | 7/1996 | Wright | |
| 5,551,897 A * | 9/1996 | Alwine | H01R 13/113 |
| | | | 439/852 |
| 5,562,506 A * | 10/1996 | Wright | H01R 24/50 |
| | | | 439/825 |
| 5,573,434 A | 11/1996 | Ittah | |
| 5,607,328 A | 3/1997 | Joly | |
| 5,624,283 A | 4/1997 | Hotea | |
| 5,664,972 A | 9/1997 | Zinn | |
| 5,716,245 A | 2/1998 | Kameyama | |
| 5,810,627 A | 9/1998 | Gierut | |
| 5,827,094 A | 10/1998 | Aizawa | |
| 5,863,225 A | 1/1999 | Liebich | |
| 5,868,590 A | 2/1999 | Dobbelaere | |
| 5,938,485 A | 8/1999 | Hotea | |
| 5,941,740 A | 8/1999 | Neuer | |
| 5,951,338 A | 9/1999 | Seko | |
| 5,954,548 A | 9/1999 | Stabroth | |
| 5,975,964 A * | 11/1999 | Seko | H01R 13/18 |
| | | | 439/857 |
| 5,980,336 A | 11/1999 | Hall | |
| 6,042,433 A | 3/2000 | Chen | |
| 6,062,918 A | 5/2000 | Myer | |
| 6,102,752 A | 8/2000 | Bommel | |
| 6,126,495 A | 10/2000 | Lolic | |
| 6,186,840 B1 | 2/2001 | Geltsch | |
| 6,257,931 B1 | 7/2001 | Sakurai | |
| 6,261,116 B1 | 7/2001 | Ceru | |
| 6,273,766 B1 | 8/2001 | Zennamo, Jr. | |
| 6,361,377 B1 | 3/2002 | Saka | |
| 6,371,813 B2 | 4/2002 | Ramey | |
| 6,394,858 B1 | 5/2002 | Geltsch | |
| 6,402,571 B1 | 6/2002 | Muller | |
| 6,475,040 B1 | 11/2002 | Myer | |
| 6,514,098 B2 | 2/2003 | Marpoe, Jr. | |
| 6,561,841 B2 | 5/2003 | Norwood | |
| 6,565,396 B2 | 5/2003 | Saka | |
| 6,679,736 B2 | 1/2004 | Saka | |
| 6,695,644 B2 | 2/2004 | Zhao | |
| 6,722,926 B2 | 4/2004 | Chevassus-More | |
| 6,761,577 B1 | 7/2004 | Koehler | |
| 6,814,625 B2 | 11/2004 | Richmond | |
| 6,824,170 B2 | 11/2004 | Lee | |
| 6,872,103 B1 | 3/2005 | Flieger | |
| 6,921,283 B2 | 7/2005 | Zahlit | |
| 6,994,600 B2 | 2/2006 | Coulon | |
| 7,014,515 B2 | 3/2006 | Lutsch | |
| 7,150,660 B2 | 12/2006 | Allgood | |
| 7,175,488 B2 | 2/2007 | Pavlovic | |
| 7,192,318 B2 | 3/2007 | Hotea | |
| 7,278,891 B2 | 10/2007 | Cvasa | |
| 7,300,319 B2 | 11/2007 | Lutsch | |
| 7,329,132 B1 | 2/2008 | Kamath | |
| 7,338,305 B2 | 3/2008 | Norwood | |
| 7,491,100 B2 | 2/2009 | Johannes | |
| 7,494,352 B2 | 2/2009 | Furio | |
| 7,497,723 B2 | 3/2009 | Brassell | |
| 7,503,776 B1 | 3/2009 | Pavlovic | |
| 7,520,773 B2 | 4/2009 | Siebens | |
| 7,568,921 B2 | 8/2009 | Pavlovic | |
| 7,595,715 B2 | 9/2009 | Pavlovic | |
| 7,613,003 B2 | 11/2009 | Pavlovic | |
| 7,647,954 B2 | 1/2010 | Garber | |
| 7,651,344 B2 * | 1/2010 | Wu | H01R 13/6585 |
| | | | 439/910 |
| 7,682,180 B2 | 3/2010 | Brown | |
| 7,713,096 B2 | 5/2010 | Pavlovic | |
| 7,758,369 B2 | 7/2010 | Miller | |
| 7,766,706 B2 | 8/2010 | Kawamura | |
| 7,780,489 B2 | 8/2010 | Stuklek | |
| 7,837,519 B2 | 11/2010 | Copper | |
| 7,876,193 B2 | 1/2011 | Pavlovic | |
| 7,892,050 B2 * | 2/2011 | Pavlovic | H01R 13/112 |
| | | | 439/857 |

(56) References Cited

U.S. PATENT DOCUMENTS

| | | | |
|---|---|---|---|
| 7,927,127 B1 | 4/2011 | Glick | |
| 7,942,682 B2 | 5/2011 | Copper | |
| 7,942,683 B2 | 5/2011 | Copper | |
| 7,963,782 B2 | 6/2011 | Hughes | |
| 7,976,351 B2 | 7/2011 | Boemmel | |
| 7,988,505 B2 | 8/2011 | Hotea | |
| 8,111,052 B2 | 2/2012 | Glovinsky | |
| 8,128,426 B2 | 3/2012 | Glick | |
| 8,167,337 B2 | 5/2012 | Bruno | |
| 8,202,124 B1 | 6/2012 | Natter | |
| 8,206,175 B2 | 6/2012 | Boyd | |
| 8,235,292 B2 | 8/2012 | Talboys | |
| 8,242,874 B2 | 8/2012 | Pavlovic | |
| 8,277,243 B1 | 10/2012 | Hernandez | |
| 8,282,429 B2 | 10/2012 | Glick | |
| 8,366,497 B2* | 2/2013 | Glick | H01R 13/18 439/839 |
| 8,388,389 B2 | 3/2013 | Costello | |
| 8,430,689 B2 | 4/2013 | Myer | |
| 8,446,733 B2 | 5/2013 | Hampo | |
| 8,449,338 B2 | 5/2013 | Gong | |
| 8,475,220 B2* | 7/2013 | Glick | H01R 13/18 439/839 |
| 8,651,892 B2 | 2/2014 | Arant | |
| 8,662,935 B2 | 3/2014 | Jouas | |
| 8,668,506 B2 | 3/2014 | Stack | |
| 8,678,867 B2* | 3/2014 | Glick | H01R 13/187 439/843 |
| 8,758,043 B2 | 6/2014 | Ohyama | |
| 8,795,007 B2 | 8/2014 | Itou | |
| 8,840,436 B2 | 9/2014 | Mott | |
| 8,858,264 B2 | 10/2014 | Mott | |
| 8,858,274 B2 | 10/2014 | Jakoplic | |
| 8,882,543 B2* | 11/2014 | Pabst | H01R 13/6584 439/607.41 |
| 8,941,731 B2 | 1/2015 | Barba | |
| 8,944,844 B2 | 2/2015 | Myer | |
| 8,956,190 B2 | 2/2015 | Natter | |
| 8,968,021 B1 | 3/2015 | Kennedy | |
| 8,992,270 B2* | 3/2015 | Glick | H01R 13/187 439/843 |
| 8,998,655 B2* | 4/2015 | Glick | H01R 13/187 439/839 |
| 9,011,186 B2 | 4/2015 | Wirth | |
| 9,048,552 B2 | 6/2015 | Eyles | |
| 9,059,542 B2 | 6/2015 | Oh | |
| 9,077,114 B2 | 7/2015 | Oh | |
| 9,142,902 B2 | 9/2015 | Glick | |
| 9,166,322 B2 | 10/2015 | Glick | |
| 9,190,756 B2 | 11/2015 | Glick | |
| 9,225,116 B2 | 12/2015 | Mckibben | |
| 9,236,682 B2 | 1/2016 | Glick | |
| 9,257,804 B1* | 2/2016 | Beck | H01R 13/113 |
| 9,293,852 B2* | 3/2016 | Glick | H01R 13/18 |
| 9,300,069 B2* | 3/2016 | Morello | H01R 13/18 |
| 9,353,894 B2 | 5/2016 | Richards | |
| 9,356,394 B2 | 5/2016 | Kennedy | |
| 9,368,904 B2 | 6/2016 | Natter | |
| 9,379,470 B2* | 6/2016 | Glick | H01R 13/18 |
| 9,431,740 B2* | 8/2016 | Glick | H01R 13/18 |
| 9,437,974 B2* | 9/2016 | Glick | H01R 13/18 |
| 9,444,168 B2 | 9/2016 | Horiuchi | |
| 9,444,205 B2* | 9/2016 | Rangi | H01R 13/44 |
| 9,455,516 B2 | 9/2016 | Gutenschwager | |
| 9,502,783 B2 | 11/2016 | Bleicher | |
| 9,525,254 B2 | 12/2016 | Chen | |
| 9,537,241 B2 | 1/2017 | Rivera | |
| 9,548,553 B2* | 1/2017 | Glick | H01R 13/18 |
| 9,583,860 B1 | 2/2017 | Dewitte | |
| 9,608,369 B1 | 3/2017 | Brandt | |
| 9,620,869 B2 | 4/2017 | Listing | |
| 9,680,256 B1 | 6/2017 | Lane | |
| 9,705,229 B2 | 7/2017 | Itou | |
| 9,705,254 B2 | 7/2017 | Lampert | |
| 9,711,885 B2 | 7/2017 | Hamai | |
| 9,748,693 B1 | 8/2017 | Exenberger | |
| 9,841,454 B2 | 12/2017 | Gelonese | |
| 9,847,591 B2 | 12/2017 | Glick | |
| 9,876,317 B2 | 1/2018 | Glick | |
| 9,905,950 B2 | 2/2018 | Marsh | |
| 9,905,953 B1* | 2/2018 | Pavlovic | H01R 13/187 |
| 10,014,614 B2 | 7/2018 | Davies | |
| 10,014,631 B1 | 7/2018 | Chambly | |
| 10,038,278 B2 | 7/2018 | Lane | |
| 10,044,140 B1 | 8/2018 | Gianrossi | |
| 10,122,117 B2 | 11/2018 | Miller | |
| 10,135,168 B2 | 11/2018 | Pavlovic | |
| 10,184,970 B2 | 1/2019 | Maalouf | |
| 10,193,247 B1* | 1/2019 | Glick | H01R 4/48 |
| 10,218,117 B1 | 2/2019 | Probert | |
| 10,283,889 B2* | 5/2019 | Glick | H01R 13/113 |
| 10,340,618 B1* | 7/2019 | Probert | H01R 13/10 |
| 10,355,414 B1 | 7/2019 | Alvarado | |
| 10,511,130 B2* | 12/2019 | Huang | H01R 13/631 |
| 10,693,252 B2 | 6/2020 | Pavlovic | |
| 11,069,999 B2 | 7/2021 | Fisher | |
| 2001/0019924 A1 | 9/2001 | Heimueller | |
| 2001/0021602 A1 | 9/2001 | Zanten | |
| 2002/0019156 A1 | 2/2002 | Fukamachi | |
| 2002/0049005 A1 | 4/2002 | Leve | |
| 2002/0081888 A1 | 6/2002 | Regnier | |
| 2002/0146931 A1* | 10/2002 | Richmond | H01R 13/6453 439/488 |
| 2004/0150224 A1 | 8/2004 | Lee | |
| 2005/0134037 A1 | 6/2005 | Bruno | |
| 2005/0211934 A1 | 9/2005 | Garber | |
| 2006/0040555 A1 | 2/2006 | Chen | |
| 2006/0172618 A1 | 8/2006 | Yamashita | |
| 2007/0123093 A1 | 5/2007 | Lutsch | |
| 2007/0149050 A1 | 6/2007 | Oka | |
| 2009/0197457 A1 | 8/2009 | Lanni | |
| 2011/0130023 A1 | 6/2011 | Kataoka | |
| 2011/0168778 A1 | 7/2011 | Talboys | |
| 2012/0094551 A1 | 4/2012 | Corman | |
| 2012/0129407 A1 | 5/2012 | Glick | |
| 2012/0244756 A1 | 9/2012 | Jouas | |
| 2013/0002102 A1 | 1/2013 | Chen | |
| 2013/0004050 A1 | 1/2013 | Wu | |
| 2013/0040505 A1 | 2/2013 | Hirakawa | |
| 2013/0078874 A1 | 3/2013 | Itou | |
| 2013/0109224 A1 | 5/2013 | Chin | |
| 2013/0210292 A1 | 8/2013 | Schmidt | |
| 2013/0215573 A1 | 8/2013 | Wagner | |
| 2013/0337702 A1 | 12/2013 | Pavlovic | |
| 2014/0087601 A1 | 3/2014 | Glick | |
| 2014/0227915 A1 | 8/2014 | Glick | |
| 2015/0038000 A1 | 2/2015 | Glick | |
| 2015/0072207 A1 | 3/2015 | Soleski | |
| 2015/0074996 A1 | 3/2015 | Glick | |
| 2015/0079859 A1 | 3/2015 | Glick | |
| 2015/0162706 A1 | 6/2015 | Kennedy | |
| 2015/0255912 A1* | 9/2015 | Natter | H01R 13/5221 439/589 |
| 2015/0255924 A1 | 9/2015 | Glick | |
| 2015/0280381 A1 | 10/2015 | Rangi | |
| 2016/0028169 A1 | 1/2016 | Glick | |
| 2016/0043505 A1 | 2/2016 | Wu | |
| 2016/0336572 A1 | 11/2016 | Yoshida | |
| 2017/0338600 A1 | 11/2017 | Tanaka | |
| 2018/0090900 A1 | 3/2018 | Horiuchi | |
| 2018/0191095 A1 | 7/2018 | Pavlovic | |
| 2018/0351282 A1 | 12/2018 | Duan | |
| 2019/0052025 A1 | 2/2019 | Buechli | |
| 2019/0089083 A1 | 3/2019 | Pavlovic | |
| 2019/0372262 A1 | 12/2019 | Christiano | |
| 2021/0119365 A1* | 4/2021 | Pavlovic | H01R 13/03 |
| 2021/0344132 A1* | 11/2021 | Pavlovic | H01R 13/6581 |

FOREIGN PATENT DOCUMENTS

| | | |
|---|---|---|
| CN | 104614564 | 5/2015 |
| CN | 105225040 | 1/2016 |
| CN | 206962160 | 2/2018 |

(56) References Cited

FOREIGN PATENT DOCUMENTS

| CN | 107863610 | 3/2018 |
|---|---|---|
| DE | 19817924 | 10/1999 |
| DE | 102013211208 | 12/2014 |
| EP | 1291979 | 12/2004 |
| JP | H1040995 | 2/1998 |
| JP | H1050376 | 2/1998 |
| JP | H1050377 | 2/1998 |
| JP | 2011049107 | 3/2011 |
| JP | 2012043739 | 3/2012 |
| JP | 2017010755 | 1/2017 |
| KR | 20160138442 | 12/2016 |
| WO | 2017195092 | 11/2017 |
| WO | 2019229587 | 12/2019 |

OTHER PUBLICATIONS

Written Opinion from PCT/US2018/019787 dated Nov. 26, 2018 (10 pages).

International Search Report and Written Opinion issued in PCT/US2019/036070, dated Sep. 27, 2019, 8 pages.

International Search Report and Written Opinion issued in PCT/US2019/036010, dated Sep. 30, 2019, 13 pages.

International Search Report and written Opinion issued in PCT/US2019/036127, dated Oct. 4, 2019, 11 pages.

International Search Report and written Opinion issued in PCT/US2020/049870, dated Dec. 10, 2020, 20 pages.

International Search Report and written Opinion issued in PCT/US20/013757, dated Dec. 10, 2020, 7 pages.

International Search Report and Written Opinion issued in PCT/US20/50016, dated Nov. 30, 2020, 14 pages.

International Search Report and Written Opinion issued in PCT/US20/50018, dated Nov. 30, 2020, 14 pages.

International Search Report and Written Opinion issued in PCT/US20/14484, dated Mar. 31, 2020, 7 pages.

International Search Report and Written Opinion issued in PCT/US21/33446, dated Aug. 24, 2021, 17 pages.

* cited by examiner

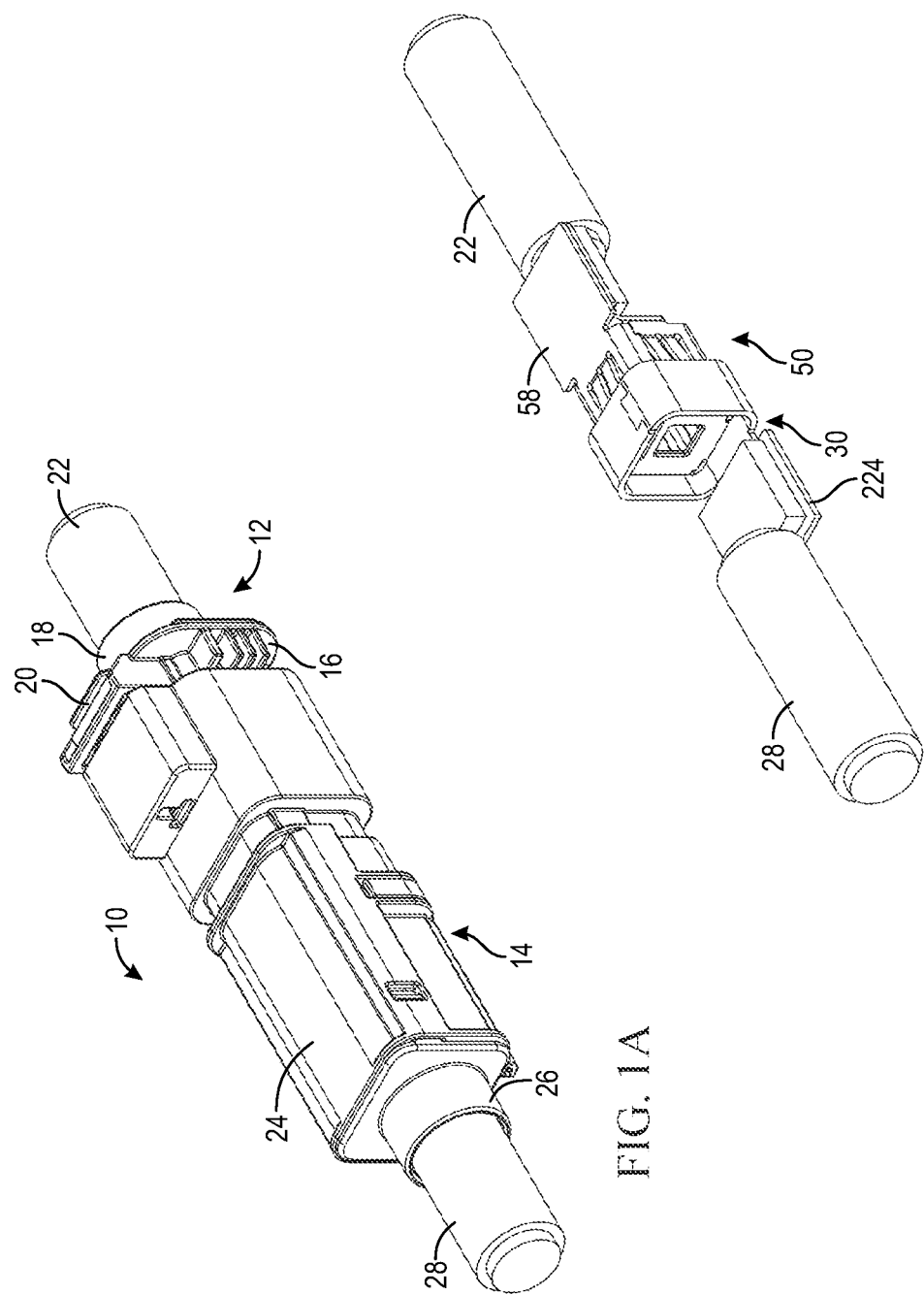

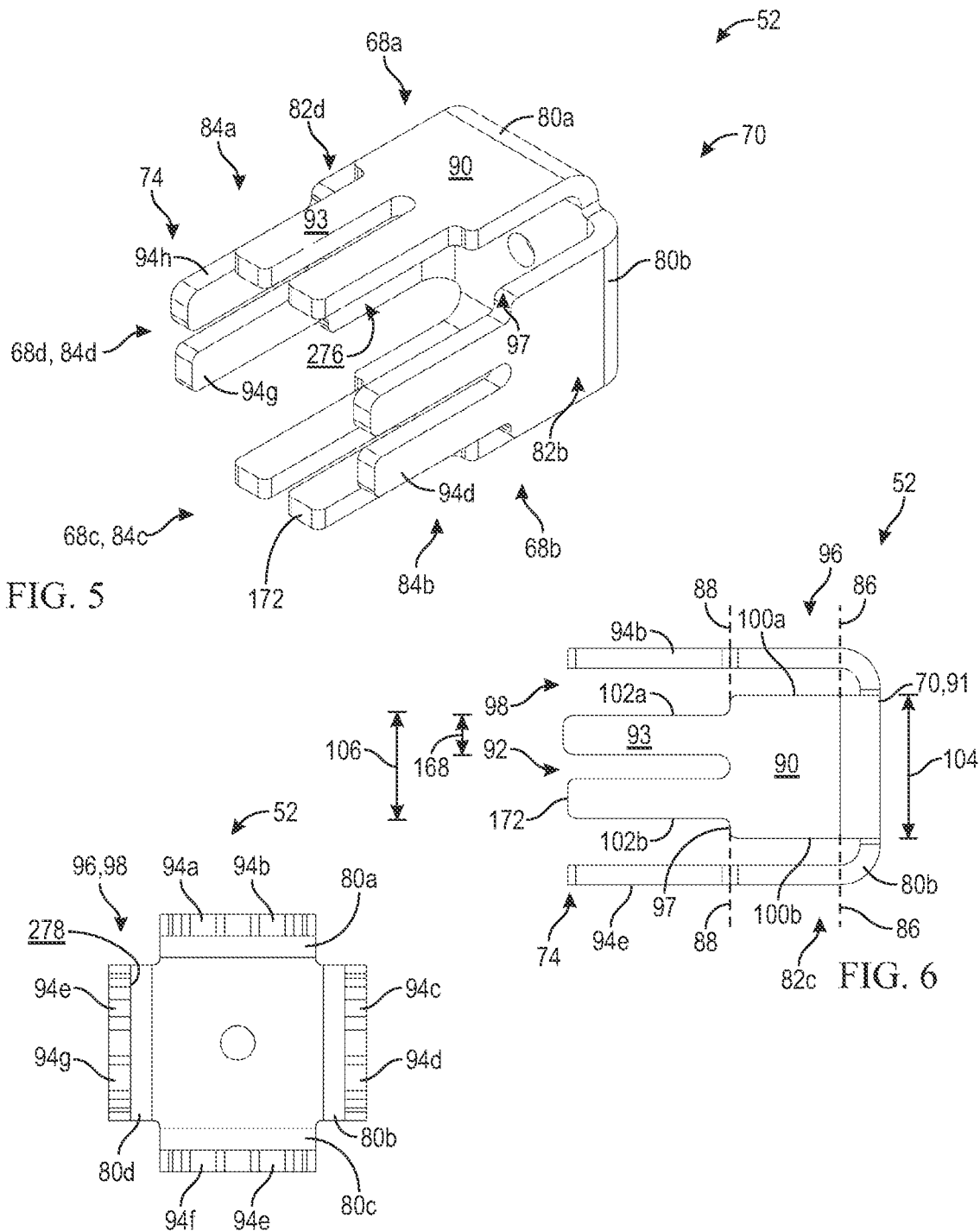

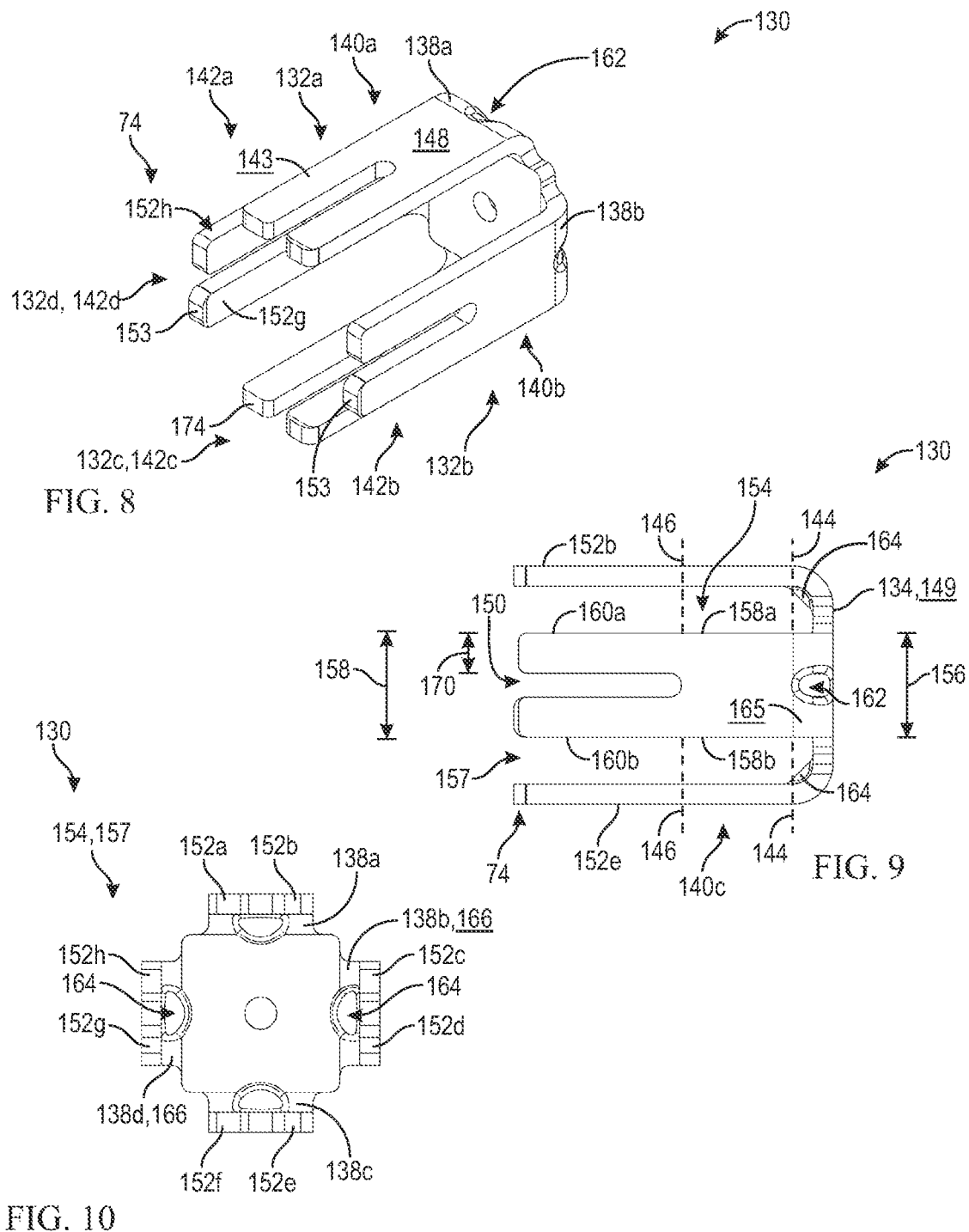

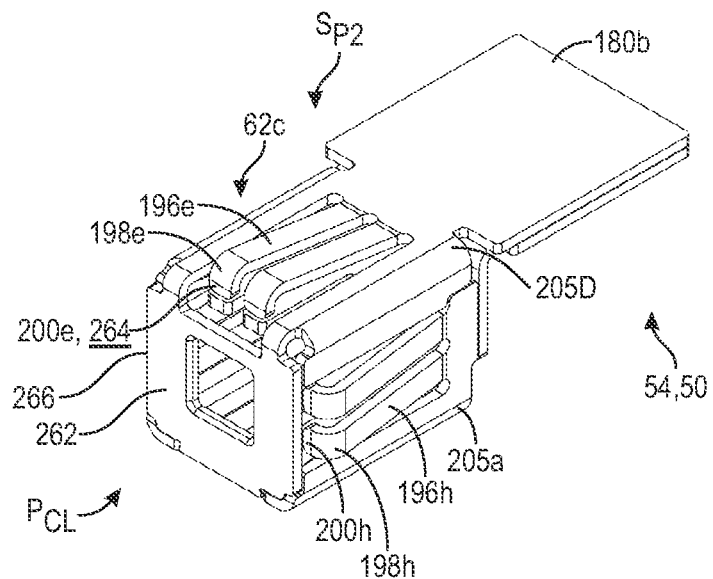
FIG. 15
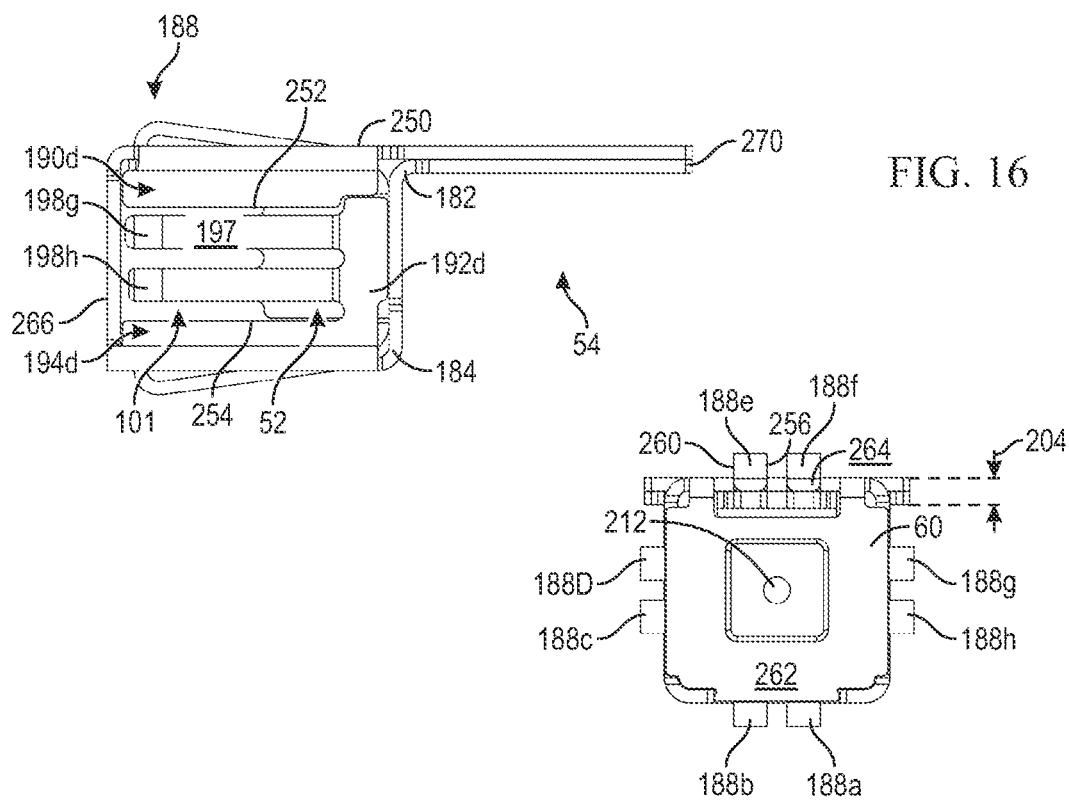
FIG. 16
FIG. 17

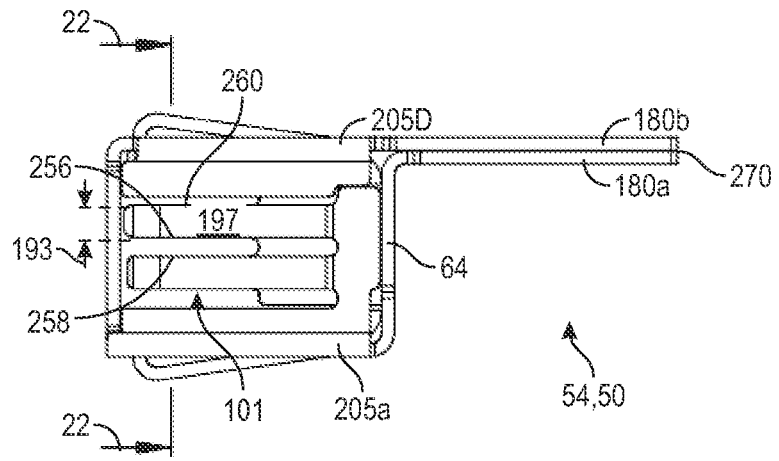
FIG. 21
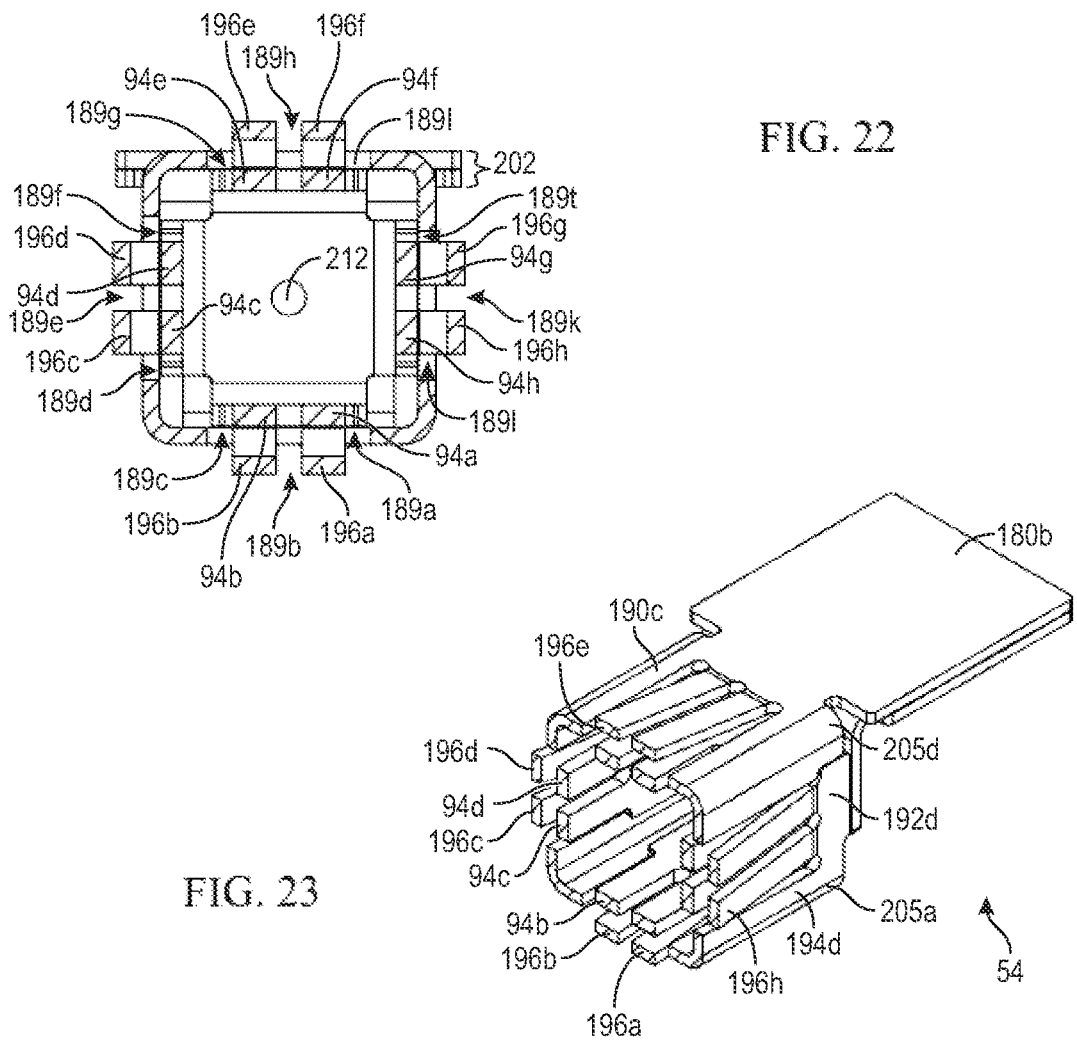
FIG. 22
FIG. 23

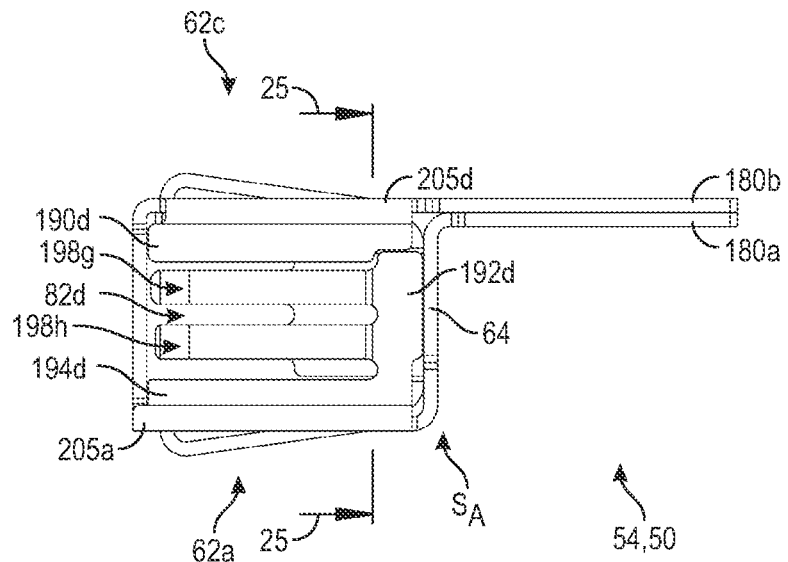
FIG. 24
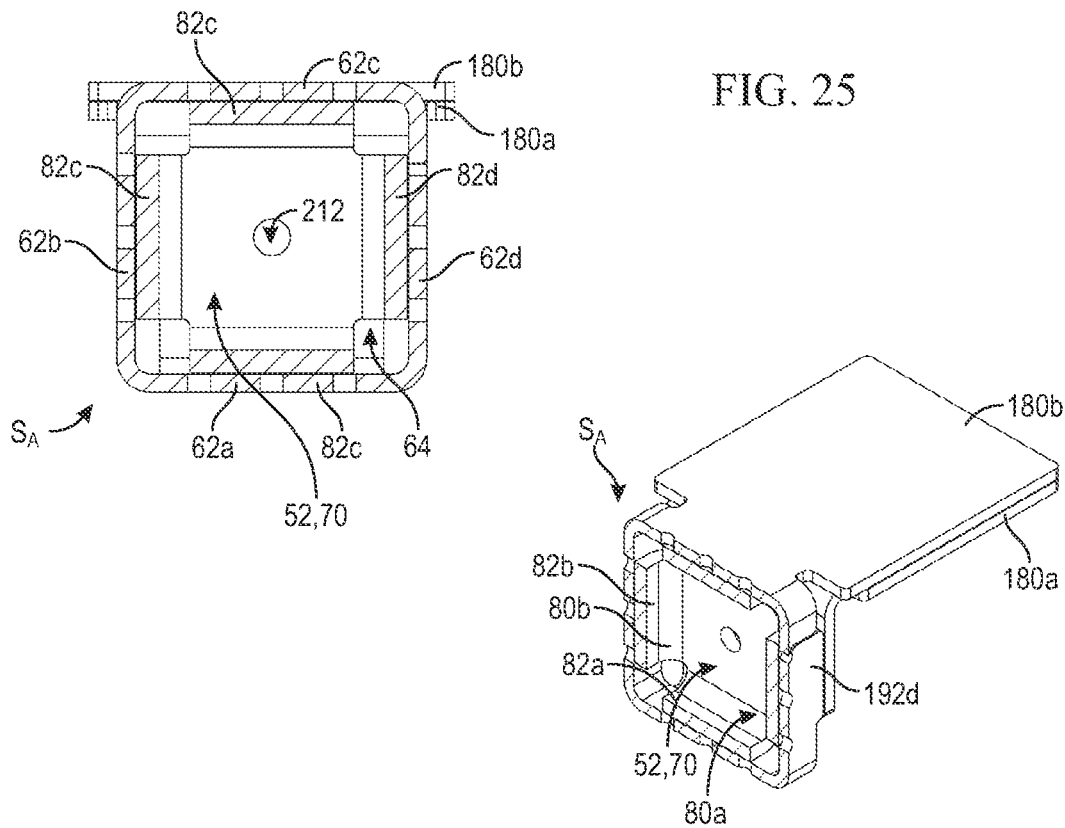
FIG. 25
FIG. 26

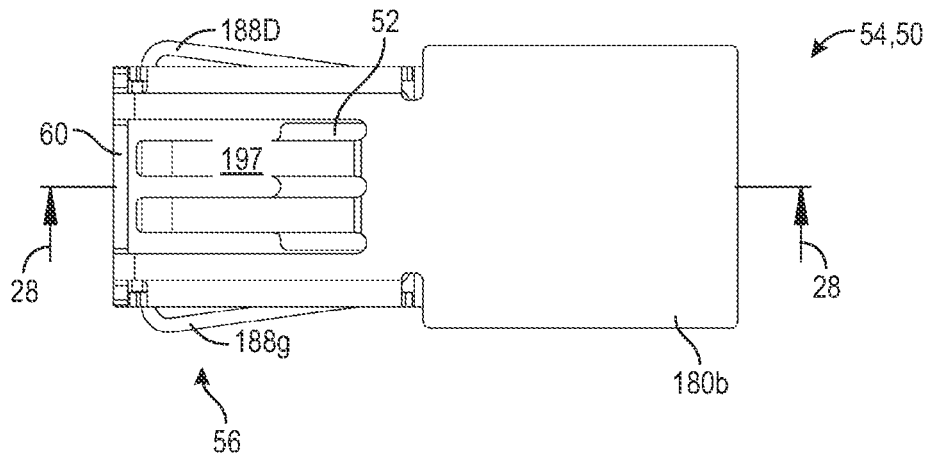
FIG. 27
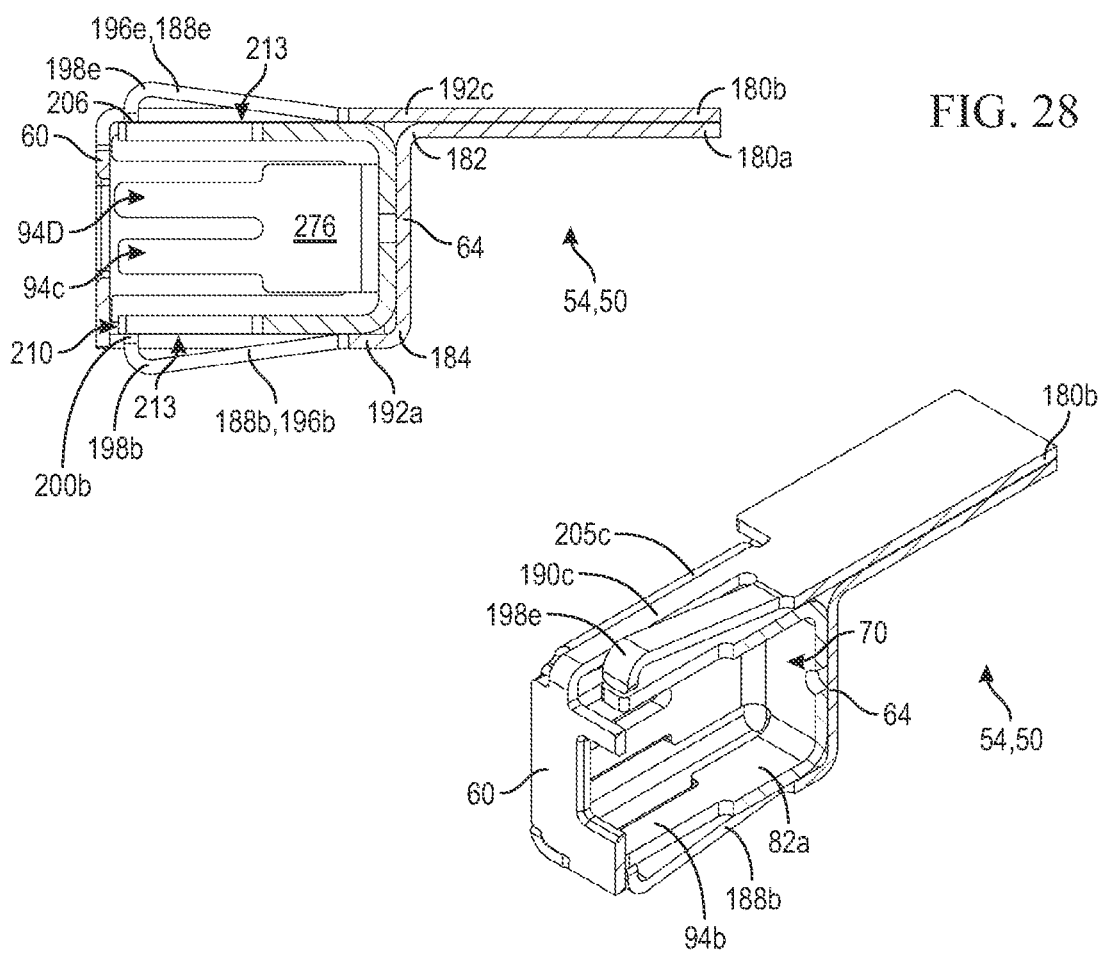
FIG. 28
FIG. 29

FIG. 45
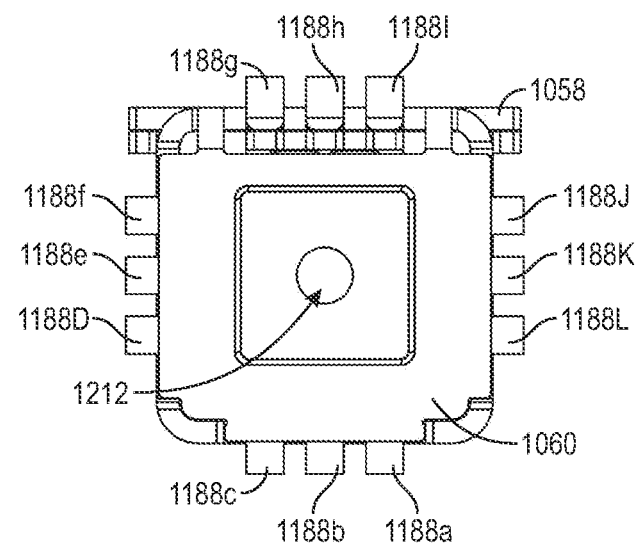
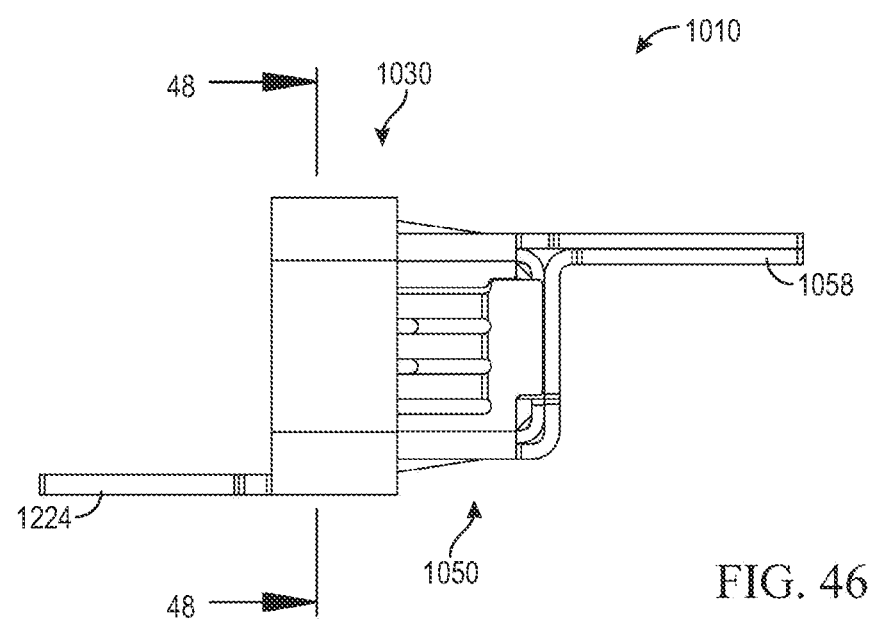
FIG. 46

FIG. 47
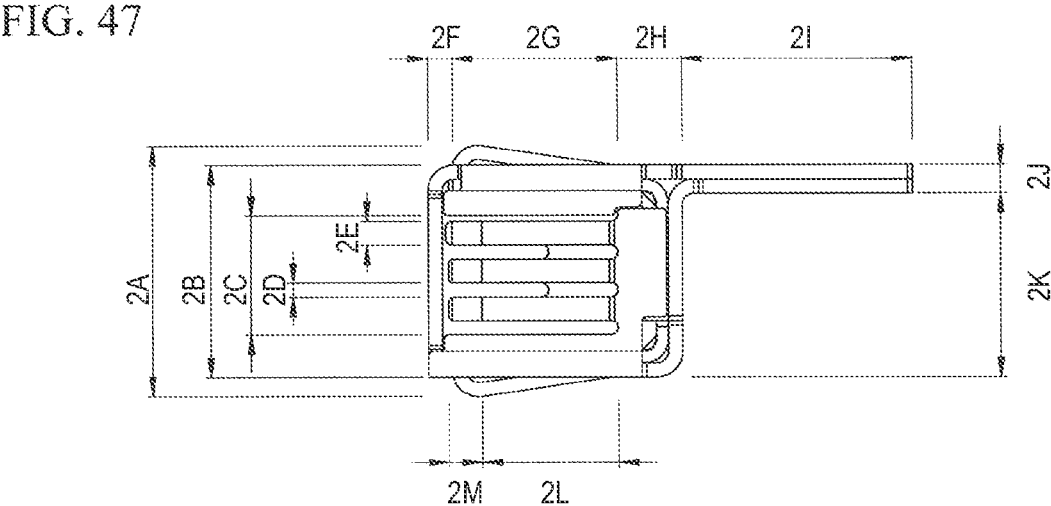
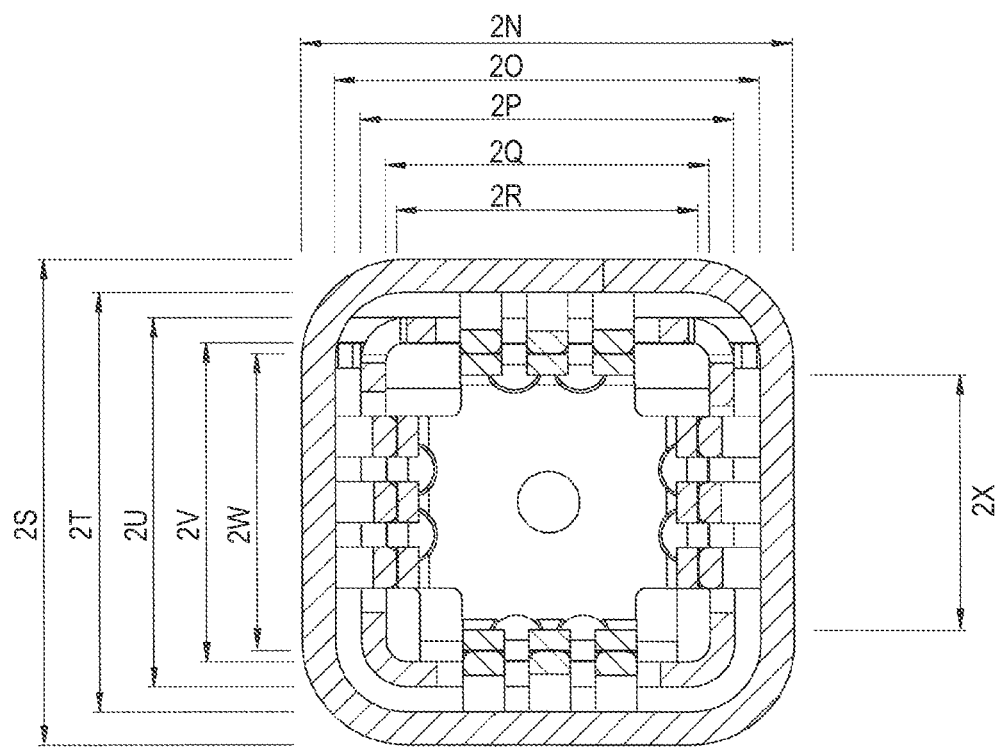
FIG. 48

FIG. 55
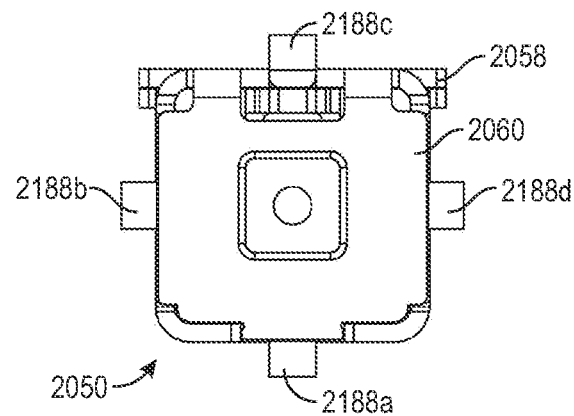
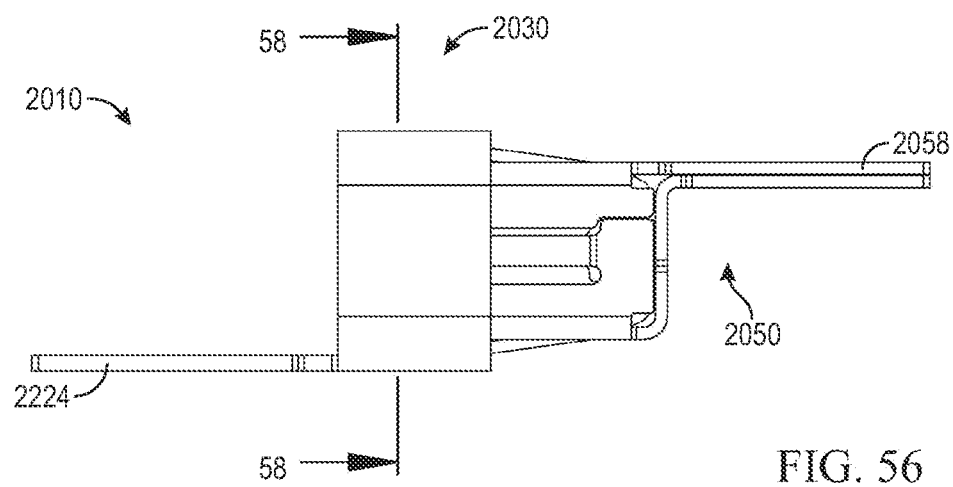
FIG. 56

FIG. 57
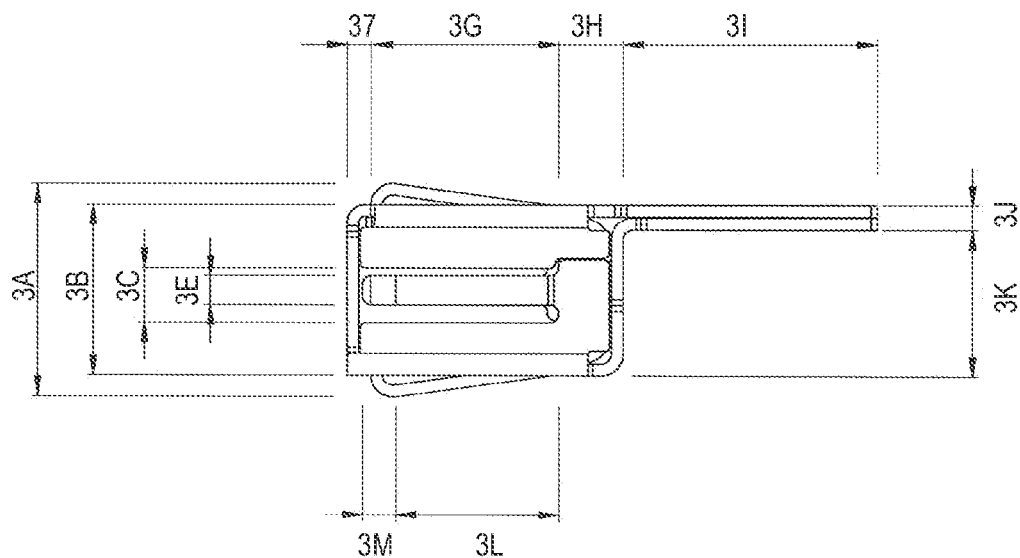
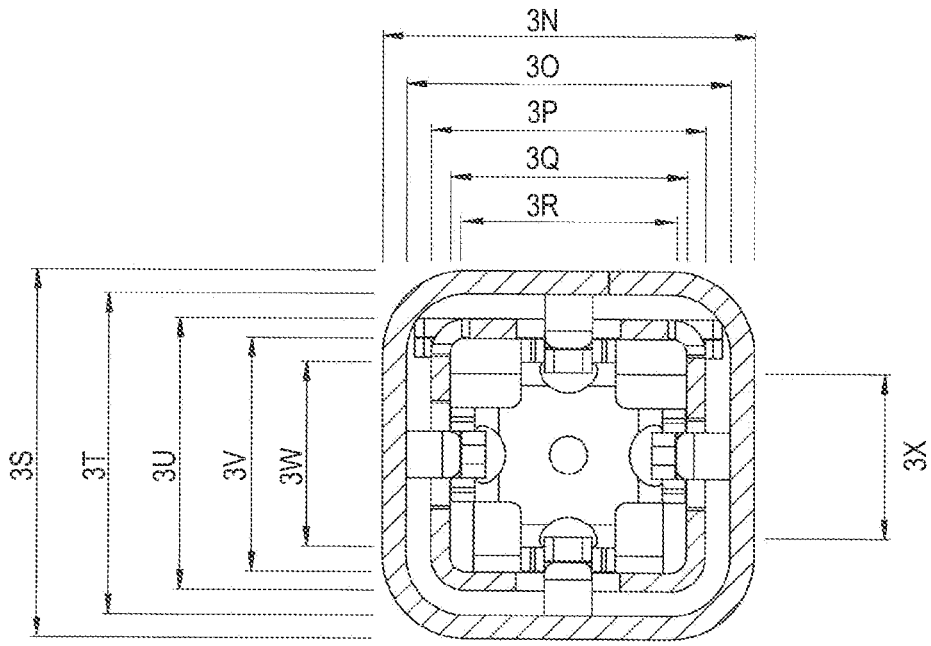
FIG. 58

FIG. 63
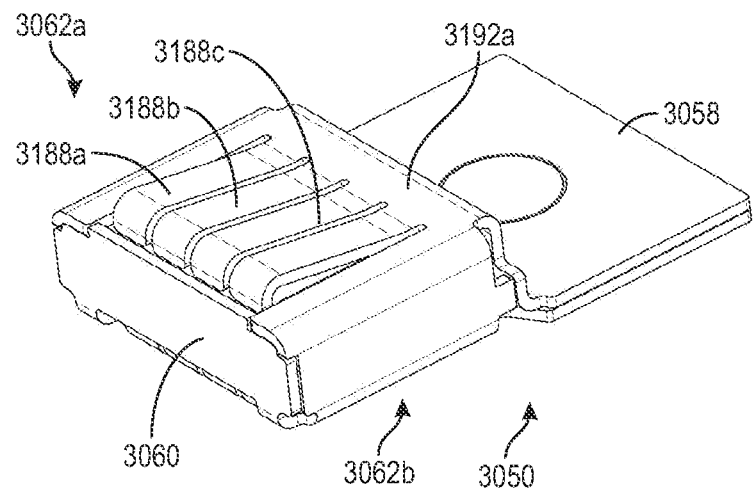
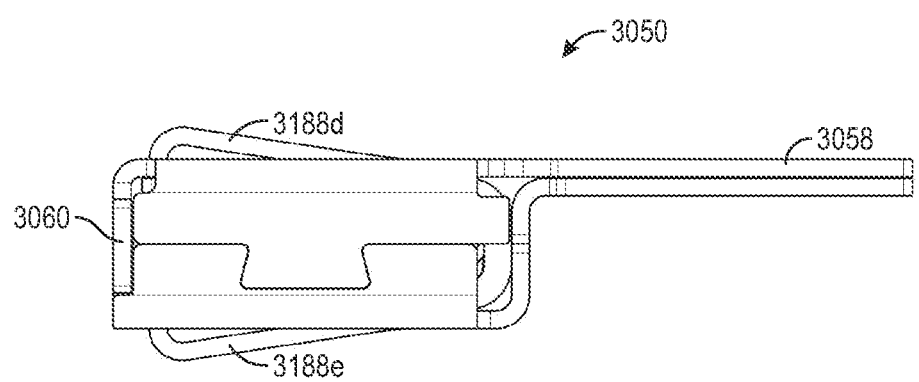
FIG. 64

FIG. 75
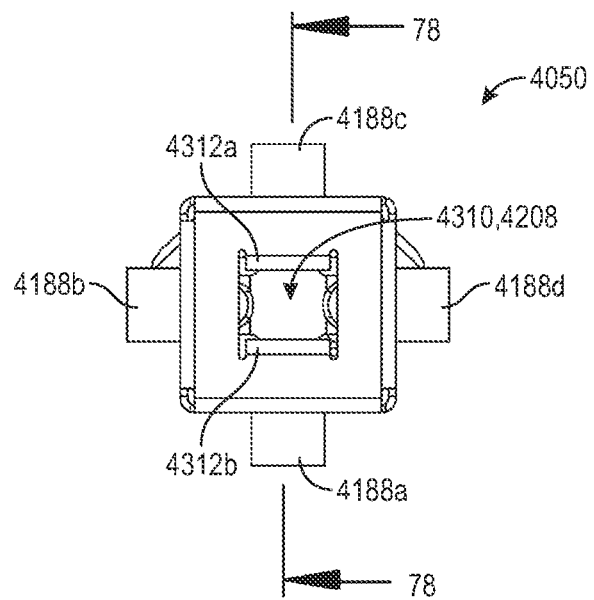
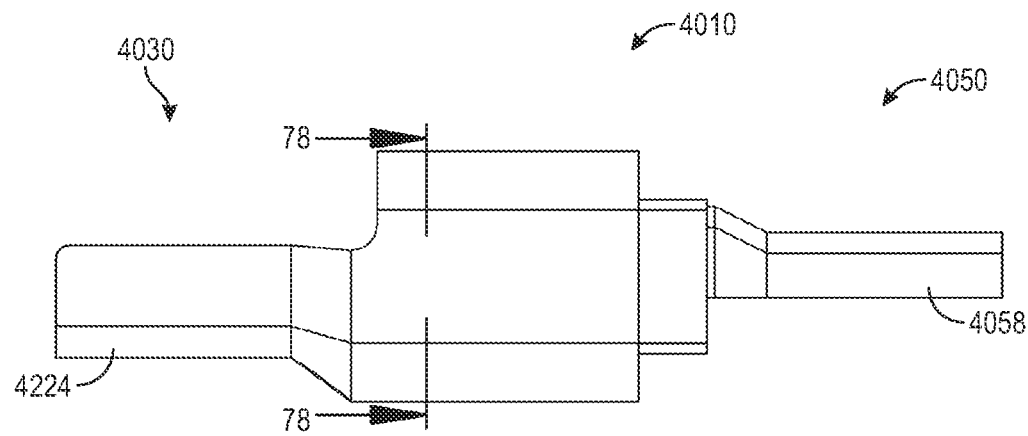
FIG 76

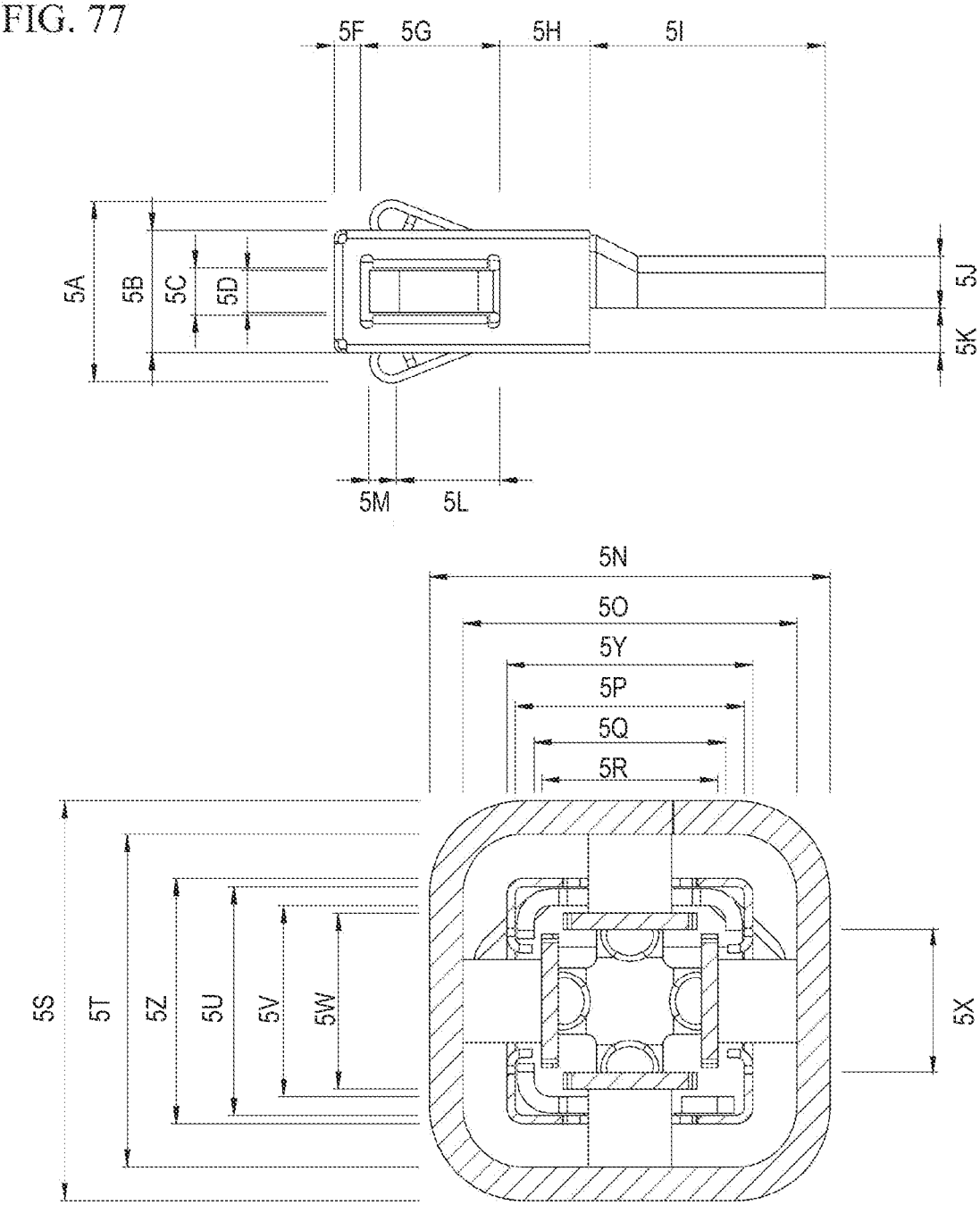

FIG. 91
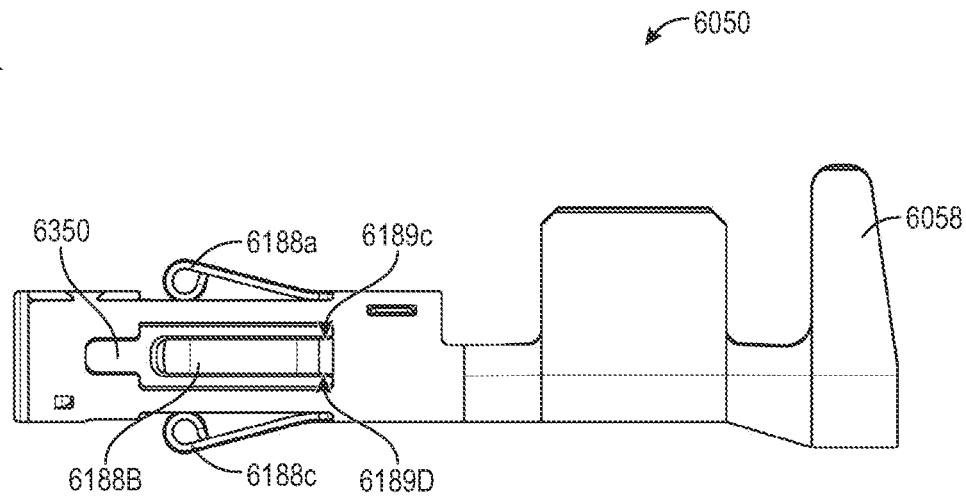
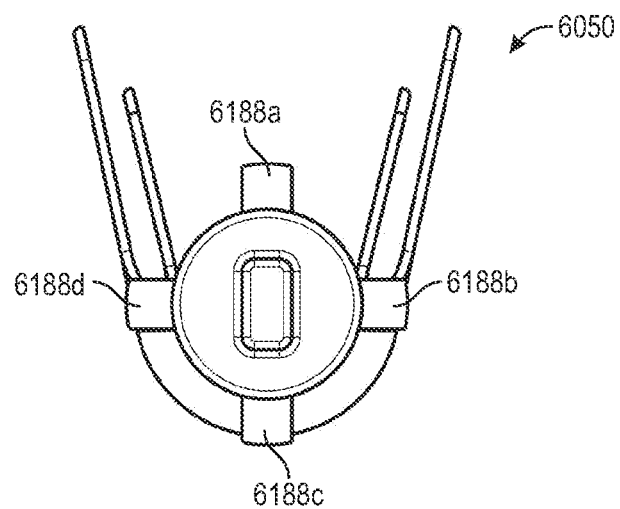
FIG. 92

FIG. 93
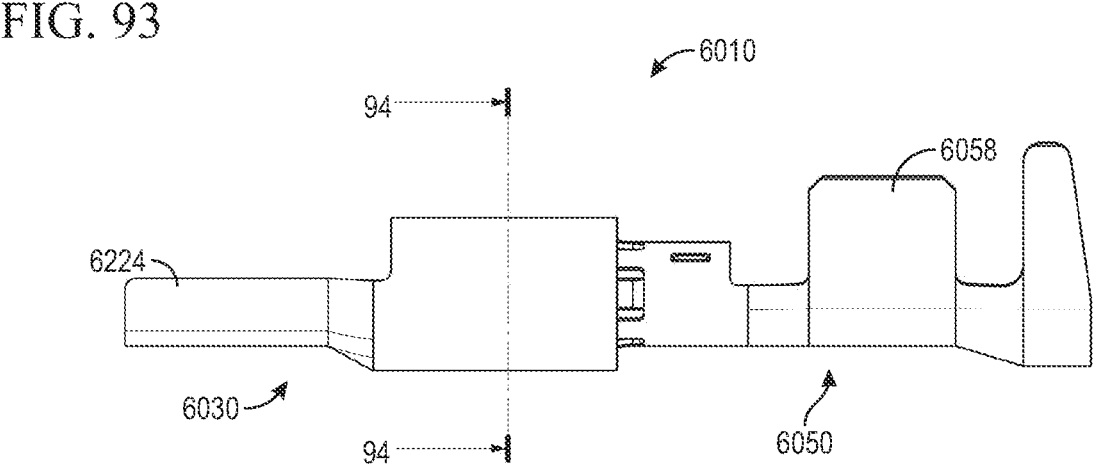
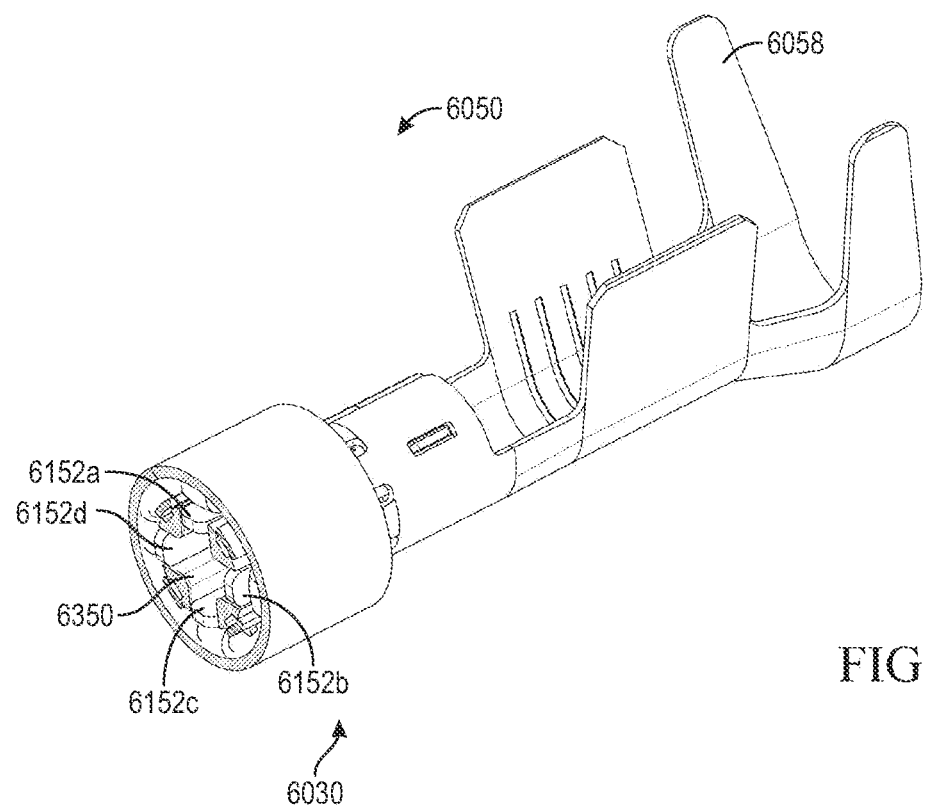
FIG. 94

FIG. 95
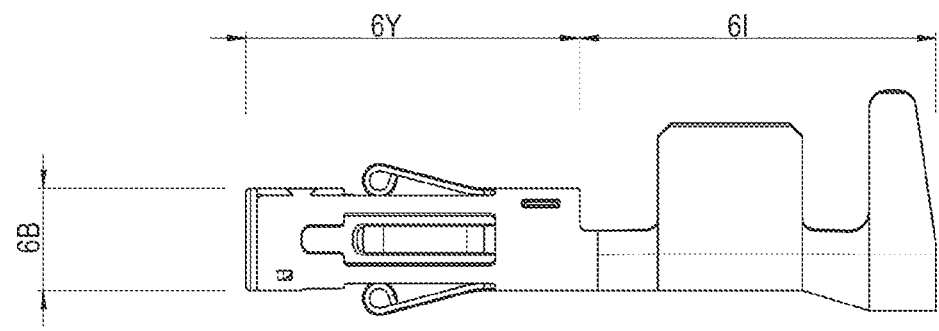
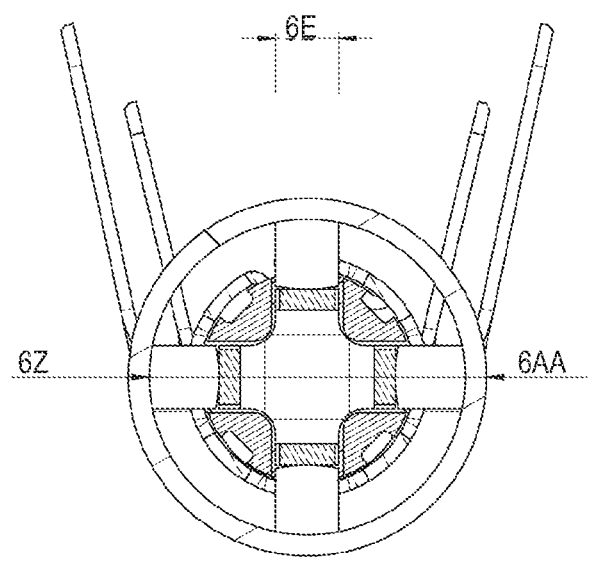
FIG. 96

ELECTRICAL CONNECTOR ASSEMBLY WITH INTERNAL SPRING COMPONENT

CROSS-REFERENCE TO RELATED APPLICATIONS

This application is a Continuation of International Patent Application No. PCT/US2019/036010, filed Jun. 7, 2019, which claims the benefit of U.S. Provisional Patent Application No. 62/681,973, filed on Jun. 7, 2018. The disclosures set forth in the referenced applications are incorporated herein by reference in their entireties.

FIELD OF DISCLOSURE

The present disclosure relates to electrical connectors, and, in particular, to an electrical connector system having a spring actuated electrical connector assembly. Specifically, the present disclosure relates to an electrical connector assembly for use in motor vehicles, including passenger and commercial vehicles, in high-power, high-current and/or high-voltage applications where connector assemblies are essential to provide mechanical and electrical connectivity while meeting strict industry standards and production requirements.

BACKGROUND

Over the past several decades, the number of electrical components used in automobiles, and other on-road and off-road vehicles such as pick-up trucks, commercial trucks, semi-trucks, motorcycles, all-terrain vehicles, and sports utility vehicles (collectively "motor vehicles") has increased dramatically. Electrical components are used in motor vehicles for a variety of reasons, including but not limited to, monitoring, improving and/or controlling vehicle performance, emissions, safety and creature comforts to the occupants of the motor vehicles. These electrical components are mechanically and electrically connected within the motor vehicle by conventional connector assemblies, which consist of an eyelet and a threaded fastener. Considerable time, resources, and energy have been expended to develop connector assemblies that meet the varied needs and complexities of the motor vehicles market, however, conventional connector assemblies suffer from a variety of shortcomings.

Motor vehicles are challenging electrical environments for both the electrical components and the connector assemblies due to a number of conditions, including but not limited to, space constraints that make initial installation difficult, harsh weather conditions, vibration, heat loads, and longevity, all of which can lead to component and/or connector failure. For example, incorrectly installed connectors, which typically occur in the assembly plant, and dislodged connectors, which typically occur in the field, are two significant failure modes for the electrical components and motor vehicles. Each of these failure modes lead to significant repair and warranty costs. For example, the combined annual accrual for warranty by all of the automotive manufacturers and their direct suppliers is estimated at between $50 billion and $150 billion, worldwide.

A more appropriate, a robust connector system must be impervious to harsh operating conditions, prolonged vibration and excessive heat, especially heat loads that accumulate "under the hood" of the vehicle. In order to create a robust solution, many companies have designed variations of spring-loaded connectors, which have a feature that retains the connector in place. Such spring-actuated connectors typically have some indication to show that they are fully inserted. Sometimes, the spring-actuated feature on the connector is made from plastic. Other times, the spring-actuated feature on the connector is fabricated from spring steel. Unfortunately, although the more recent connectors are an improvement over dated connectors using an eyelet and threaded connector, there are still far too many failures.

Part of the reason that spring-actuated connector assemblies fail in motor vehicle applications is because of the design of the assembly—namely that the spring element, such as a tab, is located on the periphery of the connector. By placing the spring tab on the exterior surface of the connector, manufacturers attempt to make engagement of the assembly's components obvious to the worker assembling the part in the factory. Unfortunately, for both plastic and metal, the increased temperatures of an automotive environment make a peripheral spring prone to premature failure. It is not uncommon for the engine compartment of a motor vehicle to reach or exceed 100° C., with individual components of a motor vehicle engine reaching or exceeding 180° C. At 100° C., most plastics start to plasticize, reducing the retention force of the peripheral spring-actuated element. At 100° C., the thermal expansion of the spring steel will reduce the retention force of a peripheral spring-actuated connector. Also, with respect to spring-actuated features formed from spring steel is the effect of residual material memory inherent in the spring steel as the spring steel is thermally cycled on a repeated basis between high and low temperatures. After many temperature cycles, the spring steel will begin to return to its original, pre-formed shape, which reduces the spring-actuated element's retention force with other components of the connector system. This behavior makes the conventional connector system susceptible to vibration and failure, each of which significantly reduce the performance and reliability of conventional connectors. For these and many other reasons, the motor vehicle industry needs a more reliable connector system that is low-cost, vibration-resistant, temperature-resistant, and better overall electrical and mechanical performance.

There is clearly a market demand for a mechanically simple, lightweight, inexpensive, vibration-resistant, temperature-resistant, and robust electrical connector system for vehicles. The description provided in the background section should not be assumed to be prior art merely because it is mentioned in or associated with the background section. The background section may include information that describes one or more aspects of the subject technology.

SUMMARY

The present disclosure relates to a spring-actuated electrical connector system, which has a spring actuated connector assembly and a female connector assembly. The electrical connector system is primarily intended for use in motor vehicles, including passenger and commercial vehicles, in high-power, and/or high-voltage applications where connector assemblies are essential to meet industry standards and production requirements. The electrical connector system can also be used in military vehicles, such as tanks, personnel carriers and trucks, and marine applications, such as pleasure boats and sailing yachts, or telecommunications hardware, such as server.

According to an aspect of the present disclosure, the system includes a male connector assembly and a female connector assembly. Both the male and female connector assemblies have a housing and a terminal. The male terminal assembly is designed and configured to fit within the female terminal, which forms both a mechanical and electrical connection between these terminals. Specifically, the male terminal assembly includes an internal spring actuator or spring member, which is designed to interact with an extent of the male terminal to ensure that a proper connection is created between the male terminal and female terminal. More specifically, the female terminal forms a receiver that is configured to receive an extent of the male terminal assembly. The male terminal assembly has a male terminal body, which includes a plurality of contact arms. A spring member is nested inside the male terminal body. The spring member resists inward deflection and applies outwardly directed force on the contact arms thereby creating a positive connection and retention force. Unlike other prior art connection systems, the connection between the male terminal and the female terminal become stronger when the connector system experiences elevated temperatures and electrical power.

In one embodiment, the female terminal has a tubular member which is fabricated from a sheet of highly conductive copper. The highly conductive copper can be C151 or C110. One side of the sheet of highly conductive copper can be pre-plated with silver, tin, or top tin, such that the inner surface of the tubular member is plated. The male terminal assembly includes a male terminal body and a spring member. The male terminal body has a plurality of contact arms. Four arms can be placed at 90° increments, meaning that each arm has one arm directly opposing a side wall of the female terminal. Each contact arm has a thickness, a termination end, and a planar surface with a length and a width.

A spring member is configured to be nested inside the male terminal body. The spring member has spring arms, a middle section, and a rear wall or base. The spring arms are connected to middle or base section. The spring arms have a termination end, a thickness, and a planar surface with a length and width. In the illustrated embodiments, the spring member has the same number of spring arms as the contact element has contact arms. In the illustrated embodiment, the spring arms can be mapped, one-to-one, with the contact arms. The spring arms are dimensioned so that the termination end of the associated contact arm contacts the planar surface of the spring arm. The spring arms of the illustrated embodiments are even in number, symmetrical, and evenly spaced.

The male terminal fits inside the tubular member of the female terminal such that the contact arms contact the inner surface of the tubular member. The spring arms help ensure that the contact arms create an electrical connection with the tubular member. The termination end of the contact arm meets the planar surface of the spring arm, forcing the contact arm to form a substantially perpendicular or at least an obtuse angle with respect to the outer surface of the spring arm. In the illustrated embodiments of the present disclosure, although not required, the metallic square tubular member has a symmetrical cross-section.

Other aspects and advantages of the present disclosure will become apparent upon consideration of the following detailed description and the attached drawings wherein like numerals designate like structures throughout the specification.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 1A is an isometric view of a first embodiment of an electrical connector system including a connector assembly having an internal spring component;

FIG. 2 is an isometric view of the connector system shown in FIG. 1, wherein the housing of the connector system has been removed to show a first embodiment of a male terminal assembly and a female terminal assembly;

FIG. 5 is an isometric view of the first embodiment of the spring member, wherein the spring member is a component of the first embodiment of the male terminal assembly shown in FIG. 2;

FIG. 6 is a left view of the spring member shown in FIG. 6;

FIG. 7 is a front view of the spring member shown in FIG. 6;

FIG. 8 is an isometric view of a second embodiment of the spring member, wherein the spring member is a component of the first embodiment of the male terminal assembly shown in FIG. 2;

FIG. 9 is a left view of the spring member shown in FIG. 8;

FIG. 10 is a front view of the spring member shown in FIG. 8;

FIG. 15 is a frontal isometric view of the male terminal assembly shown in FIG. 2;

FIG. 16 is a left view of the male terminal assembly shown in FIG. 15;

FIG. 17 is a front view of the male terminal assembly shown in FIG. 15;

FIG. 21 is a left view of the male terminal assembly shown in FIG. 15;

FIG. 22 is a frontal cross-sectional view of the male terminal assembly shown in FIG. 15, taken along the 22-22 line of FIG. 21;

FIG. 23 is a frontal isometric cross-sectional view of the male terminal assembly shown in FIG. 15, taken along the 22-22 line of FIG. 21;

FIG. 24 is a left view of the male terminal assembly shown in FIG. 15;

FIG. 25 is a frontal cross-sectional view of the male terminal assembly shown in FIG. 15, taken along the 25-25 line of FIG. 24;

FIG. 26 is a frontal isometric cross-sectional view of the male terminal assembly shown in FIG. 15, taken along the 25-25 line of FIG. 24;

FIG. 27 is a top view of the male terminal assembly shown in FIG. 15;

FIG. 28 is a left cross-sectional view of the male terminal assembly shown in FIG. 15, taken along the 28-28 line of FIG. 27;

FIG. 29 is a frontal isometric cross-sectional view of the male terminal assembly shown in FIG. 15, taken along the 28-28 line of FIG. 27.

FIG. 45 is a frontal view of the terminal assembly shown in FIG. 40;

FIG. 46 is a left view of the male terminal assembly and the female terminal shown in FIG. 39;

FIG. 47 is a left view of the male terminal assembly shown in FIG. 40;

FIG. 48 is a cross-sectional view of the terminal assembly shown in FIG. 39, taken along the 48-48 line of FIG. 46.

FIG. 55 is a front view of the male terminal assembly shown in FIG. 50;

FIG. 56 is a left view of the male terminal assembly and the female terminal shown in FIG. 49;

FIG. 57 is a left view of the male terminal assembly shown in FIG. 50;

FIG. 58 is a cross-sectional view of the terminal assembly shown in FIG. 49, taken along the 58-58 line of FIG. 56.

FIG. 63 is a frontal isometric view of the male terminal assembly shown in FIG. 60;

FIG. 64 is a left view of the male terminal assembly shown in FIG. 60;

FIG. 75 is a front view of the male terminal assembly shown in FIG. 70;

FIG. 76 is a left view of the male terminal assembly and the female terminal shown in FIG. 69;

FIG. 77 is a left view of the male terminal assembly shown in FIG. 70;

FIG. 78 is a cross-sectional view of the terminal assembly shown in FIG. 69, taken along the 78-78 line of FIG. 76.

FIG. 91 is a right view of the male terminal assembly shown in FIG. 88;

FIG. 92 is a front view of the male terminal assembly shown in FIG. 88;

FIG. 93 is a right view of the male terminal assembly and female terminal shown in FIG. 87;

FIG. 94 is a frontal isometric cross-sectional view of the terminal assembly shown in FIG. 87, taken along the 94-94 line of FIG. 93.

FIG. 95 is a right view of the male terminal assembly shown in FIG. 88;

FIG. 96 is a cross-sectional view of the terminal assembly shown in FIG. 87, taken along the 94-94 line of FIG. 93.

Figure 34:
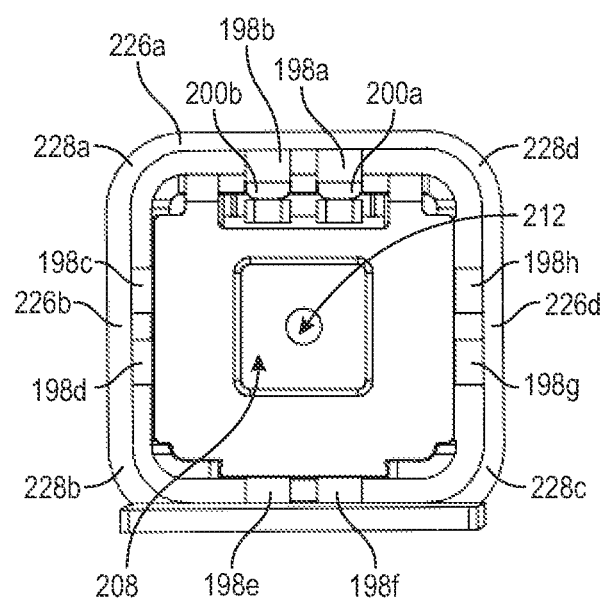
FIG. 34 is an end view of the terminal assembly shown in FIG. 33.
Figure 35:
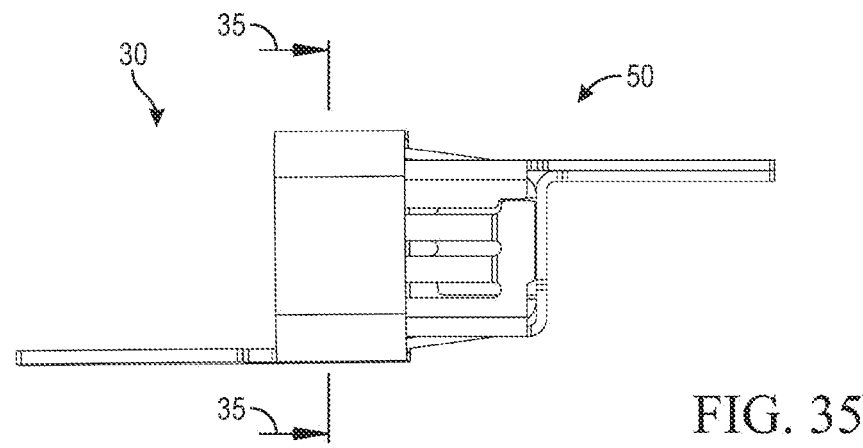
FIG. 35 is a left view of the terminal assembly shown in FIG. 33.
Figure 36:
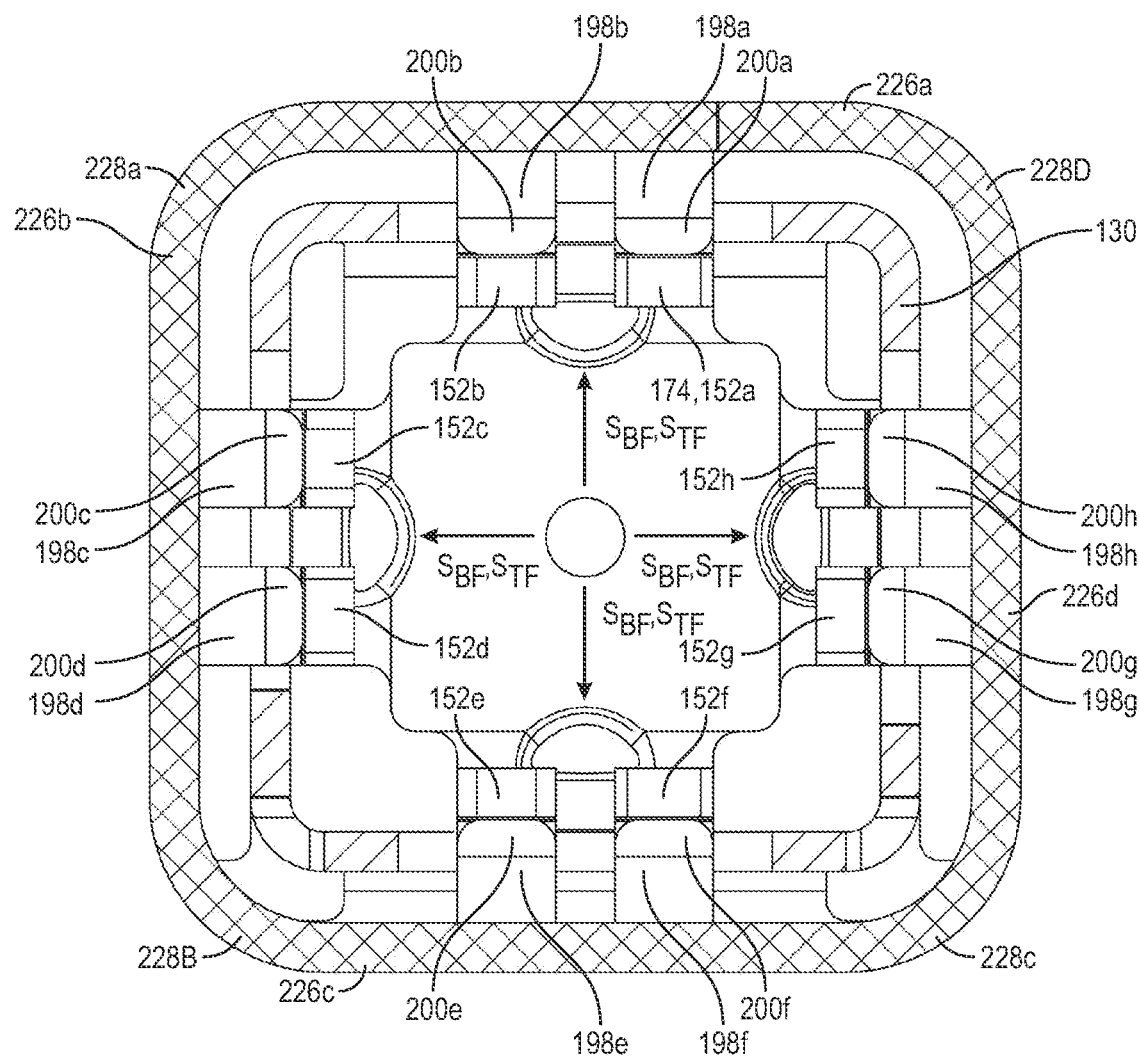
FIG. 36 is a cross-sectional view of the terminal assembly shown in FIG. 33, taken along the 36-36 line of FIG. 35.
Figure 40:
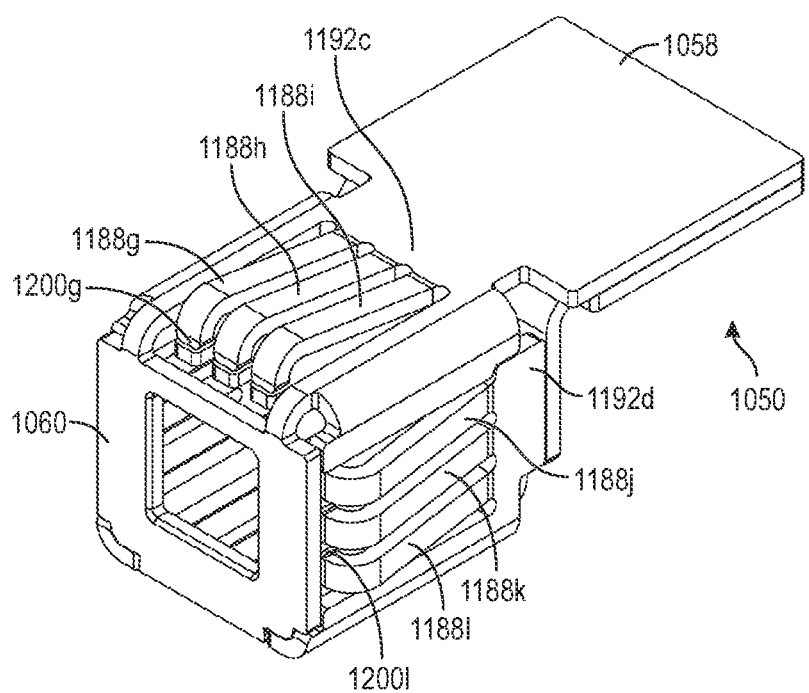
FIG. 40 is a frontal isometric view of a second embodiment of a male terminal assembly shown in FIG. 39.
Figure 41:
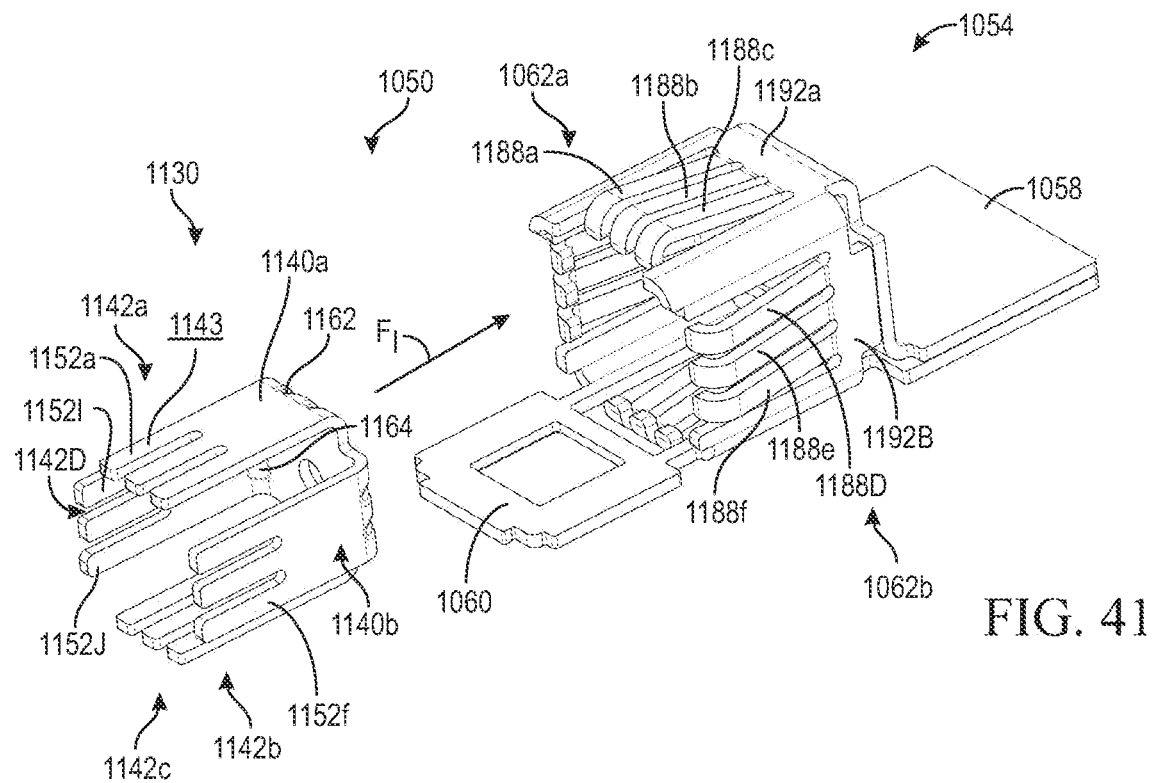
FIG. 41 is an exploded frontal isometric view of the male terminal assembly shown in FIG. 40, wherein a third embodiment of a spring is separated from the second embodiment of the male terminal.
Figure 42:
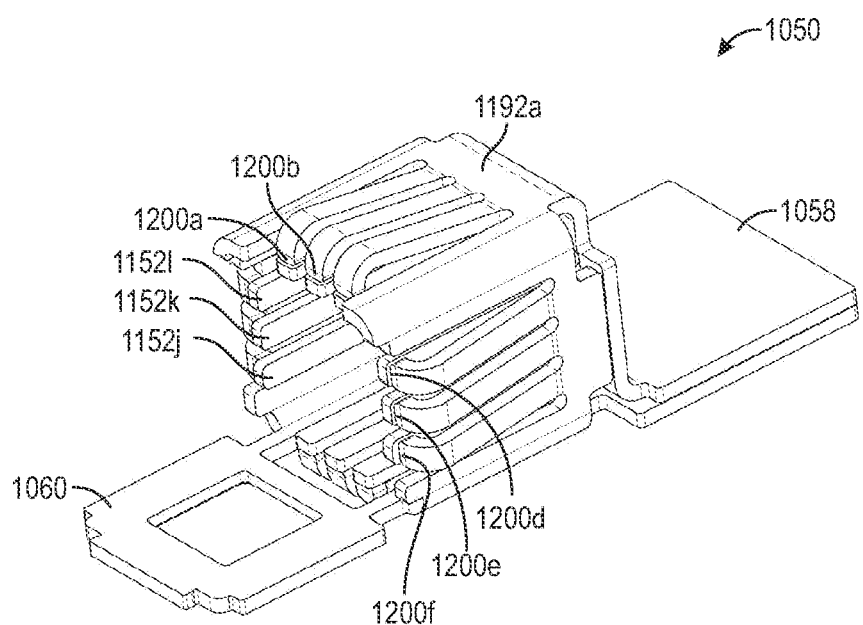
FIG. 42 is a frontal isometric view of the male terminal assembly shown in FIG. 40, wherein the third embodiment of the spring member is within the male terminal.
Figure 43:
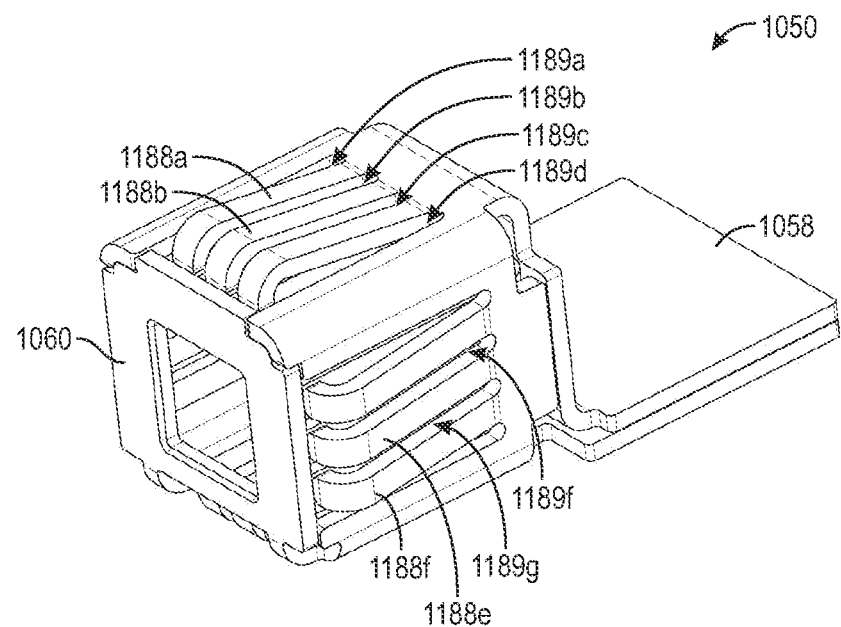
FIG. 43 is a frontal isometric view of the male terminal assembly shown in FIG. 40.
Figure 44:
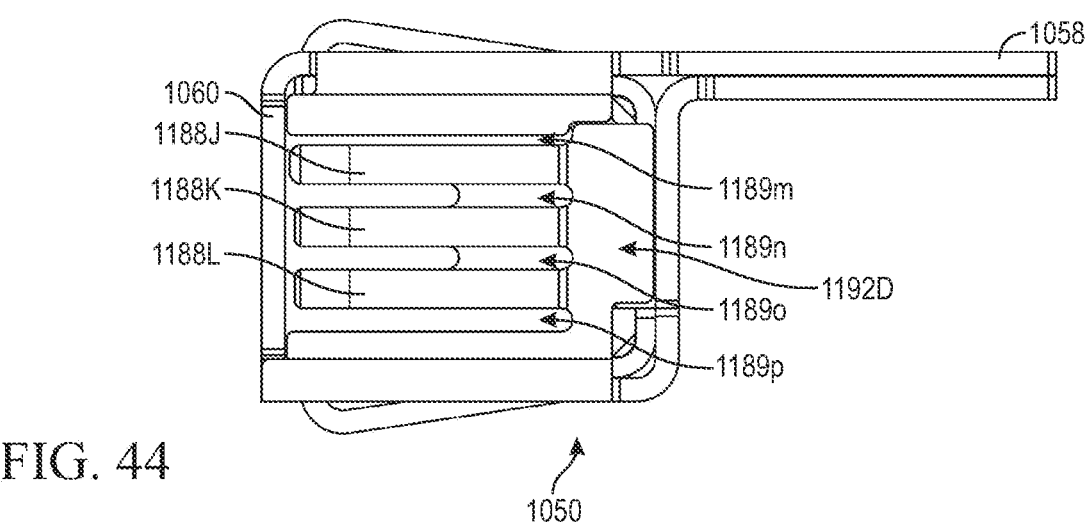
FIG. 44 is a left view of the male terminal assembly shown in FIG. 40.
Figure 49:
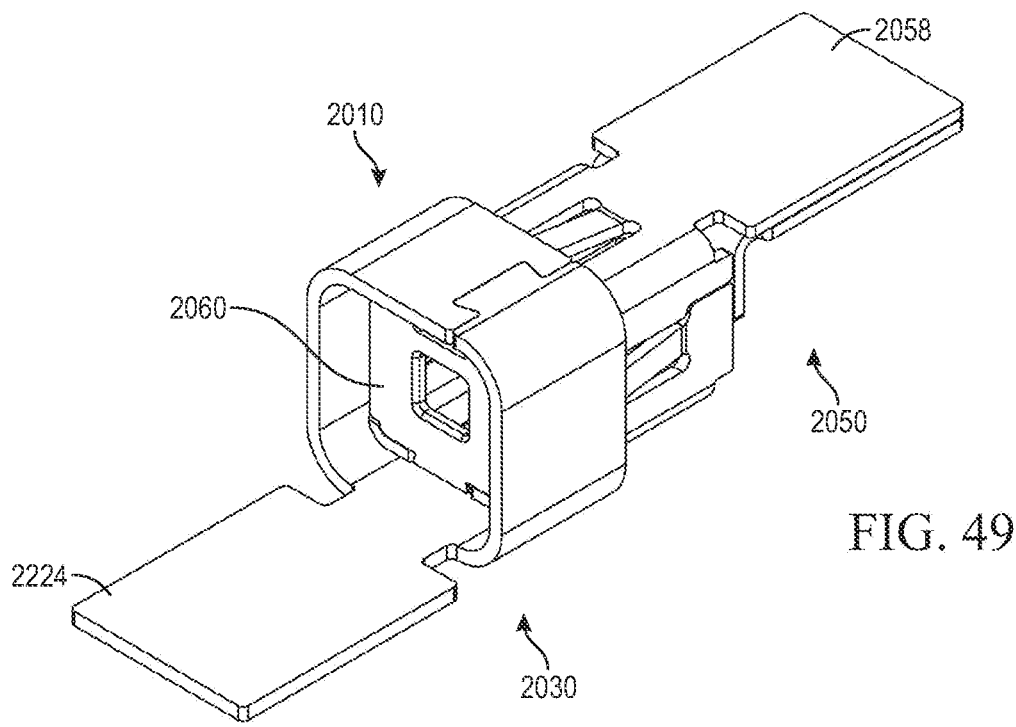
FIG. 49 is an isometric view of a third embodiment of a male terminal assembly and a female terminal in a connected position.
Figure 50:
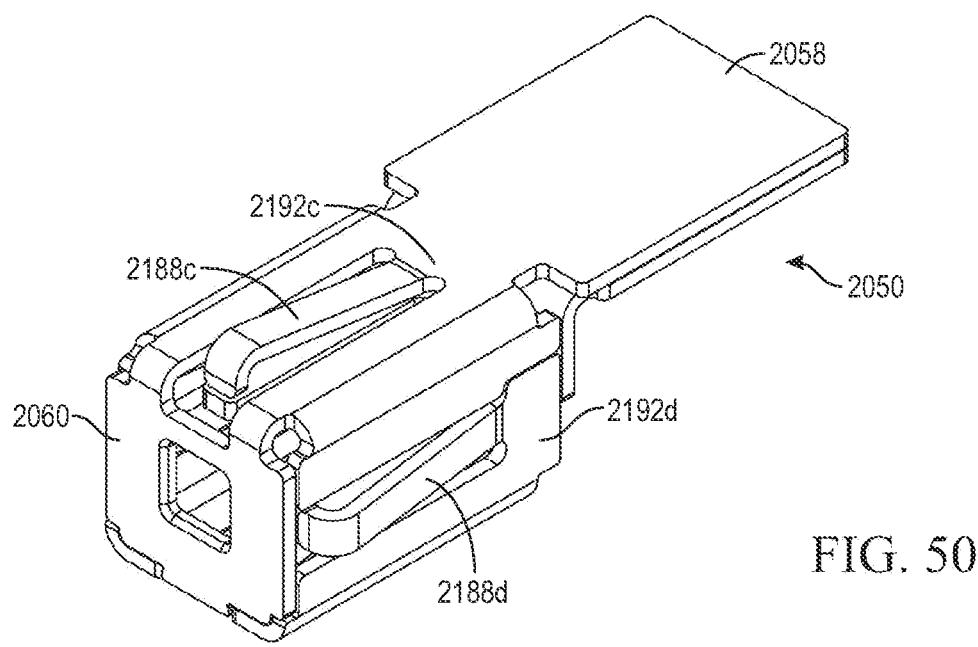
FIG. 50 is a frontal isometric view of a third embodiment of a male terminal assembly shown in FIG. 49.
Figure 51:
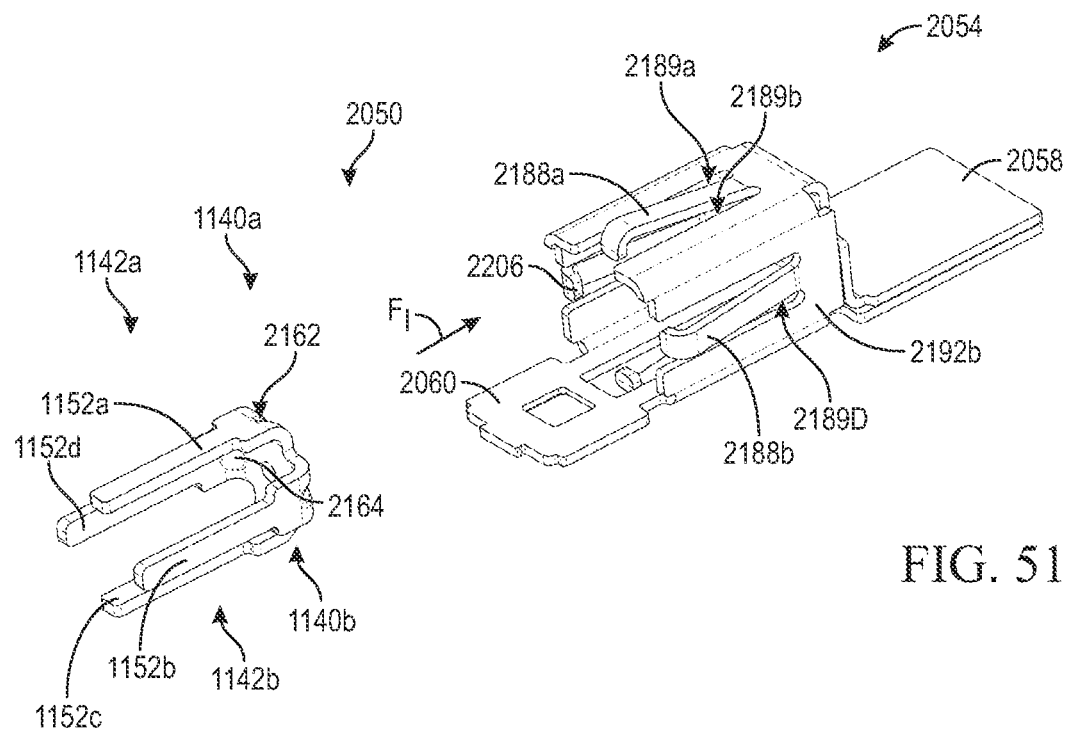
FIG. 51 is an exploded frontal isometric view of the male terminal assembly shown in FIG. 50, wherein a fourth embodiment of a spring is separated from the third embodiment of the male terminal.
Figure 52:
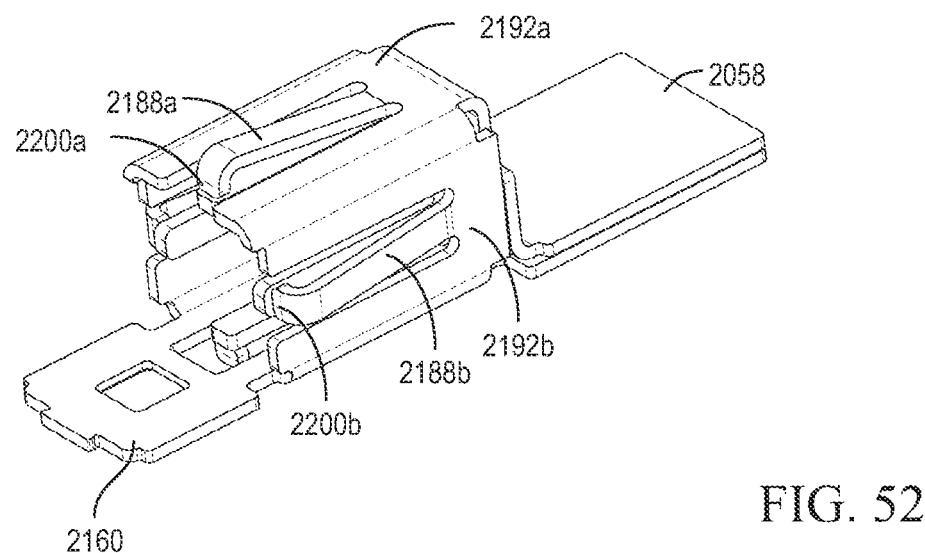
FIG. 52 is a frontal isometric view of the male terminal assembly shown in FIG. 50, wherein the fourth embodiment of the spring member is within the male terminal.
Figure 53:
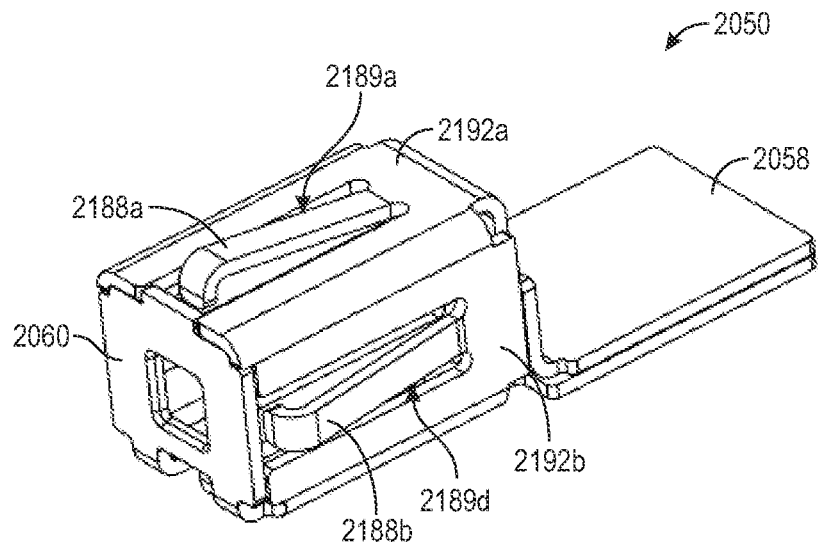
FIG. 53 is a frontal isometric view of the male terminal assembly shown in FIG. 50.
Figure 54:
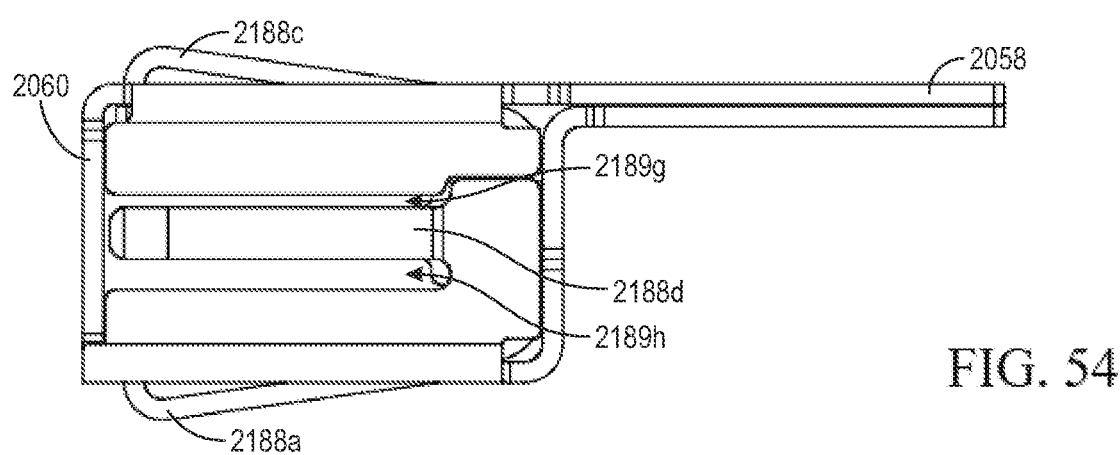
FIG. 54 is a left view of the male terminal assembly shown in FIG. 50.
Figure 59:
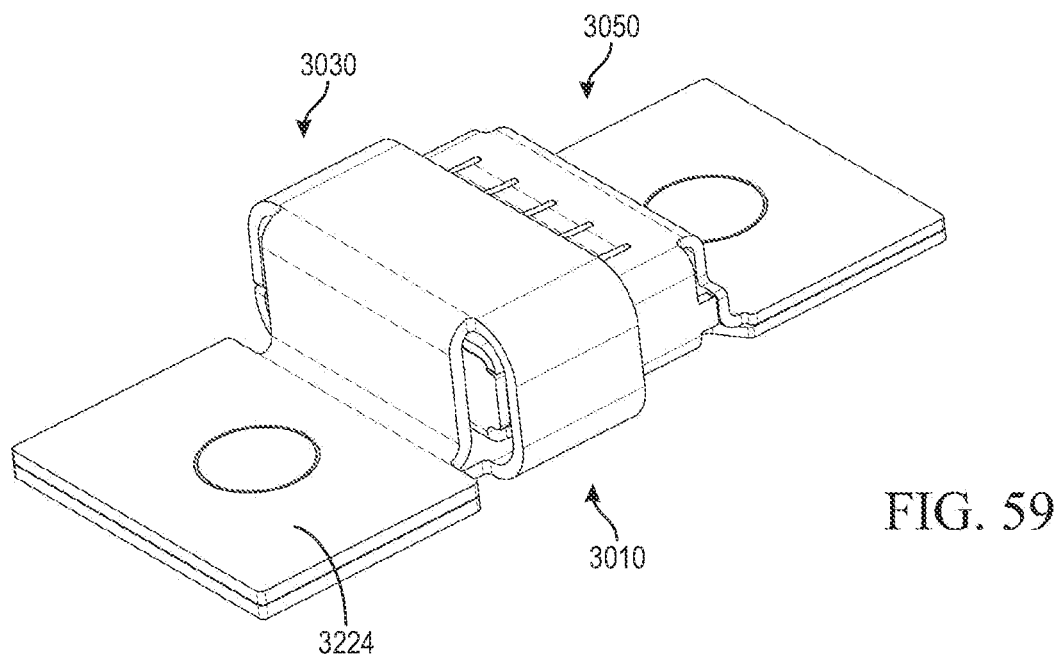
FIG. 59 is an isometric view of a fourth embodiment of a male terminal assembly and a female terminal in a connected position.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure. In addition, components from one embodiment may be used in connection with another embodiment. For example, the bolt on header version of the female terminal shown in FIG. 40 may be used instead of the wire version of the female terminal shown in FIG. 34. Further, it should be understood components and/or features of one embodiment may be utilized in addition to or in replace of components and/or features contained within another embodiment without departing from the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various ways, all without departing from the scope of the present disclosure. Accordingly, the drawings and description are to be regarded as illustrative and not restrictive.

The Figures show a connector system 10, which is designed to mechanically and electrically couple a device (e.g., radiator fan, heated seat, power distribution component, or another current drawing component) to a power source (e.g., alternator, battery, or power distribution component). The connector system 10 may be used in an electrical system, which may be contained within an airplane, the motor vehicle, a military vehicle (e.g., tank, personnel carrier, heavy-duty truck, or troop transporter), a bus, a locomotive, a tractor, a boat, a submarine, a battery pack, a 24-48 volt system, as a connector for a busbar, in a high-power application, in a high-current application, in a high-voltage applications, in connection with telecommunication hardware, or in another other application where connector assemblies are essential to meet industry standards and production requirements. Additional details about how the connector system 10 may be used is described in connection with PCT Application entitled "Electrical Connector Assembly With Internal Spring Component And Applications Thereof", which: (i) has attorney docket number 295896, (ii) was filed on Jun. 7, 2019, (iii) claims priority to U.S. Provisional Application 62/681,973, and (iv) is commonly owned with this application. This PCT Application entitled Electrical Connector Assembly With Internal Spring Component And Applications Thereof is incorporated herein by reference for all purposes and made a part hereof.

Figure 1B:
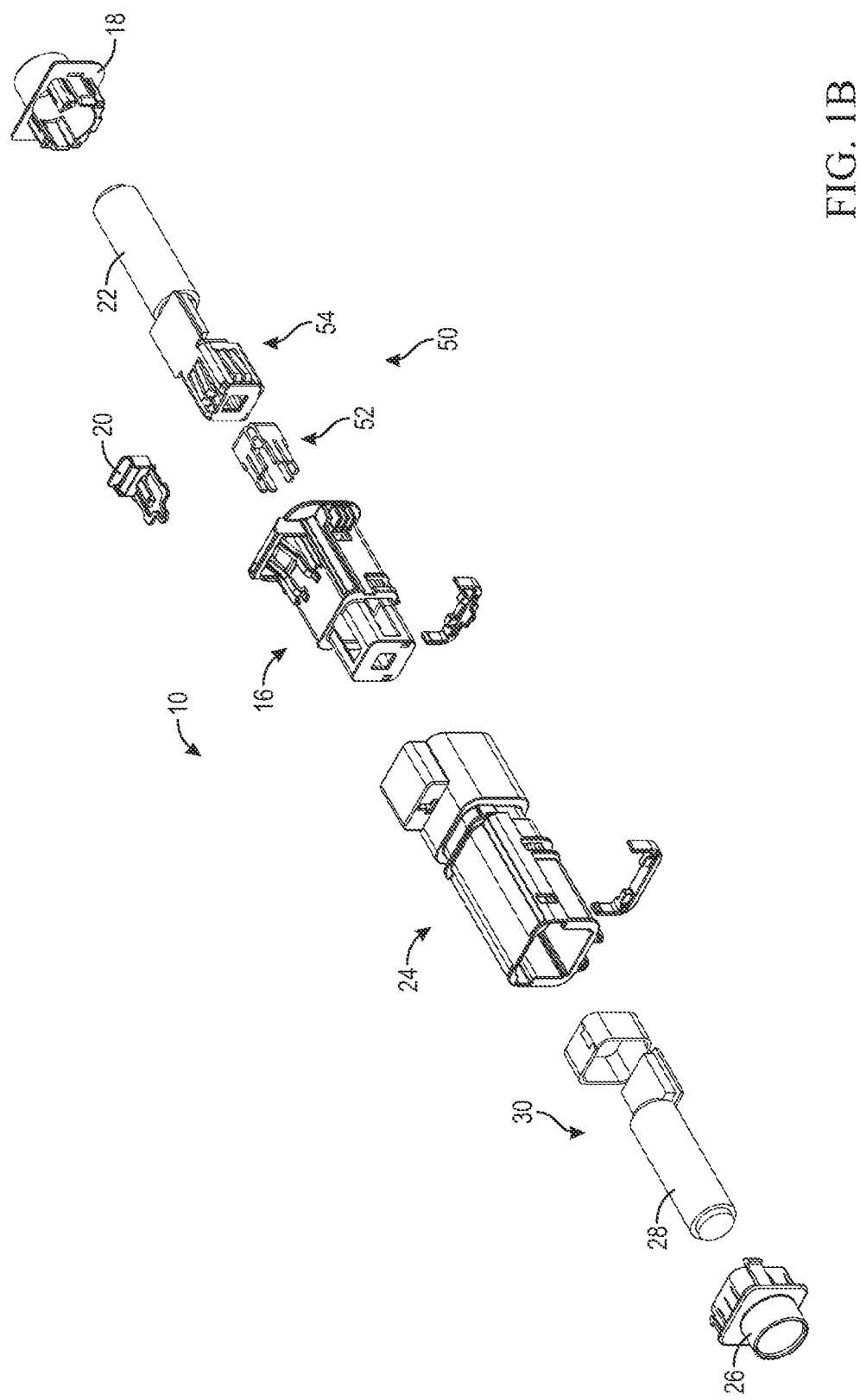
FIG. 1B is an exploded view of the connector system, showing a male connector assembly and a female connector assembly.
Figure 60:
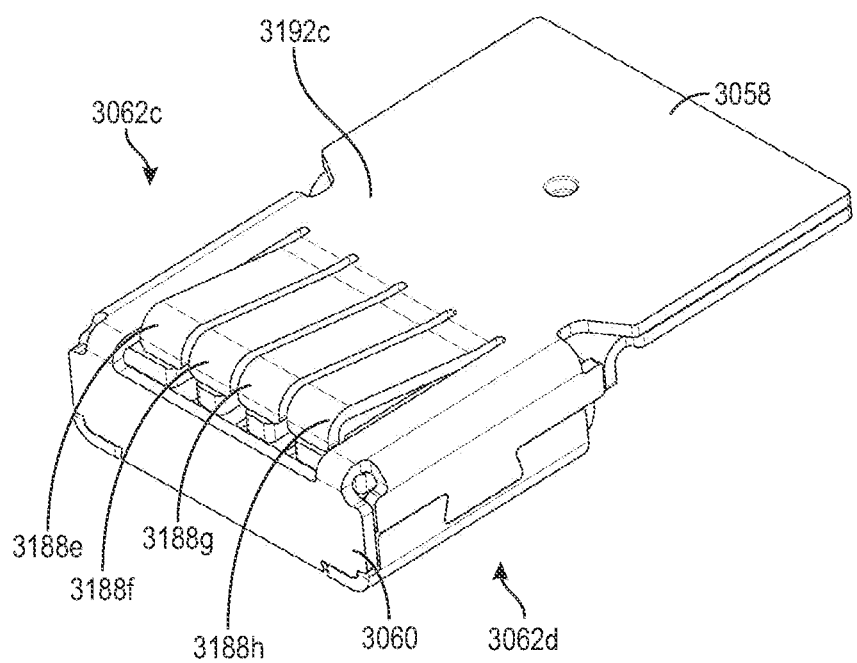
FIG. 60 is a frontal isometric view of the fourth embodiment of the male terminal assembly shown in FIG. 59.
Figure 61:
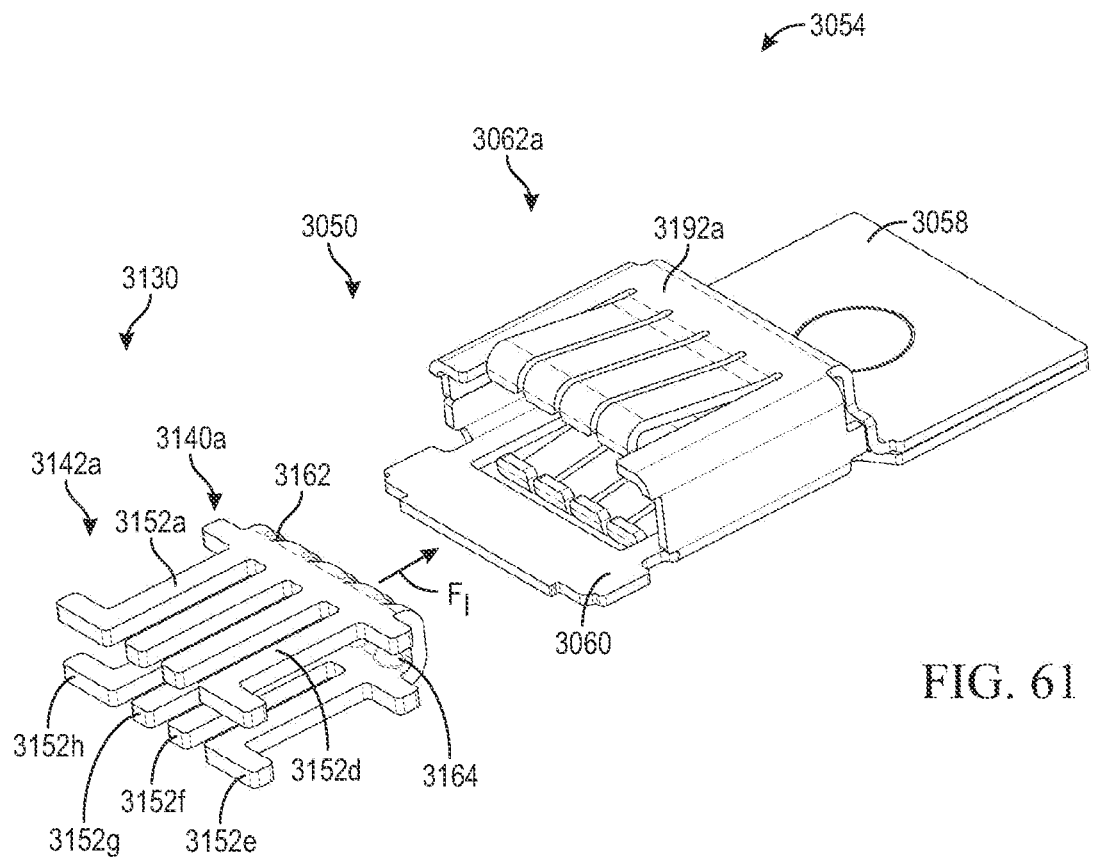
FIG. 61 is an exploded frontal isometric view of the male terminal assembly shown in FIG. 60, wherein a fifth embodiment of a spring is separated from the fourth embodiment of the male terminal.
Figure 62:
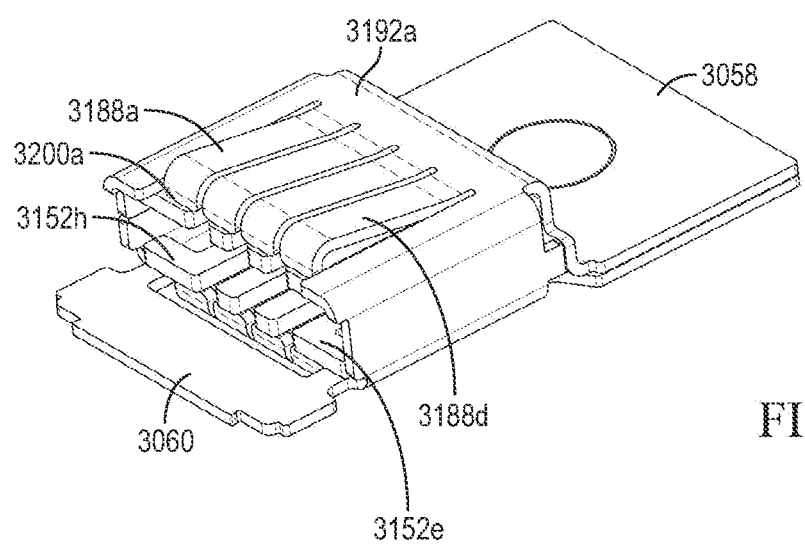
FIG. 62 is a frontal isometric view of the male terminal assembly shown in FIG. 60, wherein the fifth embodiment of the spring member is within the male terminal.

Referring to FIGS. 1A, 1B and 2, the connector system 10 is comprised of a male connector assembly 12 and a female connector assembly 14. The male connector assembly 12 includes the male housing 16 that encases at least a first substantial extent of a male terminal assembly 50. The female connector assembly 14 includes a female housing 24 that encases a first extent of the female terminal 30. The housings 16, 24 are omitted from FIG. 2 to illustrate the male and female connector assemblies 12, 14. The male housing 16 is designed to: (i) facilitate the coupling of the male terminal assembly 50 with an extent of the female connector assembly 14, (ii) minimize the chance that male terminal assembly 50 accidentally makes electrical contact with another device or structure (e.g., structures contained within the engine compartment of a vehicle, such as the frame or body of the vehicle), and (iii) meet industry standards, such as USCAR specifications. Accordingly, the male housing 16 is typically formed from a material (e.g., polymer, such as plastic or nylon) that is non-conductive using an injection molding or over molding process. Thus, the housing 16 is capable of isolating electrical current that is configured to flow between the male terminal assembly 50 and other components or structures. It should be understood that the male housing 16 does not fully encase the male terminal assembly 50 because at least a second extent of the male terminal assembly 50 must be capable of making contact with an extent of the female connector assembly 14 to enable current to flow between the male connector assembly 12 and the female connector assembly 14. The male connector assembly 12 may also include a cable strain relief component 18, a connector position assurance (CPA) component 20, and/or a lead or wire 22. The CPA component 20 is described in greater detail in connection with PCT Application entitled "Electrical Connector System With Internal Spring Component", which: (i) has attorney docket number 293506, (ii) was filed on Jun. 7, 2019, (iii) claims priority to U.S. Provisional Application 62/681,973, and (iv) is commonly owned with this application. This PCT Application entitled Electrical Connector System With Internal Spring Component is incorporated herein by reference for all purposes and made a part hereof. Nevertheless, the CPA component 20 is generally designed to enable the connector system 10 to meet USCAR Specifications, including USCAR-12, USCAR-25, and USCAR-2. The cable strain relief component 18, CPA component 20, and wire 22 are optional components that may be omitted completely or replaced with different components. For example, the cable strain relief component 18 and the wire 22 may be replaced in an embodiment where the male terminal assembly 50 is directly coupled or integrally formed with a device (see FIG. 60). Also, in an alternative embodiment, just the cable strain relief component 18 may be omitted due to the configuration (e.g., length, rigidity, positioning, or etc.) of the wire 22.

As shown in FIG. 1A, the female housing 24 is considerably larger than the male housing 16 and is configured to receive a substantial extent of the male housing 16. Like the male housing 16, the female housing 24 is designed to: (i) facilitate the coupling of the male terminal assembly 50 with a female terminal 30, (ii) minimize the chance that female terminal 30 accidentally makes electrical contact with another device or structure, and (iii) meet industry standards, such as USCAR specifications. Accordingly, the female housing 24 is typically formed from a material (e.g., polymer, such as plastic or nylon) that is non-conductive using an injection molding or over molding process. Thus, the housing 24 is capable of isolating electrical current that is configured to flow through between the female terminal 30 and other structures. It should be understood that the female housing 24 does not fully encase the female terminal 30 because at least a second extent of the female terminal 30 must be capable of making contact with the male terminal assembly 50 to enable current to flow between the female connector assembly 14 and the male connector assembly 12. The female connector assembly 14 may also include a cable retainer 26 and a wire 28. The cable strain relief component 26 and wire 28 are optional components that may be omitted completely or replaced with different components. For example, the cable strain relief component 26 and the wire 28 may be completely replaced in an embodiment where the female terminal 30 is fixed to a device (see FIG. 40). Also, in an alternative embodiment, just the cable strain relief component 26 may be omitted due to the configuration (e.g., length, rigidity, positioning, or etc.) of the lead or wire 28.

Figure 3:
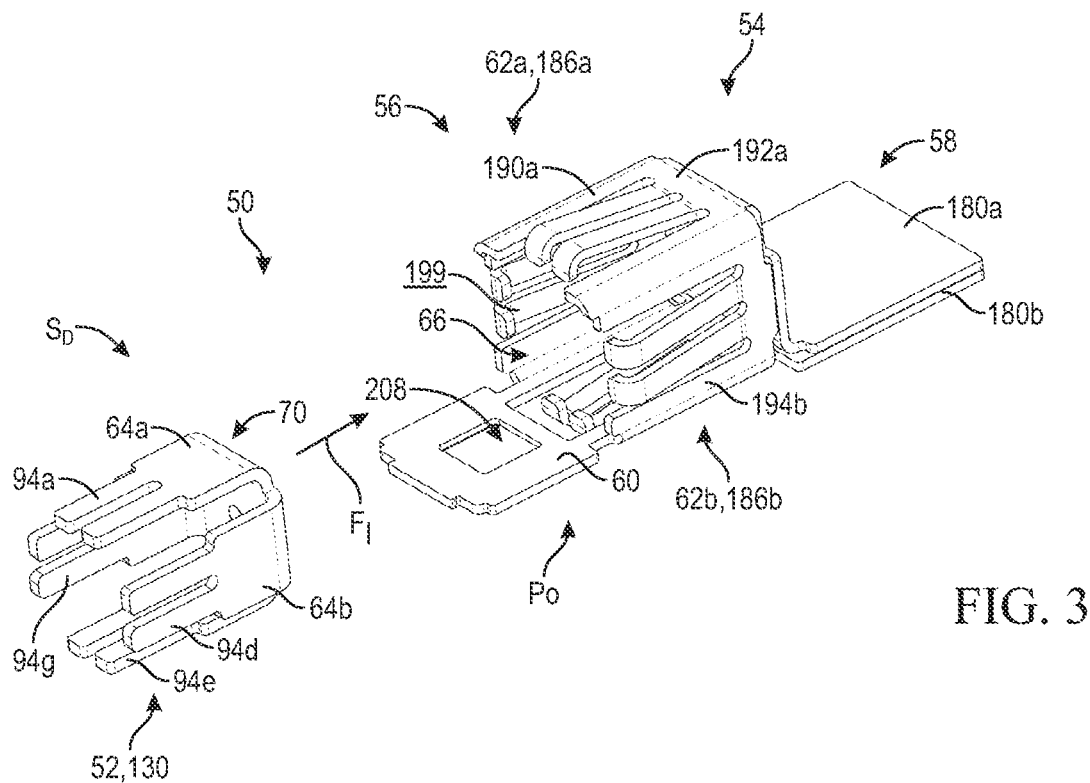
FIG. 3 is an exploded frontal isometric view of a first embodiment of a male terminal assembly shown in FIG. 2, wherein a first embodiment of a spring is separated from a first embodiment of a male terminal.
Figure 4:
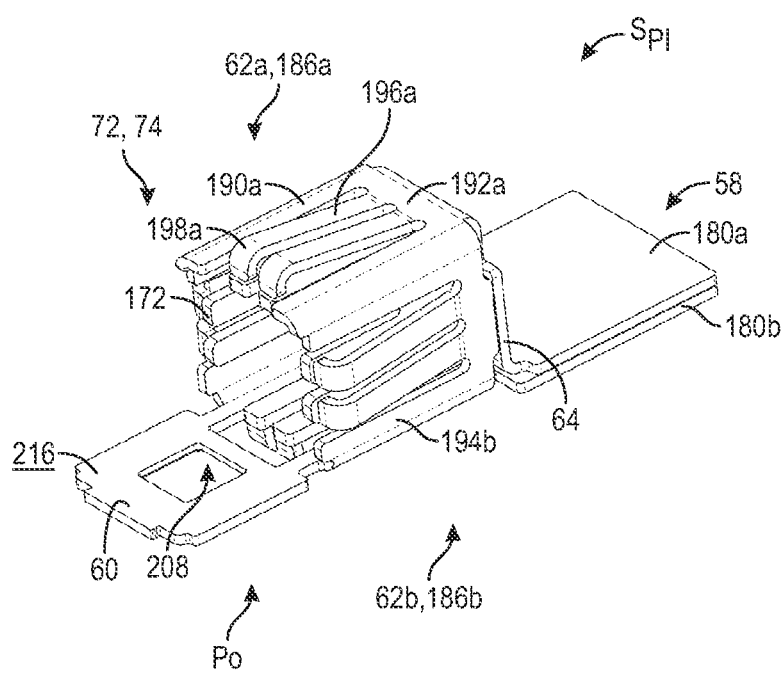
FIG. 4 is a frontal isometric view of the male terminal assembly shown in FIG. 3, wherein the spring member is positioned within the male terminal receiver.

FIGS. 3, 4 and 15 provide views of a first embodiment of the male terminal assembly 50 in various stages of assembly. FIG. 3 provides the first embodiment of the male terminal assembly 50 in a disassembled state or position, SD, FIG. 4 provides the first embodiment of the male terminal assembly 50 in a partially assembled state or position, Sp, and FIG. 15 provides the first embodiment of the male terminal assembly 50 in an assembled state or position, $S_A$. Specifically, these Figures show the male terminal assembly 50, which includes a spring member 52 and a male terminal 54. As discussed below, the male terminal 54 includes a male terminal body 56 and at least one male terminal connection plate 58. Said male terminal body 56 generally includes: (i) a first or front male terminal wall 60, (ii) an arrangement of male terminal side walls 62a-62d that include at least one contact arm 188a-188h, and (iii) a second or rear male terminal wall 64. The male terminal body 56 includes a male terminal receiver 66, which is formed by the arrangement of male terminal side walls 62a-62d along with the second or rear male terminal wall 60. As discussed below, the spring member 52, 130 generally includes: (i) an arrangement of spring member side walls 68a-68d with at least one spring finger 94 and (ii) a rear spring wall 70, wherein the side walls 68a-68d extend from the rear wall 70.

Coupling or positioning the spring member 52, 130 within the male terminal assembly 50 occurs across multiple steps or stages. The first stage of assembling the male terminal assembly 50 is shown in FIG. 3, where the front male terminal wall 60 is in an open or flat position, Po, and the spring member 52 is separated from the male terminal 54. In this open position, Po, the front male terminal wall 60 is substantially co-planar with the male terminal side wall 62c. This configuration of the male terminal 54 exposes the male terminal receiver 66 and places the male terminal 54 in a state that is ready for receiving the spring member 52. The second stage of assembling the male terminal assembly 50 is shown in FIG. 4, where the front male terminal wall 60 is in an open or horizontal position, Po, and the spring member 52 is positioned within or inserted into the male terminal receiver 66. To reach the inserted state, an insertion force, FI, has been applied to the spring member 52 to insert the spring member 52 into the male terminal receiver 66. The insertion force, $F_I$, is applied on the spring member 52 until the second or rear male terminal wall 64 is positioned adjacent to the rear spring wall 70 and a free end 72 of the male terminal 54 is substantially aligned with a free end 74 of the spring member 52. Once the spring member 54 has reached this position, the spring member 54 is in the partially assembled state, Sp and a portion of the male terminal side walls 62a-62d are positioned adjacent a portion of the spring member side walls 68a-68d.

Figure 65:
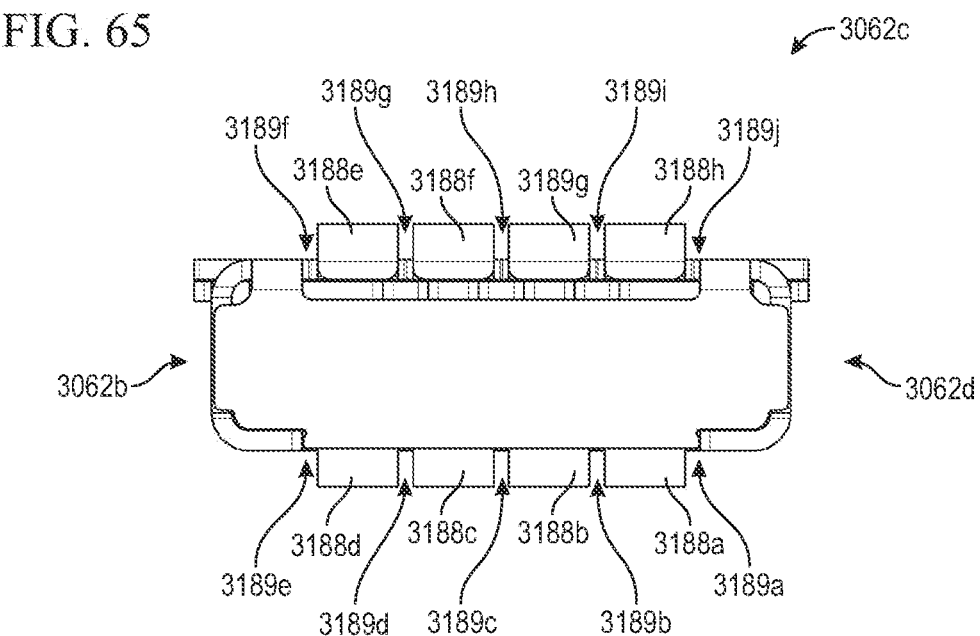
FIG. 65 is a front view of the male terminal assembly shown in FIG. 60.
Figure 66:
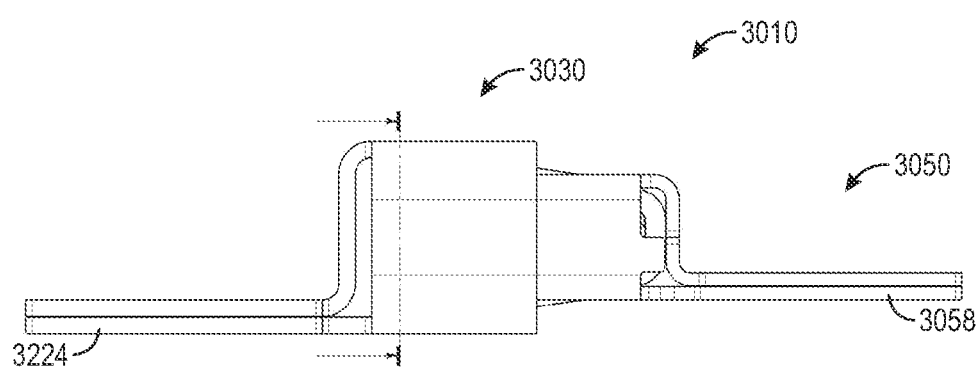
FIG. 66 is a left view of the male terminal assembly and the female terminal shown in FIG. 59.

The third stage of assembling the male terminal assembly 50 is shown in FIG. 15, where: (i) the front male terminal wall 60 is closed or vertical, PCL, and (ii) the spring member 52 is positioned within the male terminal receiver 66. Once the spring member 54 has reached this position, the spring member 54 is in the assembled state, $S_A$. To close the front male terminal wall 60, an upward directed force is applied to the male terminal wall 60 to bend it about its seam to place it adjacent to the side walls 62a-62d. After the front male terminal wall 60 is in the proper position, the top edge is coupled (e.g., welded) to the side wall 62a of the male terminal body 56. Here, the closed or vertical, PCL, of the front male terminal wall 60 ensures that the spring member 52 is retained within the male terminal 54. It should be understood that in other embodiments, the front male terminal wall 60 may be omitted, may not have an opening 208 there through (see FIG. 65), may not extend the entire way from side wall 62a to 62c (e.g., partially extending from any side wall 62a-62d), or may be a separate piece that is coupled to both side walls 62a and 62c.

FIGS. 5-10 provide a first spring member embodiment 52 and a second spring member embodiment 130. In FIG. 5-7, the first embodiment of the spring member 52 includes an arrangement of spring member side walls 68a-68d, wherein each side wall 68*a*-68*d* extends from a curvilinear transition segment 80*a*-80*d* adjacent the rear spring wall 70. The spring member side walls 68*a*-68*d* each include an intermediate or base section 82*a*-82*d* and a spring arm 84*a*-84*d*. Said spring arm 84*a*-84*d* extent from a respective base section 82*a*-82*d*. Each spring arm 84*a*-84*d* is comprised of individual spring fingers 94*a*-94*h* that are non-contiguous to define a spring finger aperture 92 between a pair of fingers 94*a*-94*h*, where the aperture 92 extends the length of the spring fingers 94*a*-94*h*. It should be understood that some embodiments may not include an aperture 92 and thus in these embodiments the term spring arms 84*a*-84*d* and term spring fingers 94*a*-94*h* may be used interchangeable. Due to the curvilinear transition segments 80*a*-80*d*, the outer surface 90 of the base section 82*a*-82*d* is substantially perpendicular to the outer surface 91 of the rear spring wall 70.

Referring to FIG. 6, the base spring sections 82*a*-82*d* extend between a spring starting plane 86 and a spring ending plane 88 (as denoted by the dotted lines in FIG. 6), which define a length of the base sections 82*a*-82*d*. The spring starting plane 86 and the spring ending plane 88 are oriented such that they are substantially parallel to the rear spring wall 70. The starting plane 86 resides at a location: (i) that is closest to the rear spring wall 70 and (ii) where an extent of the outer surface 90 of the base spring sections 82*a*-82*d* is substantially perpendicular to the outer surface 91 of the rear spring wall 70. The ending plane 88 resides at a location where a terminus of the spring finger aperture 92 is formed in the side walls 68*a*-68*d* and between a pair of adjacent spring fingers 94*a*-94*h*. The spring finger aperture 92 has an open end located at the free ends of the spring fingers 94*a*-94*h* and a curvilinear terminus adjacent the base sections 82*a*-82*d*.

As shown in FIGS. 5-7, the base spring sections 82*a*-82*d* are not connected to one another and thus base section gap 96 is formed between adjacent base spring sections 82*a*-82*d* of the spring member 52. The base section gap 96 is aligned with the spring arm openings 98, which are discussed below. These base section gaps 96 define a first base edge 100*a* and a second base edge 100*b*, where the edges 100*a, b* are opposed and define a base section width 104. The base section gaps 96 facilitate omnidirectional expansion of the spring arms 84*a*-84*d*, when the spring 52 and the connector system 10 are subjected to temperature extremes during thermal cycling, which facilitates the mechanical and electrical coupling between the male terminal 54 and the female terminal 30.

The spring arms 84*a*-84*d* extend from the base spring sections 82*a*-82*d* of the spring member 52, away from the rear spring wall 70, and terminate at the free end 74 of the spring 52. The spring arms 84*a*-84*d* are generally coplanar with the base spring sections 82*a*-82*d* and as such the outer surface 93 of the spring arms 84*a*-84*d* is coplanar with the outer surface 90 of the base spring sections 82*a*-82*d*. Unlike the spring arm 31 that is disclosed within FIGS. 4-8 of PCT/US2018/019787, a free end portion 74 of the spring fingers 94*a*-94*h* does not have a curvilinear component. Instead, the free end portion 153 has a substantially planar outer surface. This configuration is beneficial because it ensures that the forces asserted by the spring are focused on the free end 72 of the male terminal body 54. In contrast, the curvilinear extent of the spring arm 31 that are disclosed within FIGS. 4-8 of PCT/US2018/019787 do not apply a force in this manner disclosed herein.

Like the base spring sections 82*a*-82*d*, pairings of the spring arms 84*a*-84*d* are spaced a distance apart and are not connected to one another. Instead, an elongated spring arm openings or gaps 98 extends between pairs of the spring arms 84*a*-84*d*. These spring arm openings 98 define a first edge 102*a* and a second edge 102*b* of the spring arms 84*a*-84*d*, wherein a spring arm width 106 extends between said edges 102*a*, 102*b*. The first base edge 100*a* is not aligned with the first spring arm edge 102*a*, and the second base edge 100*b* is not aligned with the second spring arm edge 102*b*. Due to this misalignment, a notch 96 is formed between the base 82 and the spring arm 84 (and the spring fingers 94). As will be discussed in greater detail in connection with FIGS. 11-12, the offset between these edges 100*a*, 102*a*, 100*b*, and 102*b* will alter the forces that are provided by the spring member 52 when the spring 52 and the connector system 10 are subjected to temperature extremes during thermal cycling.

The spring arms 84*a*-84*d* are comprised of spring finger apertures 92 that extend the length of the spring arms 84*a*-84*d* to further define individual spring fingers 94*a*-94*h*. The spring finger apertures 92 are typically formed parallel to the first and second edges 102*a*, 102*b* of the spring arms 84*a*-84*d*. It should be understood that in other embodiments, these spring finger apertures 92 may not be parallel to the first and second edges 102*a*, 102*b*. Instead, the spring finger apertures 92 may be formed at an angle in comparison to the first edge 102*a* and/or the second edge 102*b*. For example, the angle between the bottom edge of the spring finger apertures 92 and the second edge 102*b* may be between 1° and 60°, preferably between 1° and 45°, and most preferably between 1° and 10°.

Due to the spring arm openings 98 and the spring finger apertures 92, the individual spring fingers 94*a*-94*h* are not contiguous with one another or connected to a structure other than the base spring sections 82*a*-84*d*. This configuration facilitates omnidirectional expansion of the spring fingers 94*a*-94*h*, which facilitates in the electrical and mechanical coupling between the male terminal 54 and the female terminal 30. The number and width 168 of individual spring fingers 94*a*-94*h* and openings 92 may vary. For example, the first embodiment of the spring member 52 has four openings 92 and eight spring fingers 94*a*-94*h*. In the third embodiment of the spring member 1052 has eight openings 1092 and twelve spring fingers 1094*a*-1094*h*. In addition, the width 168 of the individual spring fingers 94*a*-94*h* is typically equal to one another; however, in other embodiments, the spring fingers 94*a*-94*h* may have varying widths.

FIG. 8-10 show a second embodiment of the spring member 130. Either the first embodiment of the spring member 52 or the second embodiment 130 may be utilized with the male terminal assembly 50. The second embodiment of the spring member 130 includes an arrangement of spring member side walls 132*a*-132*d*, wherein each side wall 132*a*-*d* extends from a curvilinear transition segment 138*a*-*d* adjacent the rear spring wall 134. The spring member side walls 132*a*-132*d* each includes an intermediate or base section 140*a*-140*d* and a spring arm 142*a*-142*d*. Said spring arm 142*a*-142*d* extent from a respective base section 140*a*-*d*. Each spring arm 142*a*-142*d* is comprised of individual spring fingers 152*a*-152*h* that are non-contiguous to define a spring finger aperture 150 between a pair of fingers 152*a*-*h*, where the aperture 150 extends the length of the spring fingers 152*a*-*h*. It should be understood that some embodiments may not include an aperture 150 and thus in these embodiments the term spring arms 142*a*-142*d* and term spring fingers 152*a*-152*h* may be used interchangeable. Due to the curvilinear transition segments 138*a*-138*d*, the outer surface 148 of the base section 140a-140d is substantially perpendicular to the outer surface 149 of the rear spring wall 134.

To increase the structural rigidity of the spring 130, the curvilinear transition segment 138a-138d includes a divot or recess 162 formed in the outer surface 165 of the transition segment 138a-138d. The divot or recess 162 forms an internal projection or strengthening rib 164 in the inner surface 166 of the transition segment 138a-138d. As will be discussed in greater detail in connection with FIGS. 11-12, this recess 162 and associated strengthening rib 164 alter the forces that are associated with the spring member 130. It should be understood that the recess 162 and associated internal strengthening rib 164 are integrally formed with the transition segment 138a-138d. No material is added or subtracted from the spring member 130 to form the recess 162 and associated strengthening rib 164. Accordingly, the cross-sectional dimension of the spring member 130 does not substantially change due to the addition of these features. Nevertheless, the spring member 130 may be formed without the recess 162 and instead, the spring member 130 may only include the strengthening rib 164. In this alternative embodiment, the cross-sectional area of the spring member 130 will change due to the addition of these features.

Referring to FIG. 9, the base spring sections 140a-140d extend between a spring starting plane 144 and a spring ending plane 146 (as denoted by the dotted lines in FIG. 9), which define a length of the base sections 140a-d. The starting plane 144 and the ending plane 146 are oriented such that they are substantially parallel to the rear spring wall 134. The starting plane 144 resides at a location: (i) that is closest to the rear spring wall 134 and (ii) where an extent of the outer surface 148 of the base section 140a-140d is substantially perpendicular to the outer surface 149 of the rear spring wall 134. The ending plane 146 resides where a terminus of the spring finger aperture 150 formed in the side walls 132a-132d and between a pair of adjacent spring fingers 152a-152h. The spring finger aperture 150 has an open end located at the free ends of the spring fingers 152a-152h and a curvilinear terminus adjacent the base sections 140a-d.

As shown in FIGS. 8-10, the base sections 140a-140d are not connected to one another and thus a base section gap 154 is formed between adjacent base sections 140a-140d of the spring member 130. The base section gap 154 is aligned with the spring arm openings 157, which are discussed below. The base section gaps 154 defined a first base edge 158a and a second base edge 158b, where the edges 158a, b are opposed and define a base section width 156 there between. The gaps 154 facilitate omnidirectional expansion of the spring arms 142a-142d when the spring 130 and the connector system 10 are subjected to temperature extremes during thermal cycling, which facilitates the mechanical and electrical coupling between the male terminal 54 and the female terminal 30.

The spring arms 142a-142d extend from the base spring sections 140a-140d of the spring member 130, away from the rear spring wall 134, and terminate at the free end 74 of the spring 130. The spring arms 142a-142d are generally coplanar with the base spring sections 140a-140d and as such, the outer surface 143 of the spring arm 142a-142d is coplanar with the outer surface 148 of the base spring sections 140a-140d. Unlike the spring arm 31 that is disclosed within FIGS. 4-8 of PCT/US2018/019787, a free end portion 153 of the spring fingers 152a-152h does not have a curvilinear component. Instead, the free end portion 153 has a substantially planar outer surface. This configuration is beneficial because it ensures that the forces that are associated with the spring are applied to the free end 72 of the male terminal body 54. In contrast, the curvilinear extent of the spring arm 31 that is disclosed within FIGS. 4-8 of PCT/US2018/019787 do not apply a force in this manner disclosed herein.

Like the base spring sections 140a-140d, pairings of the spring arms 142a-142d are spaced a distance apart and are not connected to one another. Instead, an elongated spring arm opening or gap 157 extends between pairs of spring arms 142a-142d. These spring arm openings 157 define a first edge 160a and a second edge 160b of the spring arms 142a-142d, wherein a spring arm width 158 extends between said edges 160a, 160b. The first base edge 158a is aligned with the first spring arm edge 160a, and the second base edge 158b is aligned with the second spring arm edge 160b. As will be discussed in connection with FIGS. 11-12, the alignment of these edges 158a, 160a, 158b, and 160b alters the forces that are provided with the spring member 130 when the spring 130 and the connector system 10 are subjected to temperature extremes during thermal cycling. The spring finger apertures 150 are typically formed parallel to the first and second edges 160a, 160b of the spring arms 142a-142d. It should be understood that in other embodiments, these spring finger apertures 150 may not be parallel to the first and second edges 160a, 160b. Instead, the spring finger apertures 150 may be formed at an angle in comparison to the first edge 160a and/or the second edge 160b. For example, the angle between the bottom edge of the spring finger apertures 150 and the second edge 160b may be between 1° and 60°, preferably between 1° and 45°, and most preferably between 1° and 10°.

Due to the spring arm openings 157 and the spring finger apertures 150, the individual spring fingers 152a-152h are not contiguous with one another or connected to a structure other than the base section 140a-140d. This configuration allows facilitates omnidirectional movement of the spring fingers 152a-152h, which facilitates the electrical and mechanical coupling between the male terminal 54 and the female terminal 30. As discussed above, the number and dimensions of individual spring fingers 152a-152h, finger openings 150 and arm openings 157 may vary between embodiments of the spring member 130.

The spring biasing force, $S_{BF}$, is a component of the connector system 10 and helps ensure that the male terminal assembly 50 makes a proper mechanical and electrical connection with the female terminal 30. A designer of this connector system 10 may desire to alter the spring biasing force, $S_{BF}$, to: (i) meet customer specifications, (ii) meet USCAR specifications, including USCAR 25, and (iii) ensure proper mechanical and electrical connection with the female terminal. The spring biasing force, $S_{BF}$, is the amount of force that is applied by the spring member 52, 130 to resist the inward deflection of the free end 74 of the spring member 52, 130, when the male terminal assembly 50 is inserted within the female terminal 30. Specifically, this inward deflection occurs during insertion of the male terminal assembly 50 due to the fact that an extent of an outer surface 218 of the male terminal body 56 is slightly larger than the interior of the female terminal 30. Thus, when the male terminal assembly 50 is inserted into the female terminal 30, the extent of the outer surface 218 is forced towards the center 212 of the male terminal 52. This inward force on the outer surface 218 displaces the free end 74 of the spring member 52, 130 inward (i.e., towards the center 212). The spring member 52, 130 resists this inward displacement by providing a spring biasing, $S_{BF}$, force.

There are multiple ways of altering the spring biasing force, $S_{BF}$, of spring member 52, 130. Some ways of altering the spring biasing force, $S_{BF}$, includes: (i) changing the thickness of the spring members 52, 130, (ii) changing the material of the spring members 52, 130, or (iii) altering the configuration of the spring members 52, 130. FIGS. 5-10 show two different embodiments of spring members 52, 130 that have: (i) the same thickness (e.g., between 0.50 mm and 2 mm and specifically between 0.8 mm and 1.2 mm), (ii) are made out of the same material (e.g., spring steel) and (iii) the same length of the spring fingers 94a-94h, 152a-152h (between 3.80 mm and 16.25 mm and specifically between 7.60 mm and 9 mm). Thus, the primary differences between these embodiments include two alterations to the configuration of the spring members 52, 130, which include: (i) recess 162 and associated strengthening rib 164 and (ii) the width 104, 156 of the base spring sections 82a-82d.

Figure 11:
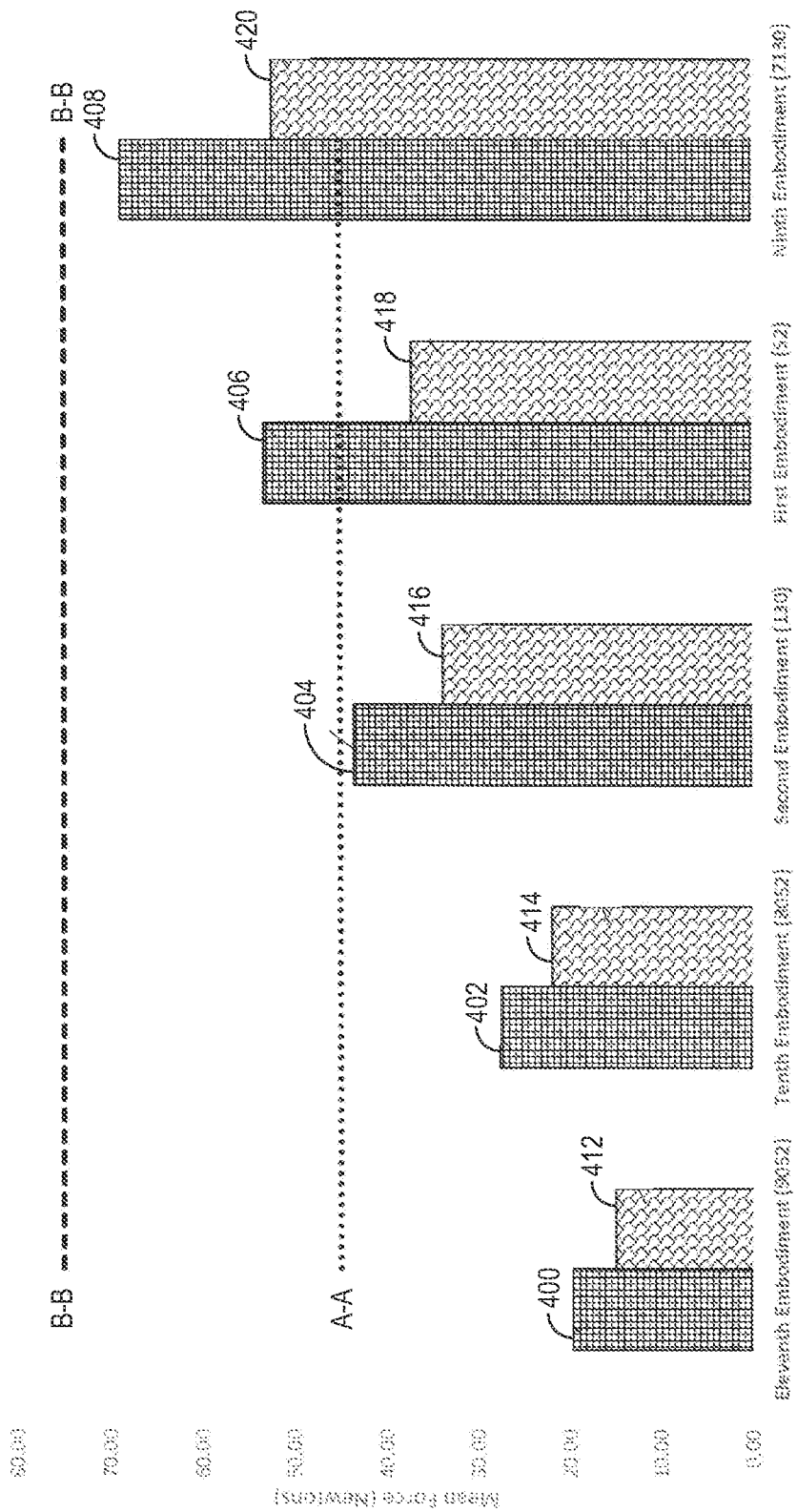
FIG. 11 is a graph showing the forces associated with various spring member embodiments, including the first spring embodiment, shown in FIGS. 5-7, and second spring member embodiment, shown in FIGS. 8-10.
Figure 12:
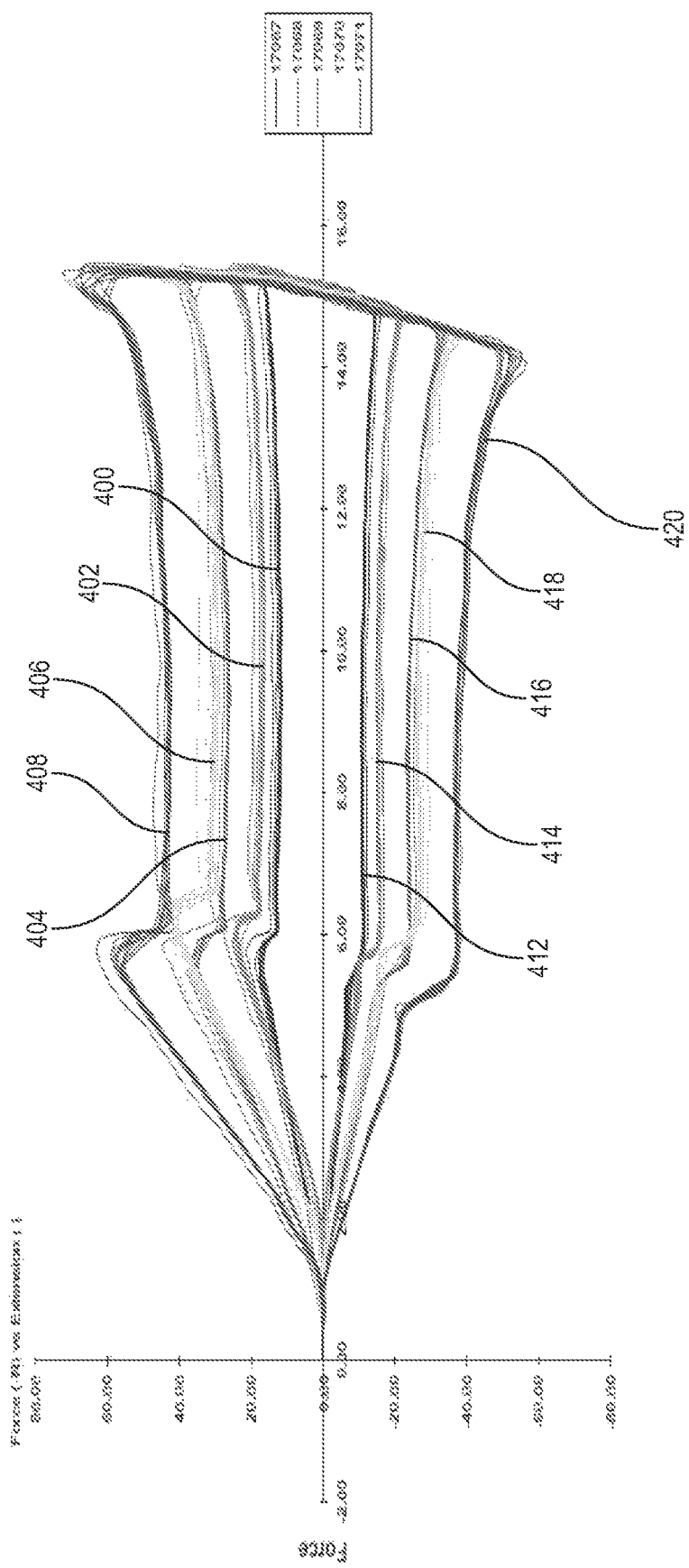
FIG. 12 is a graph showing the mean forces associated with various spring embodiments, including the first spring embodiment, shown in FIGS. 5-7, and second spring member embodiment, shown in FIGS. 8-10.
Figure 13:
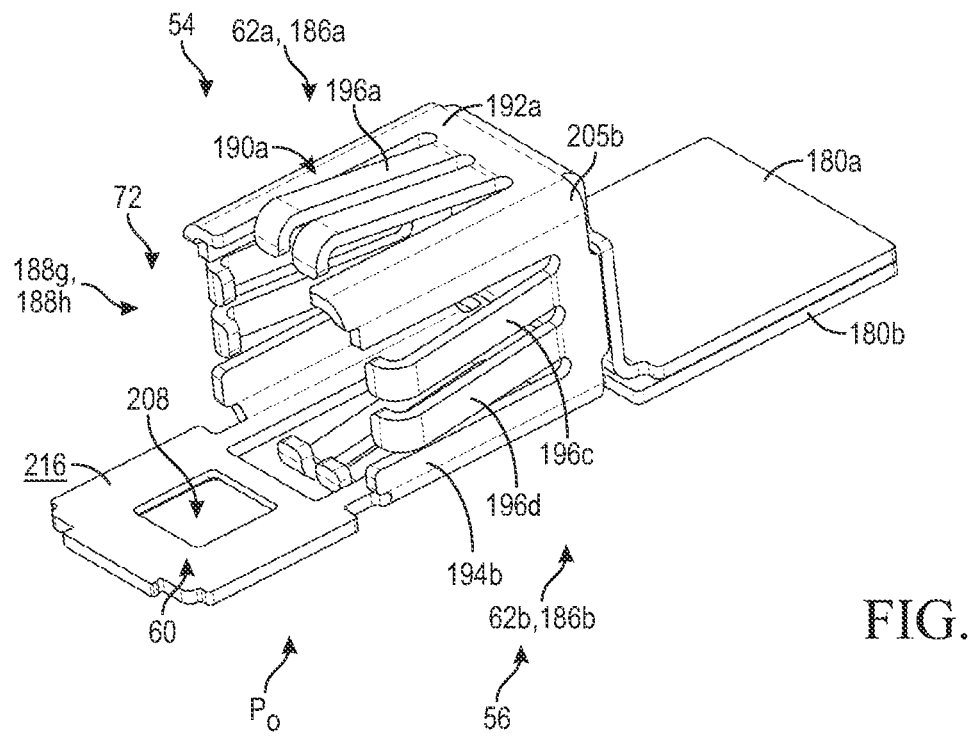
FIG. 13 is a frontal isometric view of the male terminal shown in FIG. 3, wherein a wall of the male terminal is in the open position, Po.

The graphs depicted in FIGS. 11-12 show how alterations to the configuration of the spring members 52, 130 directly impact the insertion force and extraction force associated with the male terminal assembly 50. The differences in the graphed insertion forces and extraction forces are directly proportional to changes in the spring biasing force, $S_{BF}$ because all other factors were held constant during the creation of the graphs depicted in FIGS. 11-12. Specifically, FIG. 11 shows five different embodiments of a spring member 52, 130, 7130, 8052, and 9052. The vertical axis of the graph displays the average maximum insertion force and extraction for each of these five spring embodiments. The insertion forces for each spring member are shown by the bar on the left 400, 402, 404, 406, 408, which has vertical and horizontal cross-hatching. The extraction forces for each spring member are shown by the bar on the right 412, 414, 416, 418, 420, which has a diagonal cross-hatching. The line labeled A-A denotes 45 newtons, which is the maximum amount of force that is permitted by a connector that meets class 2 of USCAR 25. The line labeled B-B denotes 75 newtons, which is the maximum amount of force that is permitted by a connector that meets class 3 of USCAR 25. The maximum averages are shown in FIG. 11 were taken from the forces associated with ten insertions and extractions that are shown in FIG. 12. In particular, FIG. 12 shows the insertion and extract forces in newton graphed against insertion/extraction distance.

The first, tenth, and eleventh embodiments have similar features, while the primary difference between these embodiments is the thickness of the spring member 52, 8052, and 9052. The second and ninth embodiments have similar features, while the primary difference between these embodiments is the thickness of the spring member 130 and 7130. The thickness of the eleventh embodiment of the spring member 9052 was the thinnest of the graphed embodiments and was approximately 25% thinner than the tenth embodiment of the spring member 8052. The tenth embodiment of the spring member 8052 was the second thinnest of the graphed embodiments and was approximately: (i) 25% thicker than the eleventh embodiment of the spring member 9052 and (ii) 25% thinner than the second embodiment of the spring member 130. The first and second embodiments 52, 130 have the same thickness, which is approximately: (i) 25% thicker than the tenth embodiment of the spring member 8052 and (ii) 25% thinner than the ninth embodiment of the spring member 7130.

Based on these graphs in FIGS. 11-12, the first embodiment of the spring member 52 has a higher insertion force and thus a larger spring biasing force, $S_{BF}$, in comparison to the second embodiment of the spring member 130. Likewise, the second embodiment of the spring member 130 has a lower insertion force and thus a smaller spring biasing force, $S_{BF}$, in comparison to the first embodiment of the spring member 52. The graphs also show that the utilization of any one of these spring members 52, 130, 7130, 8052, and 9052 in connection with a male terminal 54 will meet the insertion and extraction requirements for a class 3 connection under USCAR 25. In addition, the graphs show that the utilization of the eleventh, tenth, and second embodiments of the spring members 130, 8052, and 9052 in connection with a male terminal 54 will meet the insertion and extraction requirements for a class 2 connection under USCAR 25.

The spring member 52, 130 is typically formed from a single piece of material (e.g., metal). Therefore, the spring member 52, 130 is a one-piece spring member 52, 130 or has integrally formed features. In particular, the following features are integrally formed: (i) the rear spring wall 70, 134, (ii) the curvilinear sections 80a-80d, 138a-138d, (iii) the base spring sections 82a-82d, 140a-140d, and (iii) the spring finger 94a-94h, 152a-152h. To integrally form these features, the spring member 52, 130 is typically formed using a die forming process. The die forming process mechanically forces the spring member 52, 130 into shape. As discussed in greater detail below, when the spring member 52, 130 is formed from a flat sheet of metal, installed within the male terminal 54 and connected to the female terminal 30, and is subjected to elevated temperatures, the spring member 52, 130 applies an outwardly directed spring thermal force, $S_{TF}$, on the contact arms 188a-188h due in part to the fact that the spring member 52, 130 attempts to return to a flat sheet. However, it should be understood that other types of forming the spring member 52, 130 may be utilized, such as casting or using an additive manufacturing process (e.g., 3D printing). In other embodiments, the features of the spring member 52, 130 may not be formed from a one-piece or be integrally formed, but instead formed from separate pieces that are welded together.

FIGS. 2-4 and 13-38 show the first embodiment of the male terminal 54 that includes the male terminal body 56 and at least one male terminal connection plate 58. Specifically, FIGS. 2-4 and 13-38 show a male terminal 54 that includes two connection plates, wherein the first or top connection plate 180a is directly coupled to the second or bottom connection plate 180b. The connection plates 180a, 180b are configured to receive an extent of a structure (e.g., wire, as shown in FIG. 2) that electrically connects the male terminal assembly 50 to a device (e.g., an alternator) external to the connector system 10. The wire 22 is typically welded to one of the connection plates 180a, b (shown in FIG. 2). However, other methods (e.g., forming the wire 22 as a part of the connection plate 58) of connecting the wire 22 to the connection plate 58 are contemplated by this disclosure.

Figure 14:
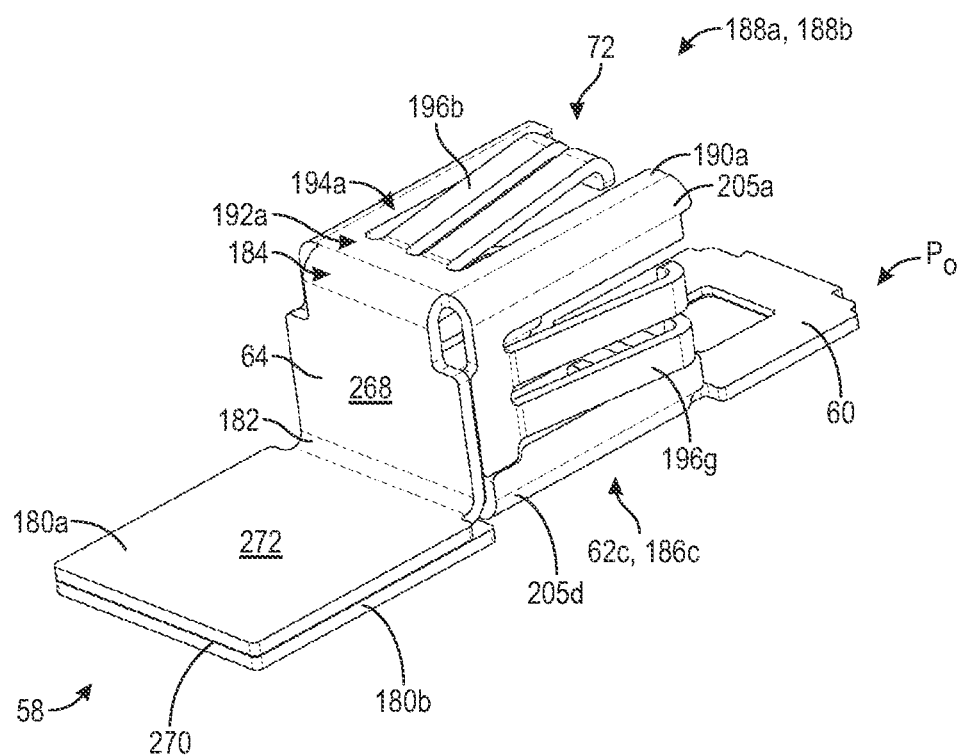
FIG. 14 is a rear isometric view of the male terminal shown in FIG. 3, wherein a wall of the male terminal is in the open position, Po.
Figure 18:
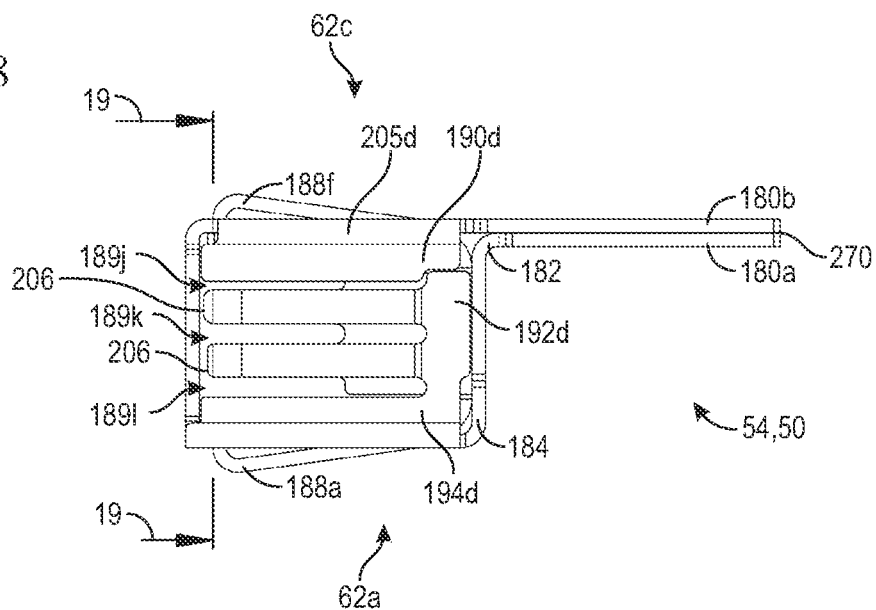
FIG. 18 is a left view of the male terminal assembly shown in FIG. 15.

As shown in FIGS. 14 and 15, the bottom connection plate 180b is directly coupled to an extent of a male terminal side wall 62c. Meanwhile the top connection plate 180a is coupled to a first male terminal curvilinear section 182, which positions the top connection plate 180a substantially perpendicular to the rear male terminal wall 64. This configuration allows for the wire 22 to be positioned substantially parallel to the direction of travel while the male terminal assembly 50 is inserted into the female terminal assembly 30. Alternatively, the first male terminal curvilinear section 182 may be omitted and the connection plate 58 may be positioned substantially parallel to the rear male terminal wall 64. In this alternative configuration, the wire 22 will be positioned substantially perpendicular to the direction that the male terminal assembly 50 is inserted into the female terminal 30. It should be further understood, that the connection plate 58 may have a different orientation (e.g., between parallel and perpendicular) in comparison to the rear male terminal wall 64.

As best shown in FIGS. 14 and 28-29, the rear male terminal wall 64 is positioned adjacent to an extent of the plurality of male terminal side walls 62a-62d. In particular, the rear male terminal wall 64 is coupled to a second male terminal curvilinear section 184, wherein the second male terminal curvilinear section 184 is coupled to one male terminal side wall 62a of the plurality of male terminal side walls 62a-62d. The rear male terminal wall 64 is coupled to one male terminal side wall 62a through an intermediate structure (e.g., second male terminal curvilinear section 184), while not being coupled to the other three male terminal side walls 62b, 62c, 62d through a structure other than one of the male terminal side walls 62a-62d. In other words, there is a gap that is formed between the rear male terminal wall 64 and three of the male terminal side walls 62b-62d (see FIGS. 14 and 16). In other embodiments, the rear male terminal wall 64 may be coupled to each of the plurality of male terminal side walls 62a-62d. For example, the rear male terminal wall 64 may be directly coupled to three male terminal side walls 62a, 62b, and 62d. The second male terminal curvilinear section 184 enables the rear male terminal wall 64 to be positioned substantially perpendicular to an extent of the plurality of male terminal side walls 62a-62d. It should be further understood, that the rear male terminal wall 64 may have a different orientation (e.g., not perpendicular) in comparison to the plurality of male terminal side walls 62a-62d.

As shown in FIGS. 3-4 and 13-38, the plurality of male terminal side walls 62a-62d are coupled to one another by a curvilinear shoulder 205a-205d, wherein a shoulder 205 is positioned between a pair of adjacent side walls 62 and features a smooth outer radius. The arrangement of the curvilinear shoulders 205a-205d and the side walls 62a-62d enable the male terminal body 56 to have a rectangular prism configuration and more specifically, in the embodiment shown in FIGS. 3-4 and 13-38, a cubic configuration. Each of the male terminal side walls 62a-62d include: (i) a generally U-shaped side wall portion 186a-186d, (ii) contact arms 188a-188h, and (iii) a plurality of contact arm openings 189a-189l. As best shown in FIGS. 13-15 and 27, the side wall portion 186a-186d is substantially planar and has a U-shaped configuration comprised of three substantially linear segments 190a-190d, 192a-192d, 194a-194d. Specifically, the first and third substantially linear segments 190a-190d, 194a-194d are (i) end segments that have approximately the same length and (ii) are positioned parallel to one another. The second substantially linear segment 192a-192d: (i) is an intermediate segment that extends between both the first and third substantially linear segments 190a-190d, 194a-194d, (ii) is shorter than the first and third substantially linear segments 190a-190d, 194a-194d, and (iii) is adjacent to the second male terminal curvilinear section 184. The combination of the three third substantially linear segments 190a-190d, 194a-194d forms an aperture 101 within the side walls 62a-62d that contains the contact arms 188a-188h. It should be understood that the lengths of the substantially linear segments 190a-190d, 192a-192d, 194a-194d can be changed based upon the design characteristics of the male connector 54, including but not limited to its current carrying capacity during operation of the system 10. For example, as shown in FIGS. 59-68, the intermediate segment 192a-192d is longer than either of the first or third substantially linear segments 190a-190d, 194a-194d.

As best shown in FIGS. 13-15 and 27-29, the contact arms 188a-188h extend: (i) from the second substantially linear segment or intermediate segment 192a-192d at outward angle, (ii) away from the rear male terminal wall 64, (iii) across an extent of the contact arm openings 189a-189l, and (iv) terminate just short of the front wall 60. As will be discussed in greater detail in other sections of this application, this configuration is beneficial over the configuration of the terminals shown in FIGS. 9-15, 18, 21-31, 32, 41-42, 45-46, 48 and 50 in PCT/US2018/019787 because the male terminal 54 (i) can be shorter in overall length, which means less metal material is needed for formation and the male terminal 52 can be installed in narrower, restrictive spaces, (ii) has a higher current carrying capacity, (iii) is easier to assemble, and (iv) has other beneficial features that are disclosed herein or can be inferred by one of ordinary skill in the art from this disclosure. It should be understood that the number and the configuration of the contact arms 188a-188h may be changed in other embodiments. For example, the male terminal side walls 62a-62d may each have more contact arms 188a-188h (e.g., 4-20) or less contact arms (e.g., 1). As another example, the number of contact arms 188a-188h for each male terminal side wall 62a-62d may not be equal. Specifically, one male terminal side wall 62b may have zero contact arms 188a-188h, while another male terminal side wall 62a may have one or more contact arms 188a-188h.

The plurality of contact arm openings 189a-189l extend along the length of the contact arms 188a-188h in order to create a configuration that permits the contact arms 188a-188h not to be laterally connected to: (i) another contact arm 188a-188h, (ii) the substantially linear end segments 190a-190d, 194a-194d, or (iii) a structure other than the substantially linear intermediate segment 192a-192d (e.g., not the front male terminal wall 60). This configuration allows for omnidirectional expansion of the contact arms 188a-188h, which facilitates the mechanical and electrical coupling between the male terminal 54 and the female terminal 30. As discussed in other sections of this application, the width 193 of the contact arms 188a-188h and contact arm openings 189a-189l may vary between embodiments.

Also, the configuration of the contact arms 188a-188h and the plurality of contact arm openings 189a-189l positions the contact arms 188a-188h within the periphery of the U-shaped side wall portion 186a-186d. This configuration is beneficial over the terminal configuration shown in FIGS. 3-8 in PCT/US2018/019787 because the configuration described therein: (i) provides improved structural rigidity to the connector system 10 to enable the connector system 10 to meet the requirements of the USCAR Specifications and (ii) reduces failures of the connector system 10 due to the fact the contact arms 188a-188h cannot be partially or fully displaced between the spring arms 84a-84d, 142a-142d. Additionally, this configuration places the contact arm openings 189a-189l parallel to the first and third substantially linear segments 190a-190d, 194a-194d of the male terminal side walls 62a-62d and are aligned with the spring arm openings 98, 157. This configuration of openings 157, 189a-189l forms the same number of spring fingers 94a-94h, 152a-152h as the number of contact arms 188a-188h. In other words, FIGS. 19-20 and 22-23 show eight spring fingers 94a-94h, 152a-152h and eight contact arms 188a-188h. Additionally, these figures show that the width 168, 170 of the spring fingers 94a-94h, 152a-152h substantially matches the width 193 of the contact arms 188a-188h.

Stated another way, the spring fingers 94a-94h, 152a-152h are dimensioned so that the terminal end 206a-206h of the free end portion 72 contacts the planar outer surface 93, 143 of the spring fingers 94a-94h, 152a-152h. This configuration places the terminal end 206a-206h below, and thus within, the outer surface 250 of the male terminal side walls 62a-62d. In other words, the terminal end 206a-206h resides within the receiver 66 of the male terminal 54. It should be understood that in other embodiments, the number of spring fingers 94a-94h, 152a-152h may not match the number of contact arms 188a-188h. For example, there may be fewer one spring fingers 94a-94h, 152a-152h for every two contact arms 188a-188h. Similarly, in other embodiments (see FIGS. 59-86), the width 168, 170 of the spring fingers 94a-94h, 152a-152h may be wider than the width 193 of the contact arms 188a-188h.

It should be understood that in other embodiments, these contact arm openings 189a-189l may not be parallel to the first and third substantially linear segments 190a-190d, 194a-194d or may not be aligned with the spring arm openings 98, 157. Instead, the contact arm openings 189a-189l may be formed at an angle in comparison to the first substantially linear segment 190a-190d or third substantially linear segment 194a-194d. For example, the angle between the top edge of the third substantially linear segment 194d and the bottom edge of the contact arm openings 189l may be between 1° and 60°, preferably between 1° and 45°, and most preferably between 1° and 10°. Additionally, in this example alternative embodiment, contact arm openings 189a-189l may or may not be aligned with the spring arm openings 98, 157.

The embodiment shown in FIGS. 2-4 and 13-38 displays a male terminal body 56 that has eight contact arms 188a-188h, which are formed by twelve contact arm openings 189a-189l. A layout of one of the male terminal side wall 62a is described below. It should be understood that the other male terminal side walls 62b-62d have a similar layout. Specifically, male terminal side wall 62a has a first contact arm opening 189a that is positioned between the first substantially linear segment 190a and a first contact arm 188a, which is designed to separate the first contact arm 188a from the first substantially linear segment 190a. The male terminal side wall 62a has a second contact arm opening 189b positioned between the first contact arm 188a and a second contact arm 188b, which is designed to separate the first contact arm 188a from the second contact arm 188b. The male terminal side wall 62a has a third contact arm opening 189c positioned between the second contact arm 188b and the third substantially linear segment 194a, which is designed to separate the second contact arm 188b from the third substantially linear segment 194a. It should be understood that other arrangements of openings 189a-189l and contact arms 188a-188h are contemplated by this disclosure. For example, other configurations are shown in connection with the male terminals disclosed in connection with embodiments two through seven.

The contact arms 188a-188h include: (i) a first contact arm section 196a-196h, (ii) a second or curvilinear contact arm section 198a-198h, and (iii) a third contact arm section 200a-200h. The first contact arm section 196a-196h is integrally formed with the intermediate segment 192a-192d and extends away from the rear male terminal wall 64 at an outward angle. In particular, the outward angle may be between 0.1 degree and 16 degrees between the outer surface 195 of the intermediate segment 192a-192d and the outer surface 197 of the first contact arm section 196a-196h, preferably between 5 degrees and 12 degrees and most preferably between 7 degrees and 8 degrees. This outward angle is shown in multiple figures, but may be best visualized in connection with FIGS. 22-23. Specifically, FIGS. 22-23 show cross-sectional views that are taken approximately to the transition between the first contact arm section 196a-196h and the curvilinear contact arm section 198a-198h. These views show a gap 213, which has a height 202, that extends between the inner surface 199 of the first contact arm section 196a-196h and the outer surface 93, 143 of the spring fingers 94a-94h, 152a-152h. At its greatest point, the gap 213 has a height 202 that is between 0.50 mm and 4 mm, and most preferably between 1.3 mm and 1.5 mm. This configuration allows the contact arms 188a-188h to be deflected inward or towards the center 212 of the male terminal 54 by the female terminal 30, when the male terminal assembly 50 is inserted into the female terminal 30. This inward deflection helps ensure that a proper mechanical and electrical connection is created by ensuring that the contact arms 188a-188h are placed in contact with the female terminal 30.

Figure 19:
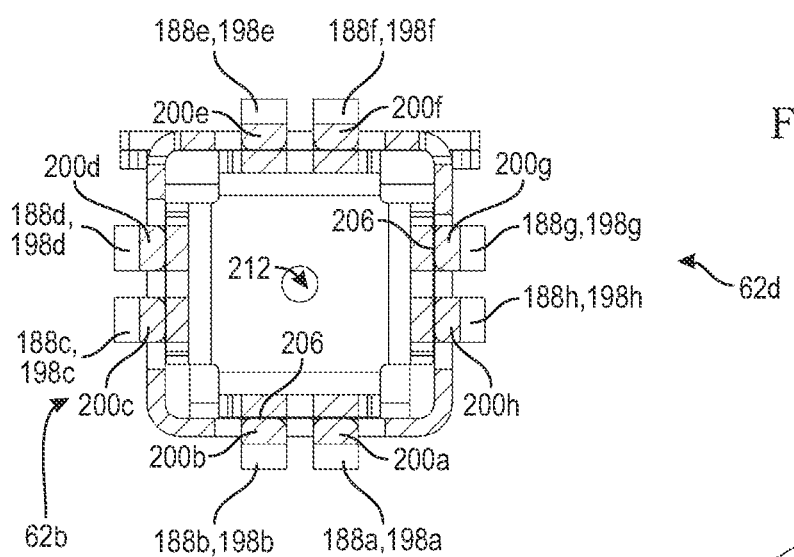
FIG. 19 is a frontal cross-sectional view of the male terminal assembly shown in FIG. 15, taken along the 19-19 line of FIG. 18.
Figure 20:
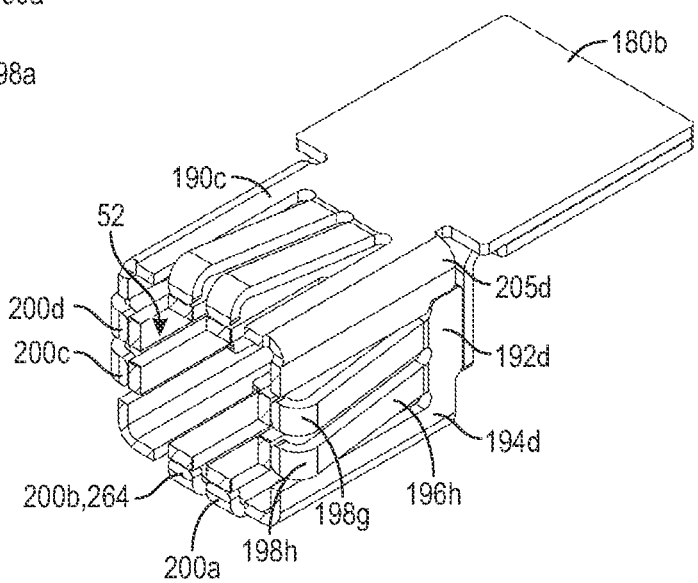
FIG. 20 is a frontal isometric cross-sectional view of the male terminal assembly shown in FIG. 15, taken along the 19-19 line of FIG. 18.

The curvilinear contact arm section 198a-198h extends from the first contact arm section 196a-196h and is positioned adjacent to an extent of the first contact arm section 196a-196h that is opposite of the intermediate segment 192a-192d. FIGS. 19-20 best show that when the spring member 52, 130 is positioned within the male terminal receiver 66, the curvilinear contact arm section 198a-198h positions the third contact arm section 200a-200h: (i) substantially perpendicular to the spring fingers 94a-94h, 152a-152h of the spring member 52, 130 and (ii) in contact with the outer surface 93, 143 of the spring fingers 94a-94h, 152a-152h. The curvilinear contact arm section 198a-198h has an arc length that is between 7.6 mm and 0.5 mm and preferably between 2.3 mm and 2.8 mm. This arced configuration facilitates the insertion of the male terminal body 56 into the female terminal 30. If the arc length is increased, then the slope of the line (e.g., line that extends from 0 to about 6) that is shown on FIGS. 11-12 may be decreased, but the distance of the insertion force may increase (e.g., the line may extend past 8). If the arc length is decreased, then the slope of the line (e.g., line that extends from 0 to about 6) that is shown on FIGS. 11-12 may be increased, but the distance of the insertion force may decrease (e.g., the line may be shortened to stop at 4). Accordingly, the designer of the male terminal 54 balances the length of the arc to obtain the desired insertion forces.

As shown in FIGS. 19-20 and 28-29, the third contact arm section 200a-200h extends from the curvilinear contact arm section 198a-198h and is substantially perpendicular to: (i) the side wall portion 186a-186d and (ii) the spring fingers 94a-94h, 152a-152h, when the spring member 52, 130 is inserted into the male terminal receiver 66. This configuration is beneficial over the configuration shown in FIGS. 3-8 in PCT/US2018/019787 because the assembler of the male terminal assembly 54 does not have to apply a significant force in order to deform a majority of the contact arms 188a-188h outward to accept the spring member 52, 130. This significant force on the contact arms 188a-188h deforms an extent of the spring member 52, 130. This deformation can best be shown in FIG. 6 of PCT/US2018/019787 due to the slope of the contact arm 11 and the fact the outer surface of the spring arm 31 and the inner surface of the contact arm 11 are adjacent to one another without a gap formed therebetween. This deformation of the spring arms 94a-94h may have a negative effect on spring's biasing force. For example, this inward deformation may not allow the spring arms to return to their original state; thus, compromising the functionality of the spring. In contrast to FIGS. 3-8 in PCT/US2018/019787, FIGS. 20, 22-23, 28-29 of the present application show a gap 213 that is formed between the outer surfaces 90, 93, 143, 148 of the spring member 52, 130 and the inner surface 199 of the contact arms 188a-188h. Accordingly, very little force is required to insert the spring member 52, 130 into the receiver 66 due to the fact the user does not have to force the contact arms 188a-188h to significantly deform during the insertion of the spring 53, 130.

As shown in FIGS. 25-29, when the spring member 54, 130 is inserted into the male terminal receiver 66 and is in the assembled state, $S_F$, the rear spring wall 70, 134 is placed in adjacent to the rear male terminal wall 64 and the base section 82a-82d is positioned adjacent to the intermediate segment 192a-192d. This placement of the rear spring wall 70, 134 substantially aligns the free ends 72, 74 of the spring member 52, 130 and the male terminal body 56. More specifically, the free end 74 of the spring fingers 94a-94h, 152a-152h extend slightly past the free end 72 of the third contact arm sections 200a-200h. However, the free end 74 of the spring fingers 94a-94h, 152a-152h terminate just short of the inner surface 216 of the front male terminal wall 60. In other words, the gap 210 between the inner surface 216 of the front male terminal wall 60 and the outermost edge 172, 174 of the free end 74 of the spring fingers 94a-94h, 152a-152h is less than the thickness of the contact arms 188a-188h. This configuration helps reduce failures of the connector by ensuring that the third contact arm section 200a-200h does not deform during usage, wherein the third contact arm section 200a-200h extends past the free end 74 of the spring fingers 94a-94h, 152a-152h.

FIGS. 3-4, 13-15, 17, and 33-34 show a touch proof probe opening 208 that is formed in the front male terminal wall 60 of the male terminal body 56. The touch proof probe opening 208 has a substantially rectangular shape and more specifically a substantially square shape. The touch proof probe opening 208 is configured to receive a touch proof probe, which is described in greater detail within PCT application entitled Electrical Connector System With Internal Spring Component. Overall, the touch proof probe and touch proof probe opening are designed and configured to reduce the chance that a foreign object (e.g., human finger) is placed in contact with the male terminal 54 or the female terminal 30. The shape of the touch proof probe opening 208 is configured to substantially match the touch proof probe and may also match the overall shape of the male terminal body 56. However, it should be understood that the touch proof probe opening 208 may not match the shape of the male terminal body 56 and/or the shape of the touch proof probe may be altered to a different shape, including round, triangular, hexagonal or polygonal.

The male terminal 54 is typically formed from a single piece of material (e.g., metal). Therefore, the male terminal 54 is a one-piece male terminal 54 and has integrally formed features. In particular, the bottom connection plate 180b is integrally formed with one 62c of the plurality of male terminal side walls 62a-62d and specifically is integrally formed with the intermediate segment 192c. Additionally, the top connection plate 180a is integrally formed with: (i) the first male terminal curvilinear section 182, (ii) the second male terminal curvilinear section 184 and (iii) one 62a of the plurality of male terminal side walls 62a-62d. Further, the first contact arm section 196a-196h is integrally formed with: (i) one 62a of the plurality of male terminal side walls 62a-62d and specifically with the intermediate segment 192a, (ii) curvilinear contact arm section 198a, and (iii) third contact arm section 200a. To integrally form these features, the male terminal 54 is typically formed using a die cutting process. However, it should be understood that other types of forming the male terminal 54 may be utilized, such as casting or using an additive manufacturing process (e.g., 3D printing). In other embodiments, the features of the male terminal 54 may not be formed from one-piece or be integrally formed, but instead formed from separate pieces that are welded together.

Figure 30:
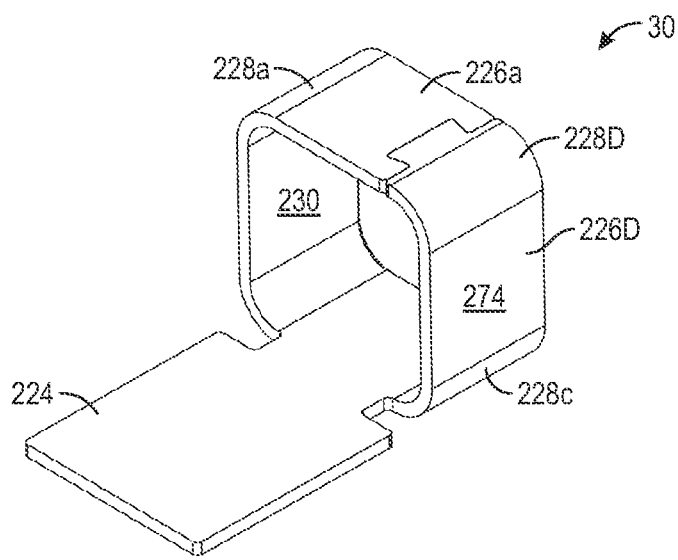
FIG. 30 is a rear isometric view of a female terminal shown in FIG. 2.
Figure 31:
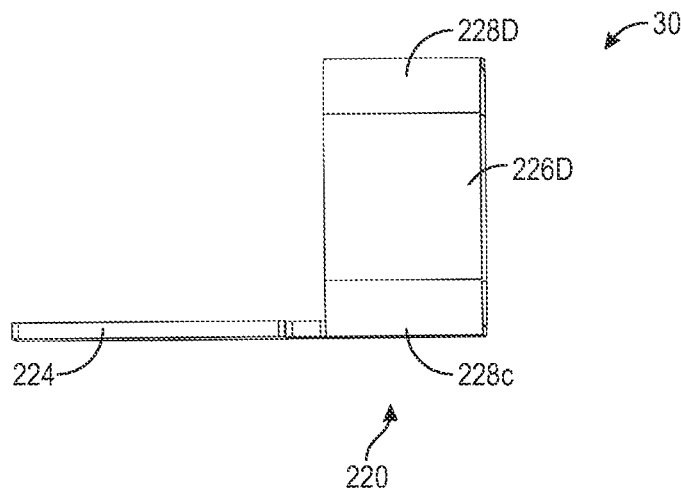
FIG. 31 is a left view of the female terminal shown in FIG. 31.
Figure 32:
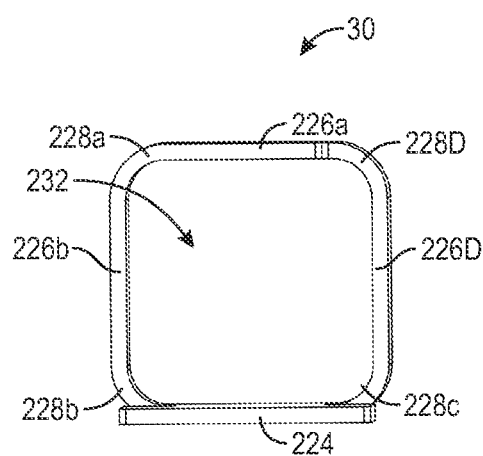
FIG. 32 is a rear view of the female terminal shown in FIG. 31.
Figure 33:
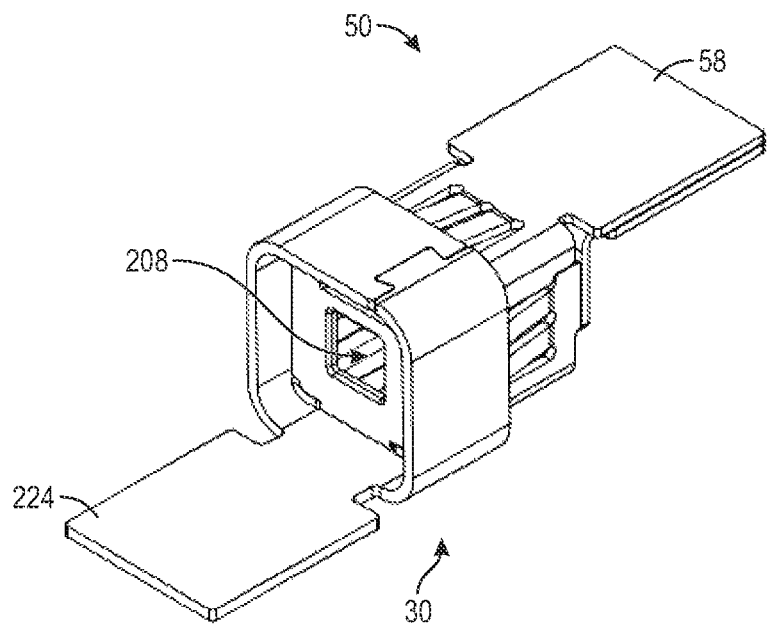
FIG. 33 is an isometric view of the male terminal assembly and the female terminal in a connected position.

FIGS. 30-32 depict various views of the female terminal 30. The female terminal 30 includes: (i) a female terminal body 220 and (ii) a female terminal connection plate 224. The connection plate 224 is directly connected to the female terminal body 220 and is configured to receive an extent of a structure (e.g., wire 28, as shown in FIG. 2) that connects the female terminal 30 to a structure (e.g., a radiator fan) outside of the connector system 10. The wire 28 is typically welded to the top connection plate 224 (shown in FIG. 2). However, other methods (e.g., forming the wire 28 as a part of the connection plate 224) of connecting the wire 28 to the connection plate 224 is contemplated by this disclosure.

The female terminal body 220 is substantially tubular and is comprised of: (i) a plurality of female terminal side walls 226a-226d and (ii) a plurality of female terminal curvilinear sections 228a-228d. The plurality of terminal curvilinear sections 228a-228d are coupled to the plurality of female terminal side walls 226a-226d to form a rectangular shape. Specifically, one female terminal side wall 226a of the plurality of female terminal side walls 226a-226d is: (i) substantially parallel with another one female terminal side wall 226c of the plurality of female terminal side walls 226a-226d and (ii) substantially perpendicular to two female terminal side wall 226b, 226d of the plurality of female terminal side walls 226a-226d. The female terminal body 220 has an inner surface 230 that defines a female terminal receiver 232. The female terminal receiver 232 is designed and configured to be coupled, both electrically and mechanically, to an extent of the male terminal 54, when the male terminal 54 is inserted into the female terminal receiver 232.

The female terminal 30 is typically formed for a single piece of material (e.g., metal). Therefore, the female terminal 30 is a one-piece female terminal 30 and has integrally formed features. In particular, the connection plate 224 is integrally formed with female terminal body 220 and specifically is integrally formed with the one female terminal side wall 226c. Additionally, each female terminal curvilinear sections 228a-228d is integrally formed with at least one of the plurality of female terminal side walls 226a-226d. To integrally form these features, the female terminal 30 is typically formed using a die cutting process. However, it should be understood that other types of forming the female terminal 30 may be utilized, such as casting or using an additive manufacturing process (e.g., 3D printing). In other embodiments, the features of the female terminal 30 may not be formed from one-piece or be integrally formed, but instead formed from separate pieces that are welded together.

Figure 37:
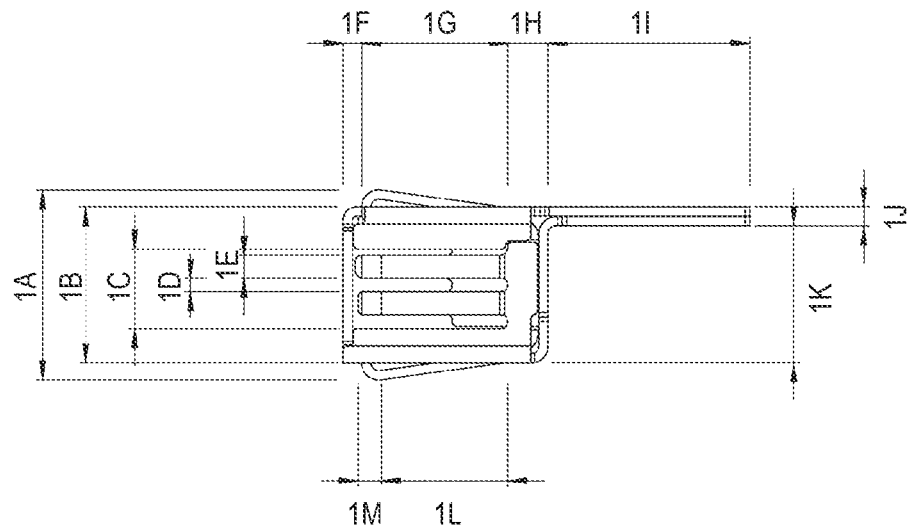
FIG. 37 is a left view of the male terminal assembly shown in FIG. 15.
Figure 38:
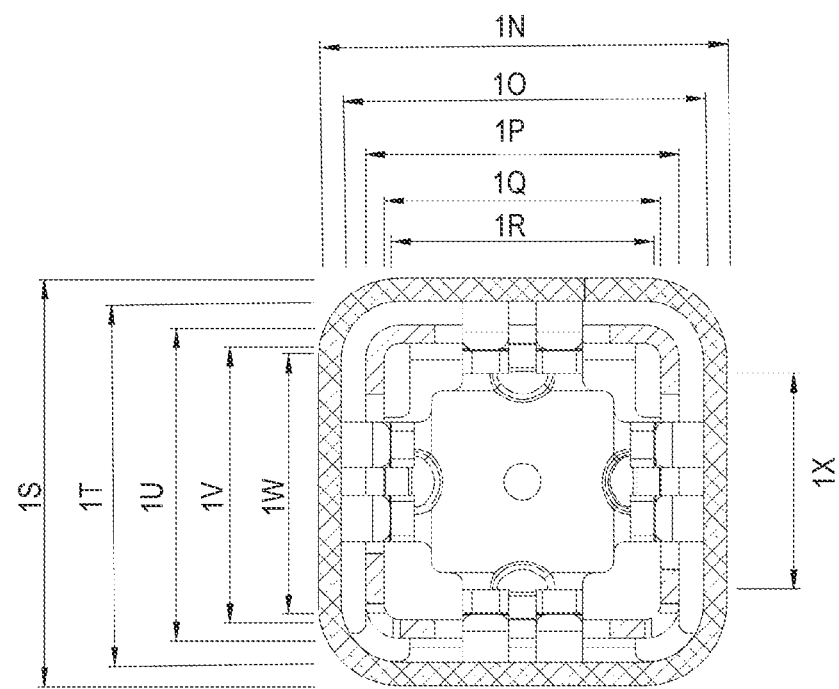
FIG. 38 is a cross-sectional view of the terminal assembly shown in FIG. 33, taken along the 36-36 line of FIG. 35.
Figure 39:
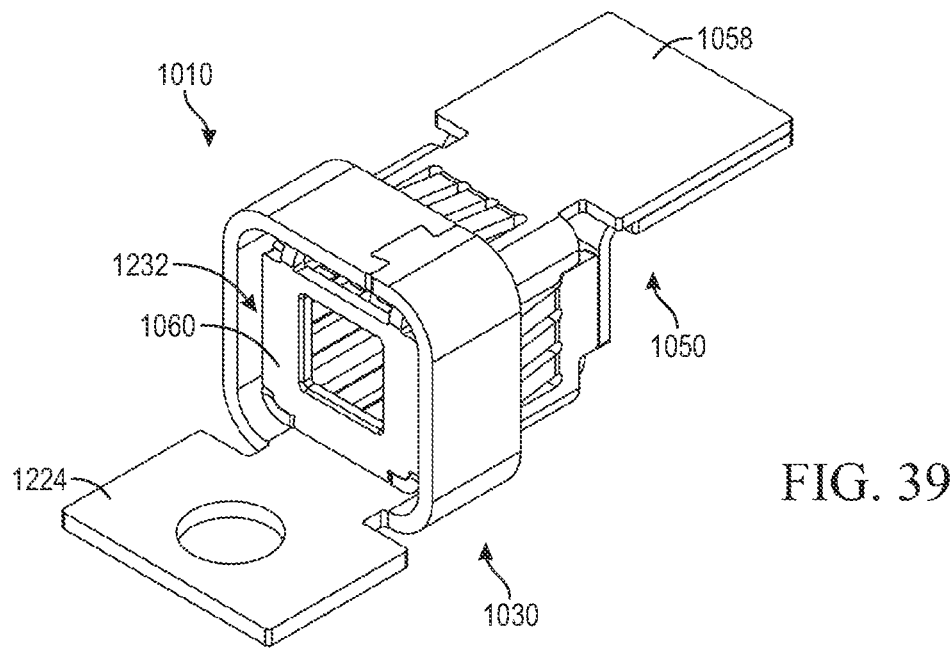
FIG. 39 is an isometric view of a second embodiment of a male terminal assembly and a female terminal in a connected position.

FIGS. 33-38 depict various views of the first embodiment of the male terminal assembly 50 within the female terminal 30. As shown in FIGS. 37-38 and discussed below, the combination of outer surfaces 218 of the contact arms 188a-188h form a rectangle that has a width/height that is slightly larger (e.g., between 0.1% and 15%) than the width/height of the rectangle that is associated with the female terminal receiver 232. When the slightly larger male terminal assembly 50 is inserted into the slightly smaller female terminal receiver 232, the outer surface 218 of the contact arms 188a-188h are forced towards the center 212 of the male terminal body 56. Because the outer surface 218 of the contact arms 188a-188h are forced towards the center 212 of the male terminal body 56, the free ends 74 of the spring member 52, 130 are also forced towards the center 212 of the male terminal body 56. The spring member 52, 130 resists this inward displacement by providing a spring biasing force, $S_{BF}$, (as depicted by the arrows labeled "$S_{BF}$" in FIG. 36). This spring biasing force, $S_{BF}$, is generally directed outward against the terminal end 206a-206h of the third contact arm sections 200a-200h. In other words, this spring biasing force, $S_{BF}$, provides a wedging or shimmering effect against the contact arms 188a-188h thereby holding the outer surfaces 218 of the contact arms 188a-188h in engagement with the female terminal 30.

FIGS. 33-38 also show that the connector system 10 provides a connector that is 360° compliant, which meets the certain car or automotive specifications. As shown in this embodiment, the contact arms 188a-188h are symmetrical and evenly spaced. The connector system 10 is 360° compliant because the outer surface 218 of the contact arms 188a-188h are in contact with each side wall 226a-226d of the female terminal 30 and the spring 54, 130 applies forces on the contact arms 188a-188h to force the contact arms 188a-188h into contact with each side wall 226a-226d. The 360° compliance attribute of the connector system 10 aids in maintaining mechanical and electrical connection under strenuous mechanical conditions, e.g., vibration. In a traditional blade or fork-shaped connectors, i.e., connection on only two opposing sides, vibration may develop a harmonic resonance that causes the connector to oscillate with greater amplitude at specific frequencies. For example, subjecting a fork-shaped connector to harmonic resonance may cause the fork-shaped connector to open. Opening of the fork-shaped connector during electrical conduction is undesirable because momentary mechanical separation of the fork-shaped connector from an associated terminal may result in electrical arcing. Arcing may have significant negative effects on the terminal as well as the entire electrical system of which the terminal is a component. However, the 360° compliance feature of the present disclosure may prevent catastrophic failures caused by strong vibration and electrical arcing.

The male terminal 54, including the contact arms 188a-188h, may be formed from a first material such as copper, a highly-conductive copper alloy (e.g., C151 or C110), aluminum and/or another suitable electrically conductive material. The first material preferably has an electrical conductivity of more than 80% of IACS (International Annealed Copper Standard, i.e., the empirically derived standard value for the electrical conductivity of commercially available copper). For example, C151 typically has 95% of the conductivity of standard, pure copper compliant with IACS. Likewise, C110 has a conductivity of 101% of IACS. In certain operating environments or technical applications, it may be preferable to select C151 because it has anti-corrosive properties desirable for high-stress and/or harsh weather applications. The first material for the male terminal 54 is C151 and is reported, per ASTM B747 standard, to have a modulus of elasticity (Young's modulus) of approximately 115-125 gigapascals (GPa) at room temperature and a coefficient of terminal expansion (CTE) of 17.6 ppm/degree Celsius (from 20-300 degrees Celsius) and 17.0 ppm/degree Celsius (from 20-200 degrees Celsius). The spring member 52, 130 may be formed from a second material such as spring steel, stainless steel (e.g., 301SS, ¼ hard), and/or another suitable material having greater stiffness (e.g., as measured by Young's modulus) and resilience than the first material of the male terminal 54. The second material preferably has an electrical conductivity that is less than the electrical conductivity of the first material. The second material also has a Young's modulus that may be approximately 193 GPa at room temperature and a coefficient of terminal expansion (CTE) of 17.8 ppm/degree Celsius (from 0-315 degrees Celsius) and 16.9 ppm/degree Celsius (from 0-100 degrees Celsius).

Based on the above exemplary embodiment, the Young's modulus and the CTE of the spring member 52, 130 is greater than the Young's modulus and the CTE of the male terminal 54. Thus, when the male terminal 54 is used in a high power application that subjects the connector system 10 to repeated thermal cycling with elevated temperatures (e.g., approximately 150° Celsius) then: (i) the male terminal 54 become malleable and loses some mechanical resilience, i.e., the copper material in the male terminal 54 softens and (ii) the spring member 52, 130 does not become as malleable or lose as much mechanical stiffness in comparison to the male terminal 54. Thus, when utilizing a spring member 52, 130 that is mechanically cold forced into shape (e.g., utilizing a die forming process) and the spring member 52, 130 is subjected to elevated temperatures, the spring member 52, 130 will attempt to at least return to its uncompressed state, which occurs prior to insertion of the male terminals assembly 50 within the female terminal 30, and preferably to its original flat state, which occurs prior to the formation of the spring member 52, 130. In doing so, the spring member 52, 130 will apply a generally outward directed thermal spring force, $S_{TF}$, (as depicted by the arrows labeled "$S_{TF}$" in FIG. 36) on the terminal ends 206a-206h of the contact arms 188a-188h. This thermal spring force, $S_{TF}$, is dependent upon local temperature conditions, including high and/or low temperatures, in the environment where the system 10 is installed. Accordingly, the combination of the spring biasing force, $S_{BF}$, and the thermal spring force, $S_{TF}$, provides a resultant biasing force, $S_{RBF}$, that ensures that the outer surface 218 of the contact arms 188a-188h are forced into contact with the inner surface 230 of the female terminal 30 when the male terminal 54 is inserted into the female terminal 30 and during operation of the system 10 to ensure an electrical and mechanical connection. Additionally, with repeated thermal cycling events, the male terminal assembly 50 will develop an increase in the outwardly directed resultant spring forces, $S_{RBF}$, that are applied to the female terminal 30 during repeated operation of the system 10.

FIGS. 37-38 show various measurements that are associated with the first embodiment of the connector system 10. It should be understood that these measurements are exemplary and shall not be limiting. Thus, a connector system 10 may have measurements that are multiple times larger than the below measurements or multiple times smaller than the below measurements. The first measurement or opposed contact arms height, which is labeled 1A, extends from the outer surface 218 of the contact arm 188a to the opposed outer surface 218 of contact arm 188f and is preferably less than 33 mm and more preferably between 19.5 mm and 13.0 mm. The second measurement or opposed side wall height, which is labeled 1B, extends from an outer surface 250 of the male terminal side wall 62c to an outer surface 250 of the opposed male terminal side wall 62a and is preferably less than 27.5 mm and more preferably between 16 mm and 11 mm. The third measurement, aperture width, or U-shaped width, which is labeled 1C, extends from an inner edge 252 of the first substantially linear segment 190d to an inner edge 254 of the third substantially linear segment 194*d* and is preferably less than 12.5 mm and more preferably between 8 mm and 5 mm.

The fourth measurement or spring finger width, which is labeled 1D, extends from an inner edge 256 of a contact arm 188*g* to an inner edge 258 of an adjacent contact arm 188*h* and is preferably less than 2.55 mm and more preferably between 1.5 mm and 1 mm. The fifth measurement or contact arm width, which is labeled 1E, extends from an inner edge 256 of a contact arm 188*g* to an opposed second edge 260 of the contact arm 188*g*; thus, the fifth measurement quantifies the width 193 of the contact arm 188*g* along with the width 168, 170 of the spring finger 94*g*, 152*g*. The fifth measurement is preferably less than 4 mm and more preferably between 2.55 mm and 1.5 mm. The sixth measurement, which is labeled 1F, extends from an outer surface 262 of the front male terminal wall 60 to an outer surface 264 of the third contact arm section 200*f* and is preferably less than 3 mm and more preferably between 1.75 mm and 1.25 mm. The seventh measurement or contact arm length, which is labeled 1G, extends from the outer surface 264 of the third contact arm section 200*f* to the forward most edge 266 of the intermediate segment 192*d*; thus, the seventh measurement quantifies the length of the contact arm 188*f*. The seventh measurement is preferably less than 25.5 mm and more preferably between 15.25 mm and 10.25 mm.

The eighth measurement, which is labeled 1H, extends from the forward most edge 266 of the intermediate segment 192*d* to the outer surface 268 of the rear male terminal wall 64 and is preferably less than 7 mm and more preferably between 4.25 mm and 2.8 mm. The ninth measurement or the connection plate length, which is labeled 1I, extends from the outer surface 268 of the rear male terminal wall 64 to the outer edge 270 of the male terminal connection plate 58 and is preferably less than 35 mm and more preferably between 21 mm and 14 mm. The tenth measurement, which is labeled 1J, extends between the outer surfaces of the top and bottom connection plates 180*a*, 180*b* and is preferably less than 3 mm and more preferably between 1.75 mm and 1 mm. The eleventh measurement, which is labeled 1K, extends from the outer surface 272 of the top connection plate 180*a* to the outer surface 250 of the male terminal side wall 62*a* and is preferably less than 24 mm and more preferably between 14.5 mm and 9.4 mm.

The twelfth measurement or the first contact arm section length, which is labeled 1L, extends along the length of the first contact arm section 196*h* and is preferably less than 22 mm and more preferably between 13 mm and 8.5 mm. The thirteenth measurement, which is labeled 1M, extends along the horizontal length of the second and third contact arm sections 198*h*, 200*h* and is preferably less than 4.06 mm and more preferably between 2.3 and 1.5 mm. The fourteenth and nineteenth measurements or the terminal width, which are labeled 1N and 1S, are substantially equal and extend from the outer surface 274 of the female terminal side wall 226*a* to the outer surface 274 to the opposed outer surface 274 side wall 226*c* and is preferably less than 35.5 mm and more preferably between 21.3 mm and 14.2 mm. The fifteenth and twenty measurements or the interior terminal width, which are labeled 1O and 1T, are substantially equal and extend from the inner surface 230 of the female terminal side wall 226*a* to the opposed inner surface 230 of the female terminal side wall 226*c* and is preferably less than 31.5 mm and more preferably between 21.3 mm and 14.2 mm.

Accordingly, the thickness of the female terminal 30 is less than 4.06 mm. The sixteenth and twenty-first measurements, which are labeled 1P and 1U, are substantially equal and extend from the outer surface 90 of the base spring section 82*a*, 140*a* to the outer surface 90 of the opposed base spring section 82*c*, 140*c* and is preferably less than 27.4 mm and more preferably between 16 mm and 11 mm. The seventeenth and twenty-second measurements, which are labeled 1Q and 1V, are substantially equal and extend from the inner surface 276 of the base spring section 82*a*, 140*a* to the inner surface 276 of the opposed base spring section 82*c*, 140*c* and is preferably less than 24.0 mm and more preferably between 14.2 mm and 9.4 mm. Accordingly, the thickness of the spring member 52, 130 is less than 3.5 mm. The eighteenth and twenty third measurements, which are labeled 1R and 1W, are substantially equal and extend from the terminal end 206 of the third contact arm section 200*a* to the terminal end 206 of the opposed third contact arm section 200*f* and is preferably less than 22.6 mm and more preferably between 13.5 mm and 8.5 mm. Accordingly, the distance between the outer surfaces 93 of the spring fingers 94*a*-94*h*, 152*a*-152*h* is approximately 5% less when the spring fingers 94*a*-94*h*, 152*a*-152*h* are inserted into the female terminal receiver 232. Finally, the twenty-third measurement, which is labeled 1X, extends from the inner surface 278 of the finger section 94*a*, 152*a* to the inner surface 278 of the opposed finger section 94*f*, 152*f* and is preferably less than 19.05 mm and more preferably between 11 mm and 7.5 mm. Accordingly, the thickness of the spring fingers 94*a*-94*h*, 152*a*-152*h* is less than 0.14.

FIGS. 39-48 show various views of a second embodiment of the connector system 1010. It should be understood that this second embodiment of the connector system 1010 contains structures, features and/or functions that are similar to the structures, features and/or functions disclosed in connection with the first embodiment of the connector system 10. Accordingly, reference numbers that are separated by 1000 will be used in connection with this second embodiment to denote the structures and/or features that are similar to the structures and/or features disclosed in the first embodiment. For example, the contact arms of the first embodiment are labeled 188*a*-188*h*, while the contact arms of the second embodiment are labeled 1188*a*-1188*l*. Therefore, one of ordinary skill in the art shall assume that the contact arms of the first embodiment 188*a*-188*h* have similar structures, features and/or functions in comparison to the contact arms of the second embodiment 1188*a*-1188*l*. Additionally, one of ordinary skill in the art shall understand that while the structures, features and/or functions are similar that does not mean the structures, features and/or functions are exactly the same. For example, the length of the contact arms 188*a*-188*h* of the first embodiment is shorter than the length of the contact arms 1188*a*-1188*h* of the second embodiment. Further, it should be understood that structures and/or features of this third embodiment may be used in connection with any other embodiment contained within this application or its related applications.

Like the first embodiment of the connector system 10, the second embodiment of the connector system 1010 includes: (i) a male terminal assembly 1050 and (ii) a female terminal 1030. The male terminal assembly 1050 has a spring member 1130 and a male terminal 1054. Like the second embodiment of the spring member 130, this third embodiment of the spring member 1130 includes: (i) a recess 1162 and an associated strengthening rib 1164, and (ii) the width of the base spring section 1140*a*-1140*d* is approximately equal to the width of the spring arms 1142*a*-1142*d*. Also, like the first embodiment of the male terminal 54, this second embodiment of the male terminal 1054 includes a plurality of contact arms 1188*a*-1188*l* that: (i) are integrally formed with a intermediate segment 1192*a*-1192*d* of the male terminal side walls 1062*a*-1062*d*, (ii) extend away from the connection plate 1058 and towards the front male terminal wall 1060 at an outwardly directed angle, (iii) extend across an extent of the contact arm openings 1189*a*-1189*p*, (iv) have a terminal end that is configured to contact the planar outer surface 1143 of the spring fingers 1152*a*-11521, and (v) have a third contact arm section 1200*a*-12001, which is configured to be positioned substantially perpendicular to the spring fingers 1152*a*-11521.

Also, like the first embodiment of the contact arm 188*a*-188*h*, the second embodiment of the contact arm 1188*a*-1188*l* are designed to interact with the internal spring member 1130. Like the disclosure discussed in connection with FIGS. 33-36, the contact arms 1188*a*-1181 are depressed or deflected inward (i.e., towards the center 1212 of the male terminal 1054), when the male terminal assembly 1050 is inserted within the female terminal receiver 1232. Also, as discussed above in connection with FIG. 36, the spring member 1130 applies both a spring biasing force, $S_{BF}$, and a spring thermal force, $S_{TF}$, on the contact arms 1188*a*-1188*l* to create a 360 degree mechanical and electrical connection with the female terminal 1030.

One difference between the first embodiment of the connector system 10 and the second embodiment of the connector system 1010 is the fact that the second embodiment of the female terminal 1030 is designed to be directly coupled to a device (e.g., alternator), while the first embodiment of the female terminal 30 is designed to be directly coupled to a wire 28 (as shown in FIG. 2). This is shown by the configuration of the female connection plate 1224. Another difference between the first embodiment of the connector system 10 and the second embodiment of the connector system 1010 is the fact that the male terminal side walls 1062*a*-1062*d* that is associated with the second embodiment each have three contact arms 1188*a*-1188*l*, while the male terminal side walls 62*a*-62*d* that are associated with the first embodiment each have two contact arms 188*a*-188*h*. In other words, the second embodiment of the connector system 1010 has a total of 12 contact arms 1188*a*-1188*l*, while the first embodiment of the connector system 10 has a total of 8 contact arms 188*a*-188*h*.

While the dimensional of the second embodiment will be discussed in greater detail below, the addition of the four contact arms 1188*a*-1188*l* increases the height and width of the male terminal assembly between 20% to 25%. This increase in size allows for the second embodiment of the connector system 1010 to carry between 15% and 25% more current than the first embodiment of the connector system 10, while staying within the industry specifications, including DIN EN 60512-5-2. In particular, while meeting the industry specifications, the first embodiment of the connector system 10 is capable of carrying up to 280 amps and the second embodiment of the connector system 1010 is capable of carrying up to 350 amps.

FIGS. 47-48 show various measurements that are associated with the second embodiment of the connector system 1010. It should be understood that these measurements are exemplary and shall not be limiting. Thus, the connector system 1010 may have measurements that are multiple times larger than the below measurements or multiple times smaller than the below measurements. These views show that the spring member 1130 will be deflected inward by between 1% and 8% of the height of the male terminal assembly 1050, when the male terminal assembly 1050 is inserted into the female terminal 1030. The first measurement, which is labeled 2A, extends from the outer surface of the contact arm 1188*a* to the opposed outer surface of contact arm and is preferably less than 42.7 mm and more preferably between 25.4 mm and 17 mm. The second measurement, which is labeled 2B, extends from an outer surface of the male terminal side wall to an outer surface of the opposed male terminal side wall and is preferably less 36 mm and more preferably between 21.5 and 14.5 mm. The third measurement, which is labeled 2C, extends from an inner edge of the first substantially linear segment to an inner edge of the third substantially linear segment and is preferably less than 20.3 mm and more preferably between 12 mm and 8 mm.

The fourth measurement, which is labeled 2D, extends from an inner edge 1256 of a contact arm to an inner edge of an adjacent contact arm and is preferably less than 2.54 mm and more preferably between 1.5 mm and 1 mm. The fifth measurement, which is labeled 2E, extends from an inner edge of a contact arm to an opposed second edge of the contact arm; thus, the fifth measurement quantifies the width of the contact arm along with the width of the spring finger. The fifth measurement is preferably less than 4 mm and more preferably between 2.5 mm and 1.5 mm. The sixth measurement, which is labeled 2F, extends from an outer surface of the front male terminal wall to an outer surface of the third contact arm section and is preferably less than 4 mm and more preferably between 2.5 mm and 1.5 mm. The seventh measurement, which is labeled 2G, extends from the outer surface 1264 of the third contact arm section to the forward most edge of the intermediate segment; thus, the seventh measurement quantifies the length of the contact arm. The seventh measurement is preferably less than 28 mm and more preferably between 17 mm and 11 mm.

The eighth measurement, which is labeled 2H, extends from the forward most edge of the intermediate segment to the outer surface of the rear male terminal wall and is preferably less than 10.75 mm and more preferably between 6.35 and 4.0 mm. The ninth measurement, which is labeled 2I, extends from the outer surface of the rear male terminal wall to the outer edge of the male terminal connection plate and is preferably less than 39 mm and more preferably between 23 mm and 15.25 mm. The tenth measurement, which is labeled 2J, extends between the outer surfaces of the top and bottom connection plates and is preferably less than 5.1 mm and more preferably between 3 mm and 2 mm. The eleventh measurement, which is labeled 2K, extends from the outer surface of the top connection plate to the outer surface of the male terminal side wall and is preferably less than 31 mm and more preferably between 18.5 mm and 12 mm. The twelfth measurement, which is labeled 2L, extends along the length of the first contact arm section and is preferably less than 23 mm and more preferably between 14 mm and 9 mm.

The thirteenth measurement, which is labeled 2M, extends along the horizontal length of the second and third contact arm sections and is preferably less than 5.6 mm and more preferably between 3.3 mm and 2 mm. The fourteenth and nineteenth measurements, which are labeled 2N and 2S, are substantially equal and extend from the outer surface of the female terminal side wall to the outer surface to the opposed outer surface side wall and is preferably less than 47.25 mm and more preferably between 28.5 mm and 19 mm. The fifteenth and twenty measurements, which are labeled 2O and 2T, are substantially equal and extend from the inner surface of the female terminal side wall to the opposed inner surface of the female terminal side wall and is preferably less than 41 mm and more preferably between 25 mm and 16.3 mm. Accordingly, the thickness of the female terminal 1030 is less than 6 mm. The sixteenth and twenty-first measurements, which are labeled 2P and 2U, are substantially equal and extend from the outer surface of the base spring section to the outer surface of the opposed base spring section and is preferably less than 36 mm and more preferably between 21.5 mm and 14.25 mm.

The seventeenth and twenty-second measurements, which are labeled 2Q and 2V, are substantially equal and extend from the inner surface of the base spring section 1140*a* to the inner surface of the opposed base spring section and is preferably less than 30.7 mm and more preferably between 18.5 mm and 12 mm. Accordingly, the thickness of the spring member 1130 is less than 5 mm. The eighteenth and twenty third measurements, which are labeled 2R and 2W, are substantially equal and extend from the terminal end of the third contact arm section to the terminal end of the opposed third contact arm section and is preferably less than 30 mm and more preferably between 17.8 mm and 12 mm. Accordingly, the distance between the outer surfaces of the spring fingers 1152*a*-1152*h* is approximately 3.5% less when the spring fingers 1152*a*-1152*h* are inserted into the female terminal receiver 1232. Finally, the twenty-third measurement, which is labeled 2X, extends from the inner surface of the finger section to the inner surface of the opposed finger section and is preferably less than 25.7 mm and more preferably between 15.5 mm and 10 mm. Accordingly, the thickness of the spring fingers 1152*a*-1152*h* is less than 5 mm.

FIGS. 49-58 show various views of a third embodiment of the connector system 2010. It should be understood that this third embodiment contains structures, features and/or functions that are similar to the structures, features and/or functions disclosed in connection with the first embodiment. Accordingly, reference numbers that are separated by 2000 will be used in connection with this third embodiment to denote the structures and/or features that are similar to the structures and/or features disclosed in connection with the first embodiment. For example, the contact arms of the first embodiment are labeled 188*a*-188*h*, while the contact arms of the third embodiment are labeled 2188*a*-2188*d*. Therefore, one of ordinary skill in the art shall assume that the contact arms of the first embodiment 188*a*-188*h* have similar structures, features and/or functions in comparison to the contact arms of the third embodiment 2188*a*-2188*d*. Additionally, one of ordinary skill in the art shall understand that while the structures, features and/or functions are similar that does not mean the structures, features and/or functions are exactly the same. For example, the length of the contact arms 188*a*-188*h* of the first embodiment is longer than the length of the contact arms 2188*a*-2188*h* of the third embodiment. Further, it should be understood that structures and/or features of this third embodiment may be used in connection with any other embodiments contained within this application or its related applications.

Like the first embodiment of the connector system 10, the third embodiment of the connector system 2010 includes: (i) a male terminal assembly 2050 and (ii) a female terminal 2030. The male terminal assembly 2050 has a spring member 2130 and a male terminal 2054. Like the second embodiment of the spring member 130, this fourth embodiment of the spring member 2130 includes a recess 2162 and an associated strengthening rib 2164. However, unlike the second embodiment of the spring member 130, this fourth embodiment of the spring member 2130 has a width of the base spring section 2140*a*-2140*d* that is not approximately equal to the width of the spring arms 2142*a*-2142*d*. Also, like the first embodiment of the male terminal 54, this third embodiment of the male terminal 2054 includes a plurality of contact arms 2188*a*-2188*d* that: (i) are integrally formed with a intermediate segment 2192*a*-2192*d* of the male terminal side walls 2062*a*-2062*d*, (ii) extend away from the connection plate 2058 and towards the front male terminal wall 2060 at an outwardly directed angle, (iii) extend across an extent of the contact arm openings 2189*a*-2189*h*, (iv) have a terminal end that is configured to contact the planar outer surface of the spring fingers 2152*a*-2152*d*, and (v) have a third contact arm section 2200*a*-2200*d* that is configured to be positioned substantially perpendicular to the spring fingers 2152*a*-2152*d*.

Also, like the first embodiment of the contact arm 188*a*-188*h*, the third embodiment of the contact arm 2188*a*-2188*d* are designed to interact with the internal spring member 2130. Like the disclosure discussed in connection with FIGS. 33-36, the contact arms 2188*a*-2188*d* are depressed or deflected inward (i.e., towards the center 2212 of the male terminal 2054), when the male terminal assembly 2050 is inserted within the female terminal receiver 2232. Also, as discussed above in connection with FIG. 36, the spring member 2130 applies both a spring biasing force, $S_{BF}$, and a spring thermal force, $S_{TF}$, on the contact arms 2188*a*-2188*d* to create a 360 degree mechanical and electrical connection with the female terminal 2030.

One difference between the first embodiment of the connector system 10 and the third embodiment of the connector system 2010 is the fact that the male terminal side walls 2062*a*-2062*d* that are associated with the third embodiment each have one contact arms 2188*a*-2188*d*, while the male terminal side walls 62*a*-62*d* that are associated with the first embodiment each have two contact arms 188*a*-188*h*. In other words, the third embodiment of the connector system 2010 has a total of 4 contact arms 2188*a*-2188*d*, while the first embodiment of the connector system 10 has a total of 8 contact arms 188*a*-188*h*. While the dimensional of the third embodiment will be discussed in greater detail below, the subtraction of the four contact arms 2188*a*-2188*d* decreases the height and width of the male terminal assembly between 10% and 15%. This decrease in size allows the first embodiment of the connector system 10 to carry between 15% and 25% more current than the third embodiment of the connector system 2010, while staying within the industry specifications, including DIN EN 60512-5-2. In particular, while meeting the industry specifications, the first embodiment of the connector system 10 is capable of carrying up to 280 amps and the third embodiment of the connector system 2010 is capable of carrying up to 220 amps.

FIGS. 57-58 show various measurements that are associated with the third embodiment of the connector system 2010. It should be understood that these measurements are exemplary and shall not be limiting. Thus, a connector system 2010 may have measurements that are multiple times larger than the below measurements or multiple times smaller than the below measurements. These views show that the spring member 2130 will be deflected inward by between 1% and 10% of the height of the male terminal assembly 2050, when the male terminal assembly 2050 is inserted into the female terminal 2030. The first measurement, which is labeled 3A, extends from the outer surface of the contact arm to the opposed outer surface of contact arm and is preferably less than 29 mm and more preferably between 17.3 mm and 11.43 mm. The second measurement, which is labeled 3B, extends from an outer surface of the male terminal side wall to an outer surface of the opposed male terminal side wall and is preferably less than 23.5 mm and more preferably between 14 mm and 9 mm. The third measurement, which is labeled 3C, extends from an inner edge of the first substantially linear segment to an inner edge of the third substantially linear segment and is preferably less than 20.32 mm and more preferably between 12.2 mm and 8.13 mm.

The fifth measurement, which is labeled 3E, extends from an inner edge of a contact arm to an opposed second edge of the contact arm; thus, the fifth measurement quantifies the width of the contact arm along with the width of the spring finger. The fifth measurement is preferably less than 4 mm and more preferably between 2.5 mm and 1.5 mm. The sixth measurement, which is labeled 3F, extends from an outer surface of the front male terminal wall to an outer surface of the third contact arm section and is preferably less than 2 mm and more preferably between 1.3 mm and 0.8 mm. The seventh measurement, which is labeled 3G, extends from the outer surface of the third contact arm section to the forward most edge of the intermediate segment 2192d; thus, the seventh measurement quantifies the length of the contact arm. The seventh measurement is preferably less than 26.5 mm and more preferably between 15.7 mm and 10.4 mm.

The eighth measurement, which is labeled 3H, extends from the forward most edge of the intermediate segment to the outer surface 2268 of the rear male terminal wall and is preferably less than 8.64 mm and more preferably between 5.1 mm and 3.3 mm. The ninth measurement, which is labeled 3I, extends from the outer surface of the rear male terminal wall to the outer edge of the male terminal connection plate and is preferably less than 34.5 mm and more preferably between 20 mm and 13 mm. The tenth measurement, which is labeled 3J, extends between the outer surfaces of the top and bottom connection plates and is preferably less than 3.05 mm and more preferably between 1.8 mm and 1 mm. The eleventh measurement, which is labeled 3K, extends from the outer surface of the top connection plate to the outer surface of the male terminal side wall and is preferably less than 20.0 mm and more preferably between 11.7 mm and 7.9 mm. The twelfth measurement, which is labeled 3L, extends along the length of the first contact arm section and is preferably less than 22.0 mm and more preferably between 13.0 mm and 8.6 mm.

The thirteenth measurement, which is labeled 3M, extends along the horizontal length of the second and third contact arm sections and is preferably less than 4.6 mm and more preferably between 2.5 mm and 1.8 mm. The fourteenth and nineteenth measurements, which are labeled 3N and 3S, are substantially equal and extend from the outer surface of the female terminal side wall to the outer surface to the opposed outer surface side wall and is preferably less than 31.5 mm and more preferably between 18.8 mm and 12.44 mm. The fifteenth and twenty measurements, which are labeled 3O and 3T, are substantially equal and extend from the inner surface of the female terminal side wall to the opposed inner surface of the female terminal side wall and is preferably less than 27.4 mm and more preferably between 16.25 mm and 10.9 mm. Accordingly, the thickness of the female terminal is less than 4 mm. The sixteenth and twenty-first measurements, which are labeled 3P and 3U, are substantially equal and extend from the outer surface of the base spring section to the outer surface of the opposed base spring section and is preferably less than 23.4 mm and more preferably between 14 mm and 9 mm.

The seventeenth and twenty-second measurements, which are labeled 3Q and 3V, are substantially equal and extend from the inner surface of the base spring section to the inner surface of the opposed base spring section and is preferably less than 19.8 mm and more preferably between 11.7 mm and 8 mm. Accordingly, the thickness of the spring member is less than 3.5 mm. The eighteenth and twenty third measurements, which are labeled 3R and 3W, are substantially equal and extend from the terminal end of the third contact arm section to the terminal end of the opposed third contact arm section and is preferably less than 18.8 mm and more preferably between 11 mm and 7.5 mm. Accordingly, the distance between the outer surfaces of the spring fingers 2152a-2152d is between 1% and 10% of the height of the male terminal assembly 2050, when the spring fingers 2152a-2152d are inserted into the female terminal receiver 2232. Finally, the twenty-third measurement, which is labeled 3X, extends from the inner surface of the finger section to the inner surface of the opposed finger section and is preferably less than 15.24 mm and more preferably between 18.7 mm and 6.1 mm. Accordingly, the thickness of the spring fingers 2152a-2152h is less than 3 mm.

FIGS. 59-68 show various views of a fourth embodiment of the connector system 3010. It should be understood that this fourth embodiment contains structures, features and/or functions that are similar to the structures, features and/or functions disclosed in connection with the first embodiment. Accordingly, reference numbers that are separated by 3000 will be used in connection with this fourth embodiment to denote the structures and/or features that are similar to the structures and/or features disclosed in connection with the first embodiment. For example, the contact arms of the first embodiment are labeled 188a-188h, while the fourth embodiment of the contact arms of the fourth embodiment is labeled 3188a-3188d. Therefore, one of ordinary skill in the art shall assume that the contact arms of the first embodiment 188a-188h have similar structures and/or features in comparison to the contact arms of the fourth embodiment 3188a-3188d. Additionally, one of ordinary skill in the art shall understand that while the structures, features and/or functions are similar that does not mean the structures, features and/or functions are exactly the same. For example, the length of the contact arms 188a-188h of the first embodiment is longer than the length of the contact arms 3188a-3188h of the third embodiment. Further, it should be understood that structures and/or features of this third embodiment may be used in connection with any other embodiments contained within this application or its related applications.

Like the first embodiment of the connector system 10, the fourth embodiment of the connector system 3010 includes: (i) a male terminal assembly 3050 and (ii) a female terminal 30. The male terminal assembly 3050 has a spring member 3130 and a male terminal 3054. Like the second embodiment of the spring member 130, this fifth embodiment of the spring member 3130 includes recess 3162 and an associated strengthening ribs 3164. However, unlike the second embodiment of the spring member 130, this fifth embodiment of the spring member 3130 has a width of the base spring section 3140a-3140d that is not approximately equal to the width of the spring arms 3142a-3142d. Also, like the first embodiment of the male terminal 54, this fourth embodiment of the male terminal 3054 includes a plurality of contact arms 3188a-3188h that: (i) are integrally formed with a intermediate segment 3192a-3192d of at least two of the male terminal side walls 3062a-3062d, (ii) extend away from the connection plate 3058 and towards the front male terminal wall 3060 at an outwardly directed angle, (iii) extend across an extent of the contact arm openings 3189a-3189j, (iv) have a terminal end 3206 that is configured to contact the planar outer surface 3143 of the spring fingers 3152a-3152h, and (v) have a third contact arm section 3200a-3200d is configured to be positioned substantially perpendicular to the spring fingers 3152a-3152d.

Also, like the first embodiment of the contact arm 188a-188h, the fourth embodiment of the contact arm 3188a-3188h are designed to interact with the internal spring member 3130. Like the disclosure discussed in connection with FIGS. 33-36, the contact arms 3188a-3188h are depressed or deflected inward (i.e., towards the center 3212 of the male terminal 3054), when the male terminal assembly 3050 is inserted within the female terminal receiver 3232. Also, as discussed above in connection with FIG. 36, the spring member 3130 applies both a spring biasing force, $S_{BF}$, and a spring thermal force, $S_{TF}$, on the contact arms 3188a-3188d to create a mechanical and electrical connection with the female terminal 3030.

Unlike the other embodiments of the connector system 10, 1010, 2010, which are described above, this embodiment of the connector system 3010 is not 360 degrees compliant. This is because male terminal body 3056 does not have contact arms 3188a-3188h formed in each of the male terminal side walls 3062a-3062d. In particular, contact arms 3188a-3188h are not formed within male terminal side walls 3062b and 3062d. Nevertheless, another contact arm 3188a-3188h may be formed within male terminal side walls 306b and 3062d to create a new embodiment that is 360 degrees compliant. Another difference between the first embodiment of the connector system 10 and the fourth embodiment of the connector system 3010 is the fact that two of the male terminal walls 3062a and 3062c each have four contact arms 3188a-3188h, while the male terminal side walls 62a-62d that are associated with the first embodiment each have two contact arm sections 188a-188h. In other words, the fourth embodiment of the connector system 3010 has a total of 8 contact arms 3188a-3188h, while the first embodiment of the connector system 10 has a total of 8 contact arms 188a-188h. While the dimensional of the fourth embodiment will be discussed in greater detail below, the configuration of contact arms 3188a-3188h in this fourth embodiment provides a low-profile connector. In particular, this low-profile configuration of the fourth embodiment provides a connector that has a width that is between 35% and 45% less than the first embodiment without reducing the current carrying capacity of the connector system. Thus, the four embodiment is capable of carrying up to 280 amps, while meeting industry specifications, including DIN EN 60512-5-2.

Figure 67:
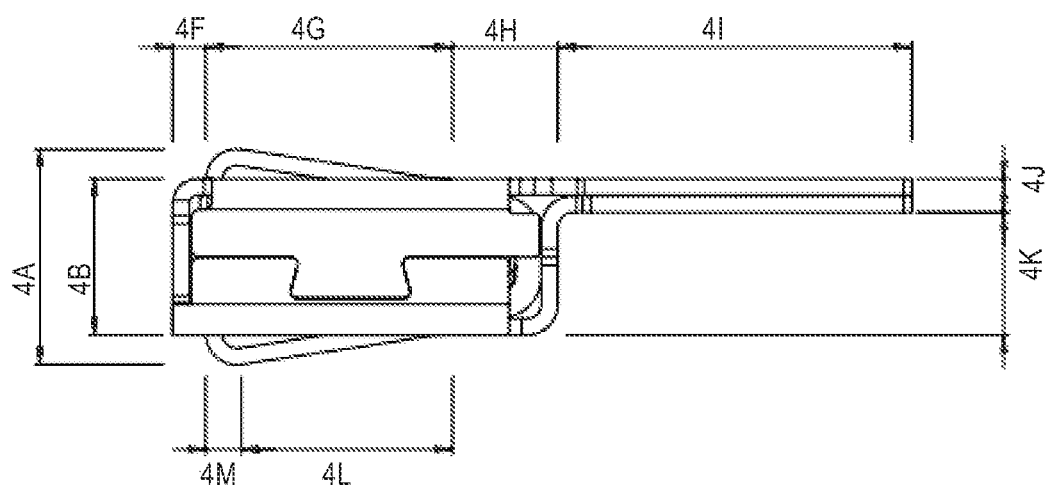
FIG. 67 is a left view of the male terminal assembly shown in FIG. 60.
Figure 68:
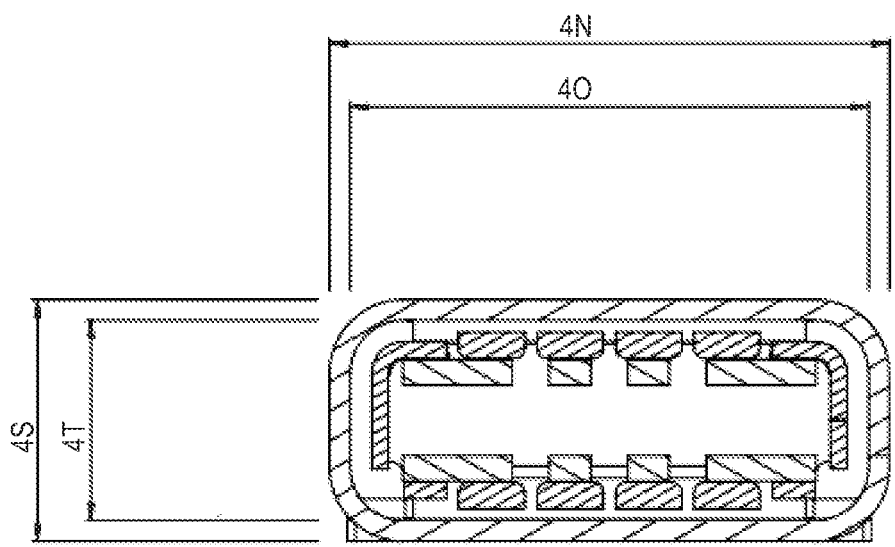
FIG. 68 is a cross-sectional view of the terminal assembly shown in FIG. 59, taken along the 68-68 line of FIG. 66.
Figure 69:
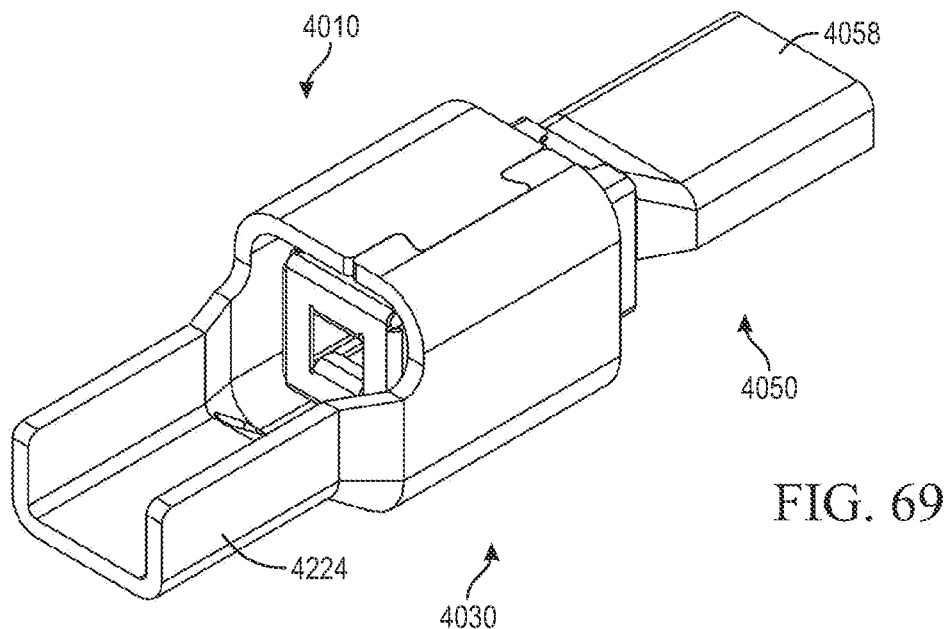
FIG. 69 is an isometric view of a fifth embodiment of a male terminal assembly and a female terminal in a connected position.
Figure 70:
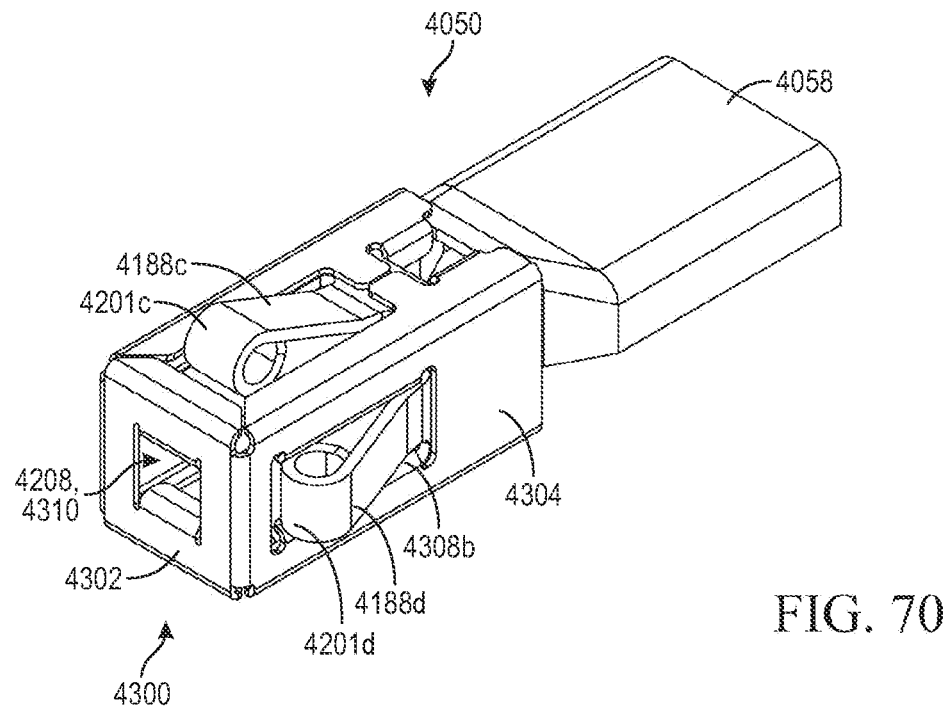
FIG. 70 is a frontal isometric view of the fifth embodiment of the male terminal assembly shown in FIG. 69.
Figure 72:
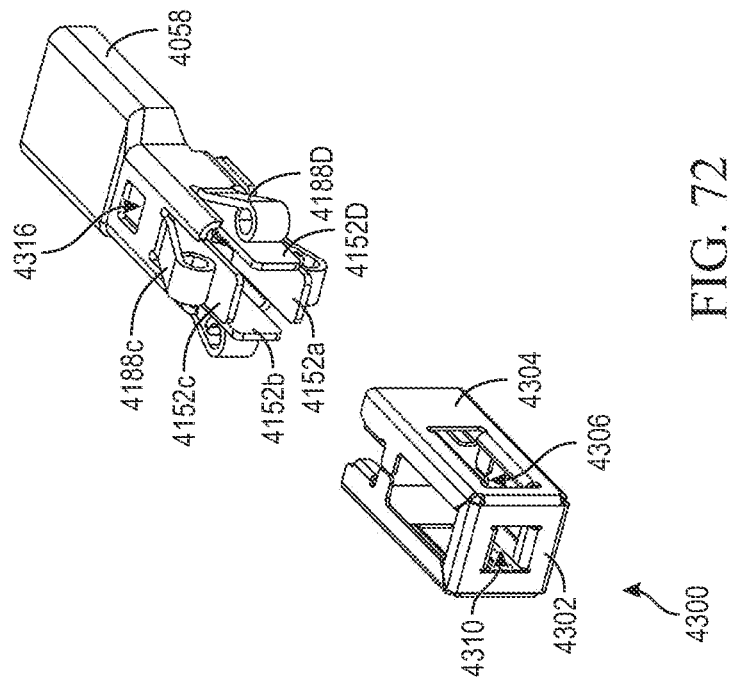
FIG. 72 is a frontal isometric view of the male terminal assembly shown in FIG. 70, wherein the sixth embodiment of the spring member is within the male terminal.
Figure 71:
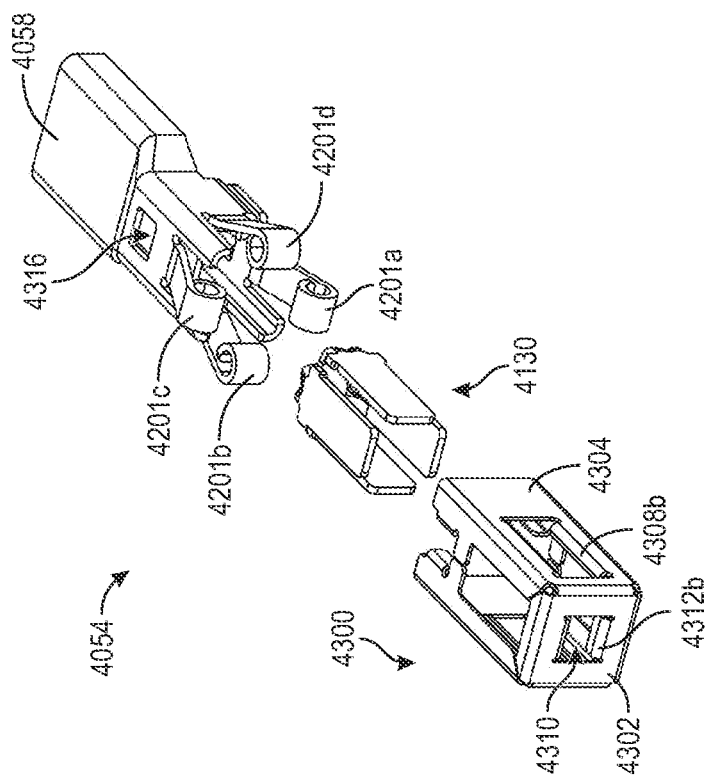
FIG. 71 is an exploded frontal isometric view of the male terminal assembly shown in FIG. 70, wherein a sixth embodiment of a spring is separated from the fifth embodiment of the male terminal.

FIGS. 67-68 show various measurements that are associated with the fourth embodiment of the connector system 3010. It should be understood that these measurements are exemplary and shall not be limiting. Thus, a connector system 3010 may have measurements that are multiple times larger than the below measurements or multiple times smaller than the below measurements. In these views, the spring member 3052 is not shown to scale and thus the terminal ends 3172 are not shown in a deflected inward state. Nevertheless, it should be understood that the spring member 3130 will be deflected inward by between 1% and 10% of the height of the male terminal assembly 3050, when the male terminal assembly 3050 is inserted into the female terminal 3030. The first measurement, which is labeled 4A, extends from the outer surface of the contact arm to the opposed outer surface of contact arm and is preferably less than 20.8 mm and more preferably between 12.7 mm and 8.4 mm. The second measurement, which is labeled 4B, extends from an outer surface of the male terminal side wall to an outer surface of the opposed male terminal side wall and is preferably less than 14.7 mm and more preferably between 9.0 mm and 5.9 mm. The third measurement, which is labeled 4F, extends from an outer surface of the front male terminal wall to an outer surface of the third contact arm section and is preferably less than 3.05 mm and more preferably between 1.8 mm and 1 mm. The fourth measurement, which is labeled 4G, extends from the outer surface of the third contact arm section to the forward most edge of the intermediate segment; thus, the seventh measurement quantifies the length of the contact arm. The fourth measurement is preferably less than 25.5 mm and more preferably between 15.24 mm and 1 mm.

The fifth measurement, which is labeled 4H, extends from the forward most edge of the intermediate segment to the outer surface of the rear male terminal wall 3064 and is preferably less than 8.6 mm and more preferably between 5.1 mm and 3.30 mm. The sixth measurement, which is labeled 4I, extends from the outer surface of the rear male terminal wall to the outer edge of the male terminal connection plate and is preferably less than 34.3 mm and more preferably between 20 mm and 13.5 mm. The seventh measurement, which is labeled 4J, extends between the outer surfaces of the top and bottom connection plates and is preferably less than 3.05 mm and more preferably between 1.8 mm and 1 mm. The eighth measurement, which is labeled 4K, extends from the outer surface of the top connection plate to the outer surface of the male terminal side wall and is preferably less than 11.7 mm and more preferably between 6.9 mm and 4.6 mm. The ninth measurement, which is labeled 4L, extends along the length of the first contact arm section and is preferably less than 22 mm and more preferably between 13 mm and 8.7 mm.

The tenth measurement, which is labeled 4M, extends along the horizontal length of the second and third contact arm sections and is preferably less than 3.30 mm and more preferably between 2 mm and 1.3 mm. The eleventh measurement, which is labeled 4N, extends from the outer surface of the female terminal side wall to the outer surface to the opposed outer surface side wall and is preferably less than 65 mm and more preferably between 39 mm and 26 mm. The twelfth measurement, which is labeled 4O, extends from the inner surface of the female terminal side wall to the opposed inner surface of the female terminal side wall and is preferably less than 61 mm and more preferably between 36.5 mm and 24.4 mm. Accordingly, the thickness of the female terminal is less than 4 mm. The thirteenth measurement, which is labeled 4S, extends from the outer surface of the female terminal side wall to the outer surface to the opposed outer surface side wall and is preferably less than 23.4 mm and more preferably between 14 mm and 9.4 mm. The fourteenth measurement, which is labeled 4T, extends from the inner surface of the female terminal side wall to the opposed inner surface of the female terminal side wall and is preferably less than 19.3 mm and more preferably between 11.4 mm and 7.6 mm. Accordingly, the thickness of the female terminal is less than 4 mm.

FIGS. 69-78 show various views of a fifth embodiment of the connector system 4010. It should be understood that this fifth embodiment contains structures, features and/or functions that are similar to the structures, features and/or functions disclosed in connection with the first embodiment. Accordingly, reference numbers that are separated by 4000 will be used in connection with this fifth embodiment to denote the structures and/or features that are similar to the structures and/or features disclosed in connection with the first embodiment. For example, the contact arms of the first embodiment are labeled 188a-188h, while the contact arms of the fifth embodiment are labeled 4188a-4188d. Therefore, one of ordinary skill in the art shall assume that the contact arms of the first embodiment 188a-188h have similar structures and/or features in comparison to the contact arms of the fifth embodiment 4188a-4188d. Additionally, one of ordinary skill in the art shall understand that while the structures, features and/or functions are similar that does not mean the structures, features and/or functions are exactly the same. For example, the length of the contact arms 188a-188h of the first embodiment is longer than the length of the contact arms 4188a-4188h of the fifth embodiment. Further, it should be understood that structures and/or features of this third embodiment may be used in connection with any other embodiment contained within this application or its related applications.

Like the first embodiment of the connector system 10, the fifth embodiment of the connector system 4010 includes: (i) a male terminal assembly 4050 and (ii) a female terminal 4030. The male terminal assembly 4050 has a spring member 4130 and a male terminal 4054. Like the second embodiment of the spring member 130, this sixth embodiment of the spring member 4130 includes a recess and an associated strengthening rib 4164. However, unlike the second embodiment of the spring member 130, this sixth embodiment of the spring member 4130 has a width of the base spring section 4140a-4140d that is not approximately equal to the width of the spring arms 4142a-4142d. Also like the first embodiment of the male terminal 54, this fifth embodiment of the male terminal 4054 includes a plurality of contact arms 4188a-4188d that: (i) are integrally formed with a intermediate segment 4192a-4192d of the male terminal side walls 4062a-4062d, (ii) extend away from the connection plate 4058 and towards the front male terminal wall 4060 at an outwardly directed angle, (iii) extend across an extent of the contact arm openings 4189a-4189h, and (iv) are configured to contact the planar outer surface of the spring fingers 4152a-4152d. Unlike the first embodiment of the male terminal 54, the fifth embodiment does not have a third contact arm section is configured to be positioned substantially perpendicular to the spring fingers 4152a-4152d. Instead, in this fifth embodiment, the third contact arm section is omitted and the curvilinear contact arm section 4198a-4198h continues to form a substantially circular structure 4201a-4201d.

Also, like the first embodiment of the contact arm 188a-188h, the fifth embodiment of the contact arm 4188a-4188d are designed to interact with the internal spring member 4130. Like the disclosure discussed in connection with FIGS. 33-36, the contact arms 4188a-4188d are depressed or deflected inward (i.e., towards the center 4212 of the male terminal 4054), when the male terminal assembly 4050 is inserted within the female terminal receiver 4232. Also, as discussed above in connection with FIG. 36, the spring member 4130 applies both a spring biasing force, $S_{BF}$, and a spring thermal force, $S_{TF}$, on the contact arms 4188a-4188d to create a 360° mechanical and electrical connection with the female terminal 4030.

Figure 73:
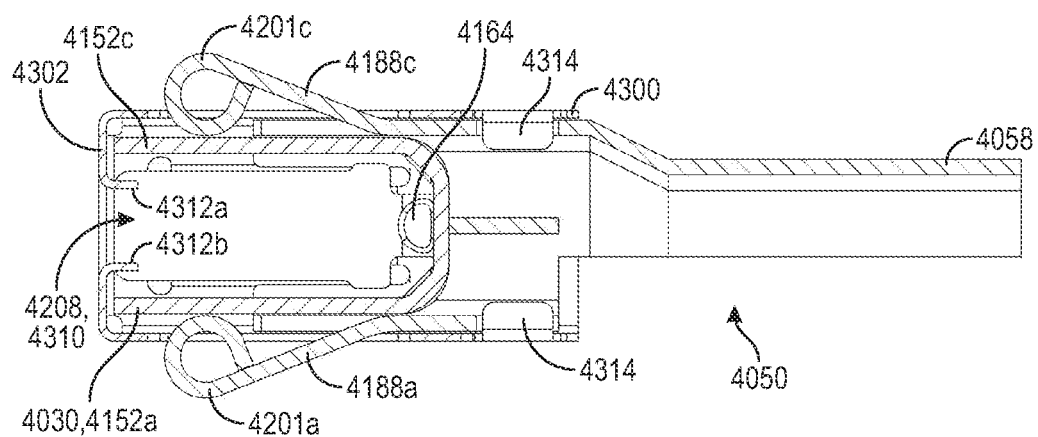
FIG. 73 is a cross-sectional view of the male terminal assembly shown in FIG. 70, taken along the 73-73 line of FIG. 75.
Figure 74:
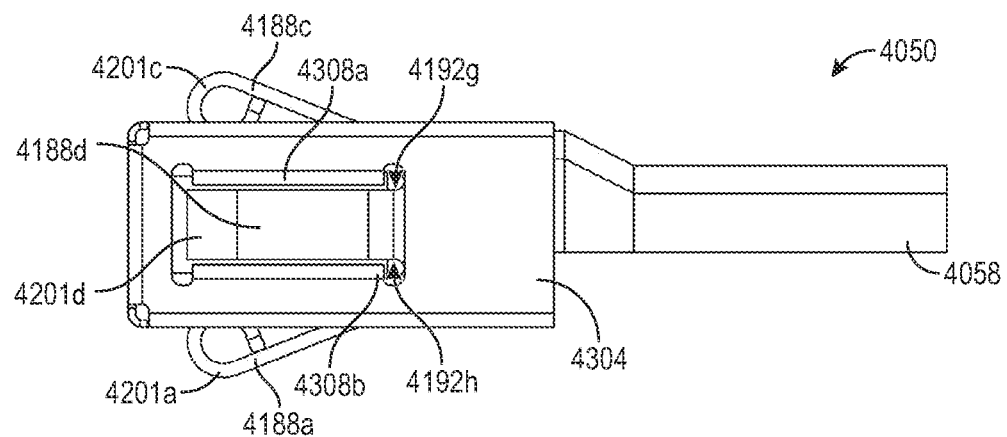
FIG. 74 is a left view of the male terminal assembly shown in FIG. 70.
Figure 79:
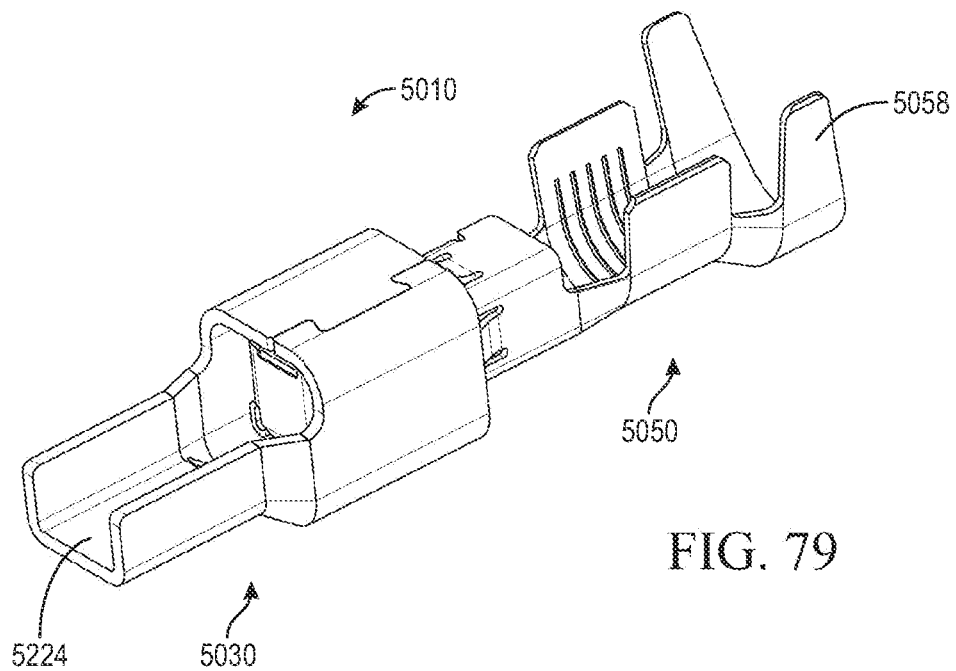
FIG. 79 is an isometric view of a sixth embodiment of a male terminal assembly and a female terminal in a connected position.
Figure 80:
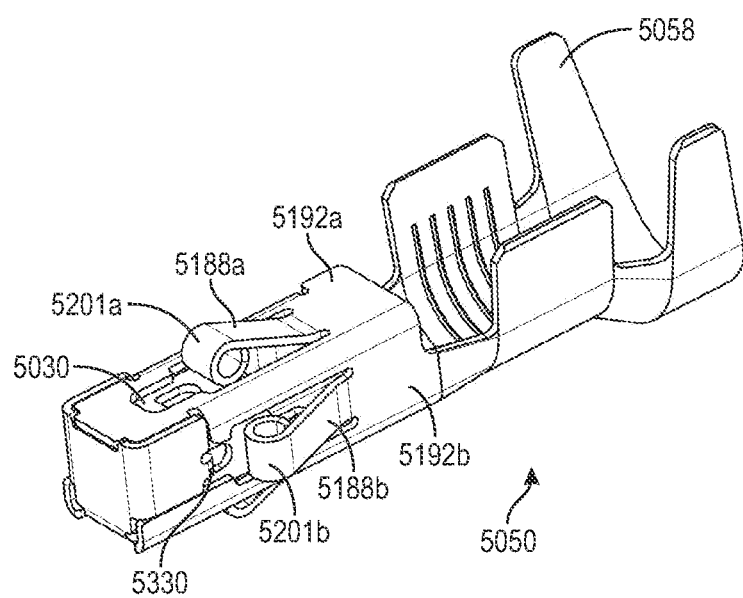
FIG. 80 is a frontal isometric view of the sixth embodiment of the male terminal assembly shown in FIG. 79.
Figure 81:
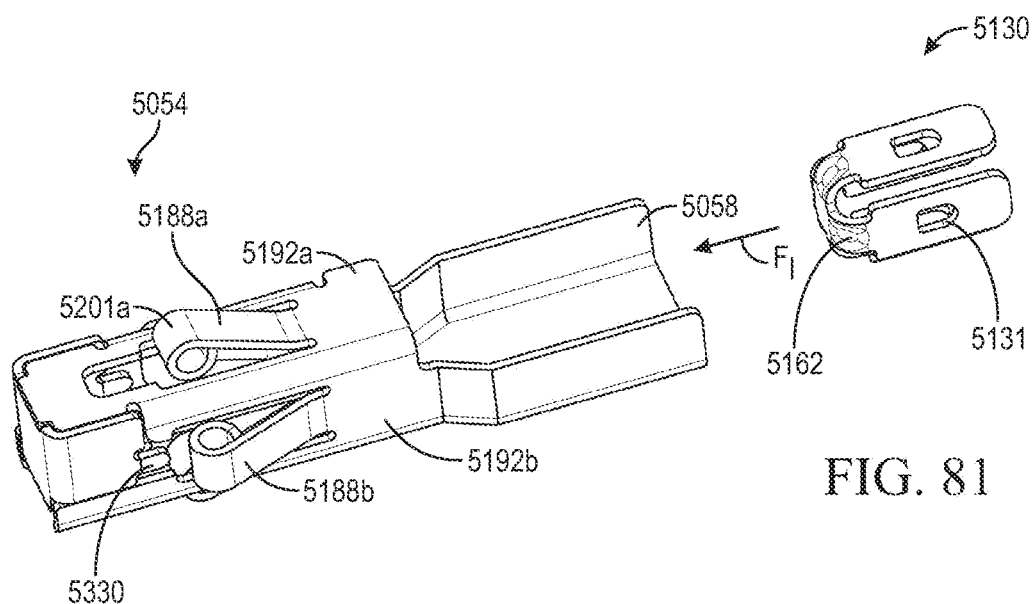
FIG. 81 is an exploded frontal isometric view of the male terminal assembly shown in FIG. 80, wherein a seventh embodiment of the spring is separated from the sixth embodiment of the male terminal.
Figure 82:
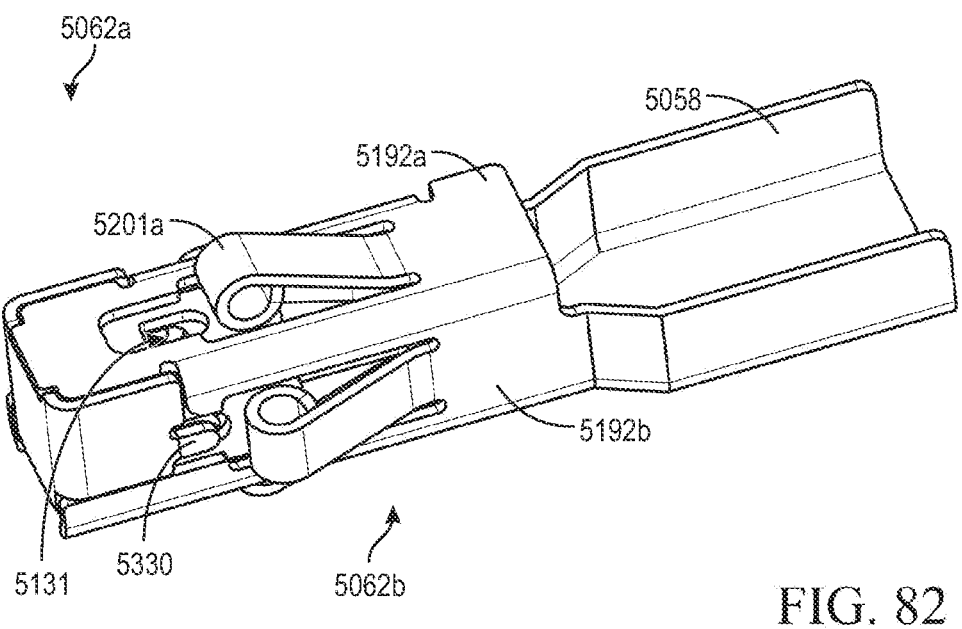
FIG. 82 is a frontal isometric view of the male terminal assembly shown in FIG. 80, wherein the spring is within the male terminal.
Figure 83:
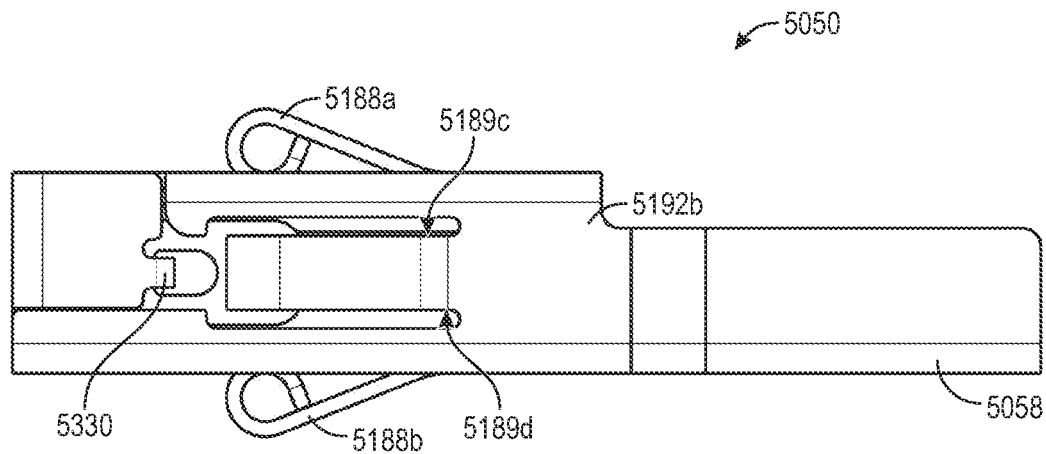
FIG. 83 is a right view of the male terminal assembly shown in FIG. 80.
Figure 84:
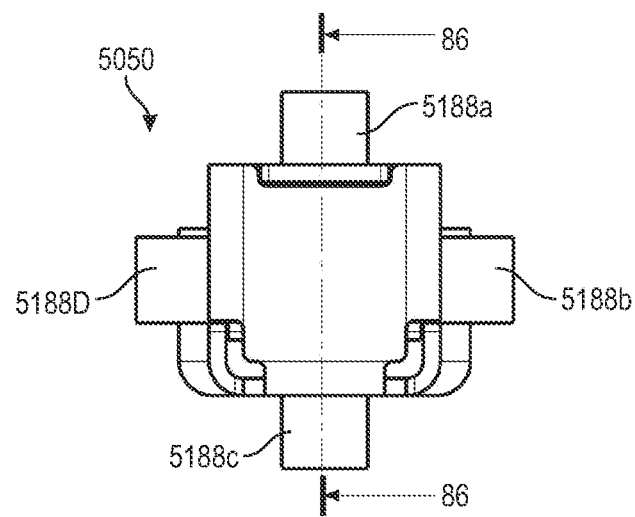
FIG. 84 is a front view of the male terminal assembly shown in FIG. 80.
Figure 85:
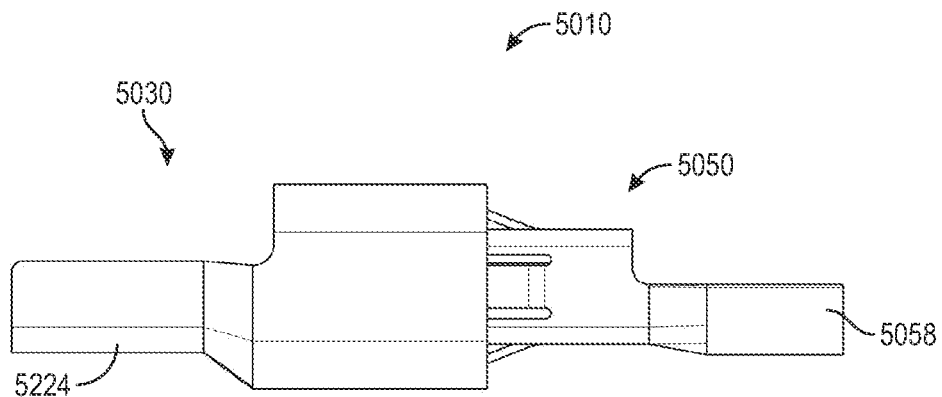
FIG. 85 is a right view of the male terminal assembly and the female terminal shown in FIG. 80.
Figure 86:
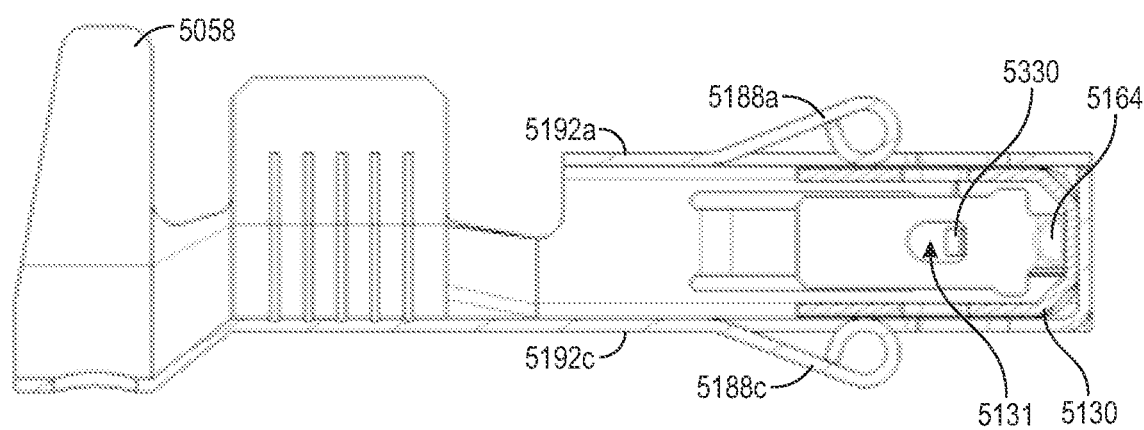
FIG. 86 is a cross-sectional view of the terminal assembly shown in FIG. 80, taken along the 86-86 line of FIG. 84.
Figure 87:
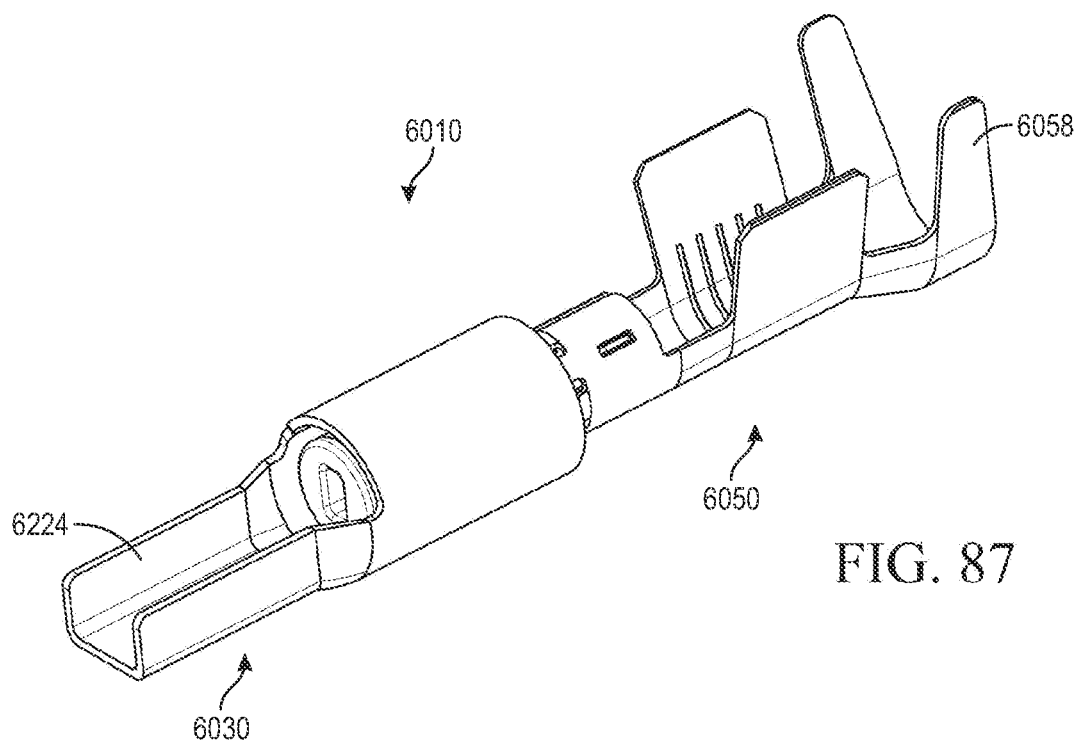
FIG. 87 is an isometric view of a seventh embodiment of a male terminal assembly and a female terminal in a connected position.

One difference between the first embodiment of the connector system 10 and the fifth embodiment of the connector system 4010 is the fact that the fifth embodiment of the male terminal 4054 includes a secondary housing 4300 that is configured to surround an extent of the male terminal 4054. Specifically, the secondary housing 4300 includes: (i) a front housing wall 4302 and (ii) two side housing walls 4304 that are coupled to the front housing wall 4302. The front housing wall 4302 has an opening 4310 that is configured to allow for the touch proof probe to be inserted into the male terminal 4054, when the male terminal 4054 is coupled with the female terminal 4030. Adjacent to the opening 4310, the front housing wall 4302 has two curvilinear sections 4312a, 4312b. As best shown in FIGS. 73 and 75, these curvilinear sections 4312a, 4312b are configured to be inserted into touch proof probe opening 4208, when the secondary housing 4300 is positioned over the male terminal body 4056. The side housing walls 4304 have openings 4306 that are configured to allow two of the contact arms 4188a, 4188c to extend therethrough, when the secondary housing 4300 is positioned over the male terminal body 4056. Adjacent to the openings 4306, the side housing walls 4304 have two curvilinear sections 4308a, 4308b. As best shown in FIG. 74, these curvilinear sections 4308a, 4308b are configured to be inserted into two of the contact arm openings 4189g, 4189h, when the secondary housing 4300 is positioned over the male terminal body 4056. Best shown in FIGS. 71-72 and 73, the secondary housing 4300 also includes retaining members 4314 that are configured to be inserted into a retaining member opening 4316 that is formed in a portion of the intermediate segment 4192a-4192d of the male terminal body 4056. Finally, the secondary housing 4300 may be formed from material (e.g., spring steel or 301SS, ¼ hard) that is similar to, or is the same as, the material that the spring member 4130 is formed from. This configuration helps ensure that the male terminal 4054 retains its shape and does not become too pliable under elevated temperatures and high power loads.

Another difference between the first embodiment of the connector system 10 and the fifth embodiment of the connector system 4010 is the fact that the male terminal side walls 4062a-4062d associated with the fifth embodiment each have one contact arm sections 4188a-4188d, while the male terminal side walls 62a-62d that are associated with the first embodiment each have two contact arm sections 188a-188h. In other words, the fifth embodiment of the connector system 4010 has a total of 4 contact arms 4188a-4188d, while the first embodiment of the connector system 10 has a total of 8 contact arms 188a-188h. While the dimensional of the fifth embodiment will be discussed in greater detail below, the subtraction of the four contact arms 4188a-4188d decreases the height and width of the male terminal assembly by between 45% and 55%. This decrease in size allows the first embodiment of the connector system 10 to carry between 60% and 70% more current than the fifth embodiment of the connector system 4010, while staying within the industry specifications, including DIN EN 60512-5-2. In particular, while meeting the industry specifications, the first embodiment of the connector system 10 is capable of carrying up to 280 amps and the fifth embodiment of the connector system 4010 is capable of carrying up to 100 amps.

FIGS. 77-78 show various measurements that are associated with the fifth embodiment of the connector system 4010. It should be understood that these measurements are exemplary and shall not be limiting. Thus, a connector system 4010 may have measurements that are multiple times larger than the below measurements or multiple times smaller than the below measurements. These views show that the spring member 4130 will be deflected inward by between 3% and 15% of the height of the male terminal assembly 4050, when the male terminal assembly 4050 is inserted into the female terminal 4030. The first measurement, which is labeled 5A, extends from the outer surface of the contact arm to the opposed outer surface of contact arm and is preferably between 10.2 mm and 6.9 mm. The second measurement, which is labeled 5B, extends from an outer surface of the male terminal side wall to an outer surface of the opposed male terminal side wall and is preferably between 6.9 mm and 4.6 mm. The third measurement, which is labeled 5C, extends from an inner edge of the first substantially linear segment to an inner edge of the third substantially linear segment and is preferably between 2.54 mm and 18.3 mm. The fifth measurement, which is labeled 5E, extends from an inner edge of a contact arm 4188g to an opposed second edge of the contact arm; thus, the fifth measurement quantifies the width 4193 of the contact arm along with the width of the spring finger. The fifth measurement is preferably between 2.5 mm and 1.5 mm. The sixth measurement, which is labeled 5F, extends from an outer surface of the front male terminal wall to an outer surface of the third contact arm section and is preferably between 1.5 mm and 1 mm. The seventh measurement, which is labeled 5G, extends from the outer surface of the third contact arm section to the forward most edge of the intermediate segment; thus, the seventh measurement quantifies the length of the contact arm 4188f. The seventh measurement is preferably between 8 mm and 5 mm.

The eighth measurement, which is labeled 5H, extends from the forward most edge of the intermediate segment to the outer surface of the rear male terminal wall 4064 and is preferably between 5.1 mm and 3.30 mm. The ninth measurement, which is labeled SI, extends from the outer surface of the rear male terminal wall to the outer edge of the male terminal connection plate and is preferably between 13.2 mm and 8.9 mm. The tenth measurement, which is labeled 5J, extends between the outer surfaces of the top and bottom connection plates and is preferably between 3 mm and 2 mm. The eleventh measurement, which is labeled 5K, extends from the outer surface of the top connection plate to the outer surface of the male terminal side wall and is preferably between 2.3 mm and 16.25 mm. The twelfth measurement, which is labeled 5L, extends along the length of the first contact arm section 4196h and is preferably between 6 mm and 1 mm.

The thirteenth measurement, which is labeled 5M, extends along the horizontal length of the second and third contact arm sections and is preferably between 1.5 mm and 1 mm. The fourteenth and nineteenth measurements, which are labeled 5N and 5S, are substantially equal and extend from the outer surface of the female terminal side wall to the outer surface to the opposed outer surface side wall and is preferably between 11.43 and 7.62. The fifteenth and twenty measurements, which are labeled 5O and 5T, are substantially equal and extend from the inner surface of the female terminal side wall to the opposed inner surface of the female terminal side wall and is preferably between 9.5 mm and 6 mm. Accordingly, the thickness of the female terminal is less than 2. The sixteenth and twenty-first measurements, which are labeled 5P and 5U, are substantially equal and extend from the outer surface of the base spring section to the outer surface of the opposed base spring section and is preferably between 5.3 mm and 3.5 mm.

The seventeenth and twenty-second measurements, which are labeled 5Q and 5V, are substantially equal and extend from the inner surface of the base spring section 4140a to the inner surface of the opposed base spring section and is preferably between 6.60 and 4.3 mm. Accordingly, the thickness of the spring member is between 1.3 mm and 0.6 mm. The eighteenth and twenty-third measurements, which are labeled 5R and 5W, are substantially equal and extend from the terminal end of the third contact arm section to the terminal end of the opposed third contact arm section and is preferably between 5.1 mm and 3.3 mm. Accordingly, the distance between the outer surfaces of the spring fingers 4152a-4152h is approximately 9% less when the spring fingers 4152a-4152h are inserted into the female terminal receiver 4232. Finally, the twenty-third measurement, which is labeled 5X, extends from the inner surface of the finger section to the inner surface of the opposed finger section and is preferably between 4.10 mm and 2.54 mm. Accordingly, the thickness of the spring fingers 4152a-4152h is between 1.3 mm and 0.6 mm.

FIGS. 78-86 show various view of a sixth embodiment of the connector system 5010. It should be understood that this sixth embodiment contains structures and/or features that are similar to the structures and features disclosed in connection with the first embodiment of the connector system 10. Accordingly, reference numbers that are separated by 5000 will be used in connection with this sixth embodiment to denote the structures and/or features that are similar to the structures and/or features disclosed in connection with the first embodiment. For example, the contact arms of the first embodiment are labeled 188a-188h, while the sixth embodiment of the contact arms of the sixth embodiment are labeled 5188a-5188d. Therefore, one of ordinary skill in the art shall assume that the contact arms of the first embodiment 188a-188h have similar structures and/or features in comparison to the contact arms of the sixth embodiment 5188a-5188d. Additionally, it should be understood that structures and/or features of this sixth embodiment may be used in connection with any other embodiment contained within this application or its related applications.

Like the fifth embodiment of the connector system 4010, the sixth embodiment of the connector system 5010 includes: (i) a male terminal assembly 5050 and (ii) a female terminal 5030. The male terminal assembly 5050 has a spring member 5130 and a male terminal 5054. Like the second embodiment of the spring member 130, this seventh embodiment of the spring member 5130 includes a recess 5162 and an associated strengthening rib. However, unlike the second embodiment of the spring member 130, this seventh embodiment of the spring member 5130 has a width 5156 of the base spring section 5140a-5140d that is not approximately equal to the width 5158 of the spring arms 5142a-5142d. In addition, the spring 5130 includes spring openings 5131 that are formed in the spring arms 5152a-5152d and are configured to receive a retaining structure 5330, which may be best seen when comparing FIGS. 82 and 83.

Also, like the fifth embodiment of the male terminal 4054, this sixth embodiment of the male terminal 5054 includes a plurality of contact arms 5188a-5188d that: (i) are integrally formed with a intermediate segment 5192a-5192d of the male terminal side walls 5062a-5062d, (ii) extend away from the connection plate 5058 and towards the front male terminal wall 5060 at an outwardly directed angle, (iii) extend across an extent of the contact arm openings 5189a-5189h, and (iv) are configured to contact the planar outer surface 5143 of the spring fingers 5152a-5152d. Like the fifth embodiment of the male terminal 4054, the sixth embodiment does not have a third contact arm section, which is configured to be positioned substantially perpendicular to the spring fingers 5152a-5152d. Instead, in this sixth embodiment, the third contact arm section is omitted and the curvilinear contact arm section 5198a-5198h continues to form a substantially circular structure 5201a-5201d.

Also, like the fifth embodiment of the contact arm 4188a-4188h, the sixth embodiment of the contact arm 5188a-

5188*d* are designed to interact with the internal spring member 5130. Like the disclosure discussed in connection with FIGS. 33-36, the contact arms 5188*a*-5188*d* are depressed or deflected inward (i.e., towards the center 5212 of the male terminal 5054), when the male terminal assembly 5050 is inserted within the female terminal receiver 5232. Also, as discussed above in connection with FIG. 36, the spring member 5130 applies both a spring biasing force, $S_{BF}$, and a spring thermal force, $S_{TF}$, on the contact arms 5188*a*-5188*d* to create a 360° mechanical and electrical connection with the female terminal 5030.

One difference between the fifth embodiment of the connector system 4010 and the sixth embodiment of the connector system 5010 is the direction of the insertion of the spring 5130. Specifically, the fifth embodiment of the connector 4010 places the rear wall of the spring 4130 near the connection plate 4058 and away from the front wall of the male terminal body, while the sixth embodiment of the connector 5010 places the rear wall of the spring member 5130 near the front wall of the male terminal body and away from the connection plate 5058. Another difference between the first embodiment of the connector system 10 and the sixth embodiment of the connector system 5010 is the fact that the male terminal side walls 5062*a*-5062*d* associated with the sixth embodiment each have one contact arm sections 5188*a*-5188*d*, while the male terminal side walls 62*a*-62*d* that are associated with the first embodiment each have two contact arm sections 188*a*-188*h*. In other words, the sixth embodiment of the connector system 5010 has a total of 4 contact arms 5188*a*-5188*d*, while the first embodiment of the connector system 10 has a total of 8 contact arms 188*a*-188*h*. The subtraction of the four contact arms 5188*a*-5188*d* decreases the height and width of the male terminal assembly by between 45% and 55%. This decrease in size allows the first embodiment of the connector system 10 to carry between 60% and 70% more current than the sixth embodiment of the connector system 5010, while staying within the industry specifications, including DIN EN 60512-5-2. In particular, while meeting the industry specifications, the first embodiment of the connector system 10 is capable of carrying up to 280 amps and the sixth embodiment of the connector system 5010 is capable of carrying up to 100 amps.

FIGS. 87-96 show various views of a seventh embodiment of the connector system 6010. It should be understood that this seventh embodiment contains structures, features and/or functions that are similar to the structures, features and/or functions disclosed in connection with the first embodiment. Accordingly, reference numbers that are separated by 6000 will be used in connection with this seventh embodiment to denote the structures and/or features that are similar to the structures and/or features disclosed in connection with the first embodiment. For example, the contact arms of the first embodiment are labeled 188*a*-188*h*, while the contact arms of the seventh embodiment are labeled 6188*a*-6188*d*. Therefore, one of ordinary skill in the art shall assume that the contact arms of the first embodiment 188*a*-188*h* have similar structures and/or features in comparison to the contact arms of the seventh embodiment 6188*a*-6188*d*. Additionally, one of ordinary skill in the art shall understand that while the structures, features and/or functions are similar that does not mean the structures, features and/or functions are exactly the same. Further, it should be understood that structures and/or features of this seventh embodiment may be used in connection with any other embodiment contained within this application or its related applications.

Like the first embodiment of the connector system 10, the seventh embodiment of the connector system 6010 includes: (i) a male terminal assembly 6050 and (ii) a female terminal 6030. The male terminal assembly 6050 has a spring member 6130 and a male terminal 6054. Like the second embodiment of the spring member 130, this eighth embodiment of the spring member 6130 includes: (i) a recess and an associated strengthening rib and (ii) has a width 6156 of the base spring section 6140*a*-6140*d* that is approximately equal to the width 6158 of the spring arms 6142*a*-6142*d*. Also like the first embodiment of the male terminal 54, this seventh embodiment of the male terminal 6054 includes a plurality of contact arms 6188*a*-6188*d* that: (i) are integrally formed with an extent of the male terminal body 6056, (ii) extend away from the connection plate 6058 and towards the front male terminal wall 6060 at an outwardly directed angle, (iii) extend across an extent of the contact arm openings 6189*a*-6189*h*, and (iv) are configured to contact the planar outer surface 6143 of the spring fingers 6152*a*-6152*d*. Unlike the first embodiment of the male terminal 54, the seventh embodiment does not have a third contact arm section is configured to be positioned substantially perpendicular to the spring fingers 6152*a*-6152*d*. Instead, in this seventh embodiment, the third contact arm section is omitted and the curvilinear contact arm section 6198*a*-6198*h* continues to form a substantially circular structure 6201*a*-6201*d*.

Also, like the first embodiment of the contact arm 188*a*-188*h*, the seventh embodiment of the contact arm 6188*a*-6188*d* are designed to interact with the internal spring member 6130. Like the disclosure discussed in connection with FIGS. 33-36, the contact arms 6188*a*-6188*d* are depressed or deflected inward (i.e., towards the center 6212 of the male terminal 6054), when the male terminal assembly 6050 is inserted within the female terminal receiver 6232. Also, as discussed above in connection with FIG. 36, the spring member 6130 applies both a spring biasing force, $S_{BF}$, and a spring thermal force, $S_{TF}$, on the contact arms 6188*a*-6188*d* to create a 360 degree mechanical and electrical connection with the female terminal 6030.

One difference between the first embodiment of the connector system 10 and the seventh embodiment of the connector system 6010 is the fact that the male terminal body 6054 of the seventh embodiment is round and not rectangular. With this alteration in shape, certain components of the male terminal 54 are omitted (e.g., third male terminal curvilinear sections 205*a*-205*d*) and the shape of other components are altered (e.g., U-shaped first male terminal side wall portions are not substantially planer). Another difference between the first embodiment of the connector system 10 and the seventh embodiment of the connector system 6010 is the fact that the seventh embodiment of the male terminal 6054 includes a spring holder 6350 that is configured to receive the spring member 6130 retain the spring member 6130 within the male terminal 6352. The spring holder 6350 has a plurality of opening 6352 formed therein to receive the spring arms 6188*a*-6188*d*. In addition, the spring holder 6350 has a spring holder retention member 6354. The retention member 6354 has a first or normal state and a second or deformed state. Specifically, when the spring holder 6350 is being inserted into the male terminal 6052, the retention member 6354 is moved from the normal state to the deformed state. Once the spring holder 6350 is fully inserted into the male terminal 6052, the retention member 6354 will return from the deformed state to a normal state and will secure the spring member 6130 within the male terminal 6052.

Another difference between the first embodiment of the connector system 10 and the seventh embodiment of the connector system 6010 is the fact that the seventh embodiment of the connector system 6010 has a total of 4 contact arms 6188a-6188d, while the first embodiment of the connector system 10 has a total of 8 contact arms 188a-188h. While the dimensional of the seventh embodiment will be discussed in greater detail below, the subtraction of the four contact arms 6188a-6188d decreases the height and width of the male terminal assembly by between 50% and 60%. This decrease in size allows the first embodiment of the connector system 10 to carry between 80% and 90% more current than the seventh embodiment of the connector system 6010, while staying within the industry specifications, including DIN EN 60512-5-2. In particular, while meeting the industry specifications, the first embodiment of the connector system 10 is capable of carrying up to 280 amps and the seventh embodiment of the connector system 6010 is capable of carrying up to 40 amps.

Figure 88:
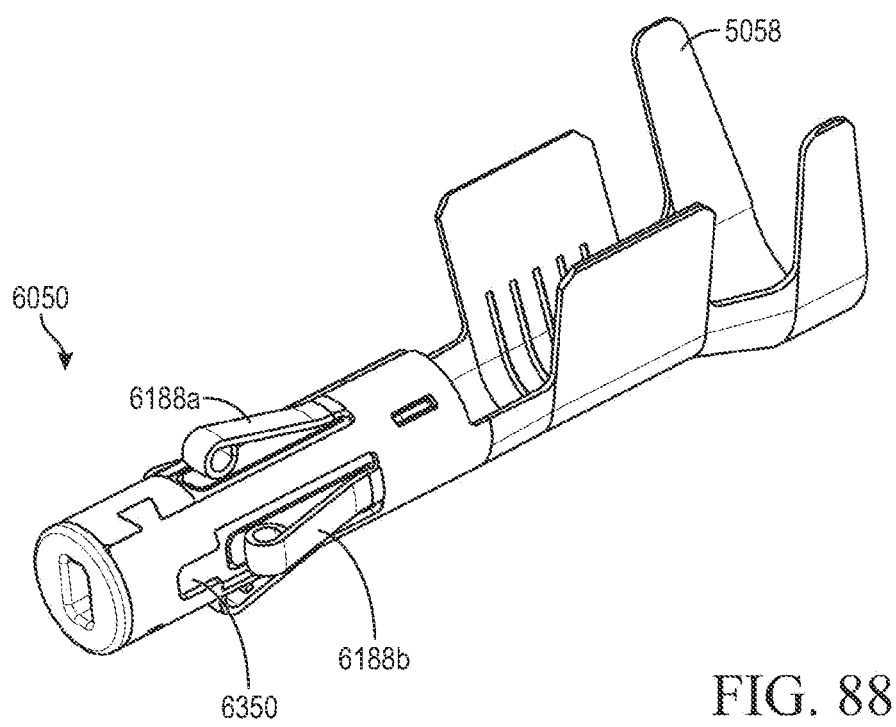
FIG. 88 is a frontal isometric view of the seventh embodiment of the male terminal assembly shown in FIG. 87.
Figure 89:
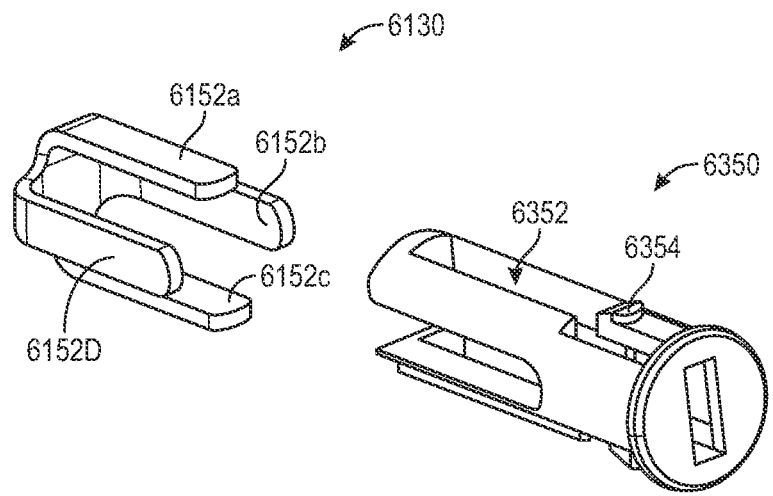
FIG. 89 is an exploded frontal isometric view of an extent of male terminal assembly shown in FIG. 88, wherein an eighth embodiment of the spring member and a retaining member are separated from the seventh embodiment of the male terminal.
Figure 90:
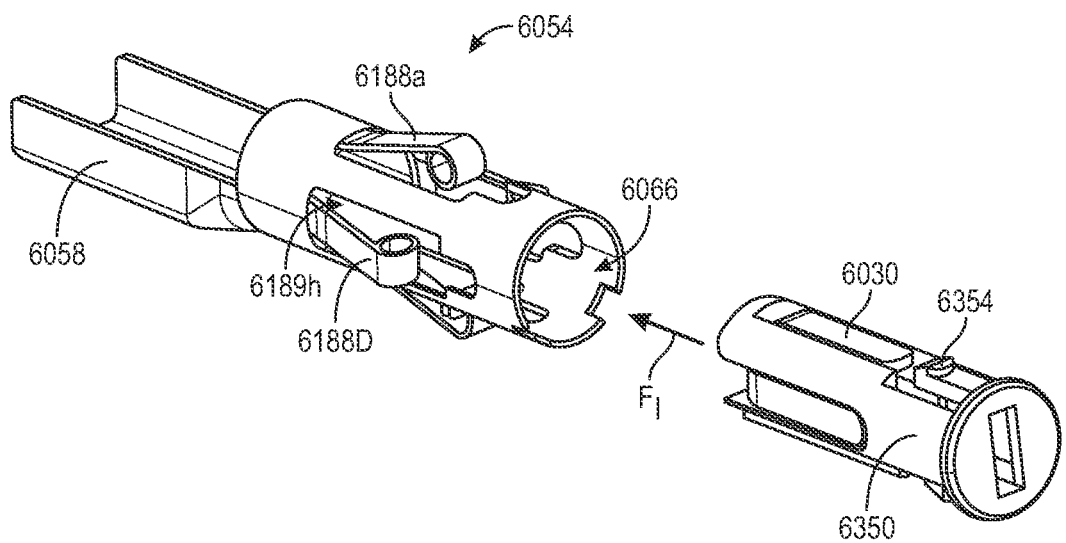
FIG. 90 is a frontal isometric view of the male terminal assembly shown in FIG. 88, wherein the spring is within the retaining member and the retaining member is separated from the male terminal.
Figure 97:
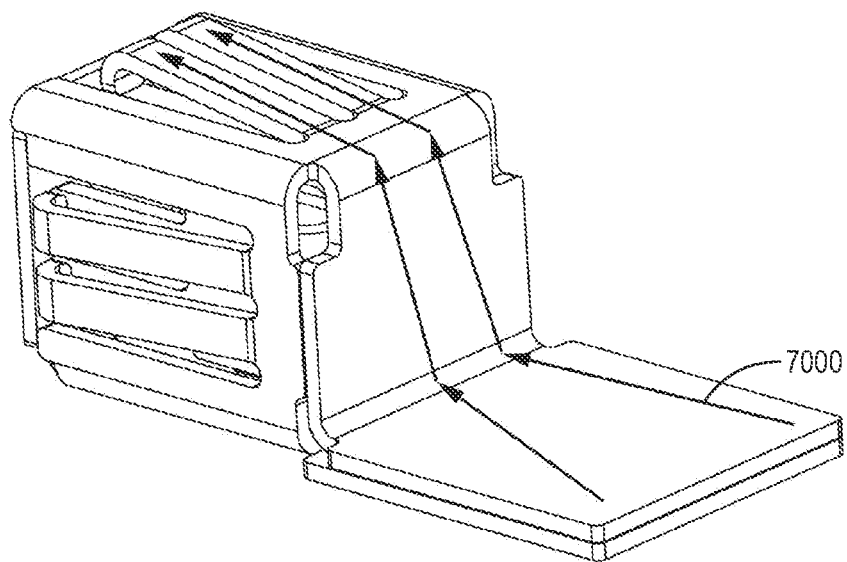
FIGS. 97 and 98 compare the current flow through an embodiment of a male terminal assembly disclosed here in and a male terminal disclosed within PCT/US2018/019787.

FIGS. 97-88 show various measurements that are associated with the seventh embodiment of the connector system 6010. It should be understood that these measurements are exemplary and shall not be limiting. Thus, a connector system 6010 may have measurements that are multiple times larger than the below measurements or multiple times smaller than the below measurements. In these views, the spring member 6052 is deflected inward by between 1% and 12% when the male terminal assembly 6050 is inserted into the female terminal 6030. The first measurement, which is labeled 5B, is the diameter around an outer surface 6250 of the male terminal side wall and is preferably between 5.5 mm and 3.68 mm. The second measurement, which is labeled 5E, extends from an inner edge 6256 of a contact arm 6188g to an opposed second edge 6260 of the contact arm 6188g; thus, the fifth measurement quantifies the width 6193 of the contact arm 6188g along with the width 6168, 6170 of the spring finger 6152g. The fifth measurement is preferably between 1.4 mm and 1 mm. The third measurement, which is labeled SI, extends from the outer surface 6268 of the rear male terminal wall 6064 to the outer edge 6270 of the male terminal connection plate 6058 and is preferably between 32.4 mm and 21.6 mm. The fourth measurement, which is labeled 5Y, extends from the outer surface of the spring holder 6350 to the outer surface 6268 of the rear male terminal wall 6064 and is preferably between 18 mm and 12 mm. The fifth measurement, which is labeled 6Z, is the diameter around an inner surface 6230 of the female terminal 6030 and is preferably between 7.2 mm and 4.8 mm. The sixth measurement, which is labeled 6AA, is the diameter around an outer surface 60 of the female terminal 6030 and is preferably between 7.2 mm and 4.8 mm.

Figure 98:
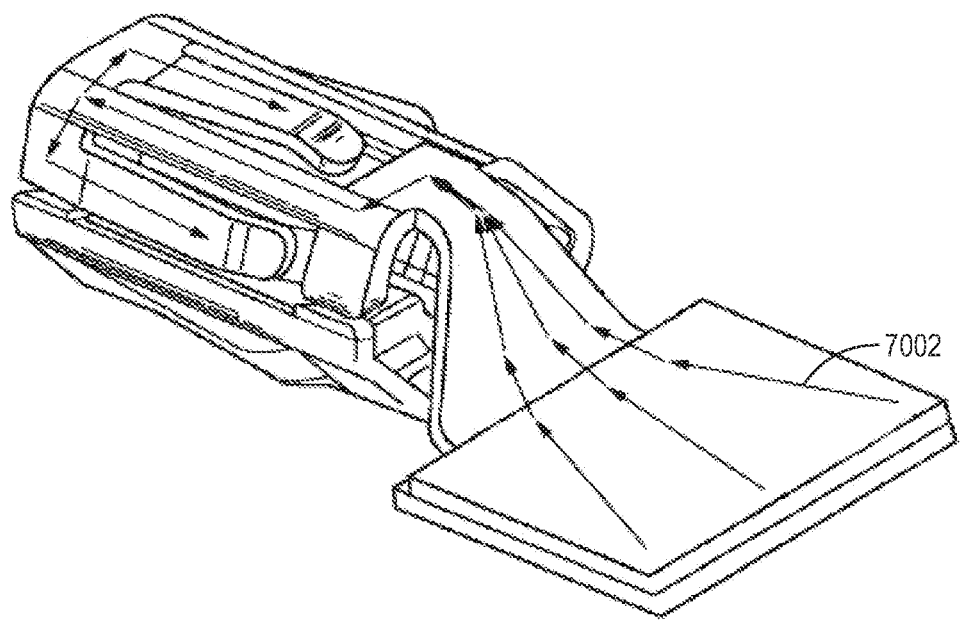

As discussed throughout this application, the male terminal 50 that is described herein has numerous advantages over the terminals shown and described in PCT/US2018/019787. For example, the male terminal 50 has a configuration that places the terminal ends 206, 1206, 2206, 3206, 4206, 5206, 6206 of the contact arms 188, 1188, 2188, 3188, 4188, 5188, 6188 away from the rear male terminal wall 64, 1064, 2064, 3064, 4064, 5064, 606 and the connection member 58, 1058, 2058, 3058, 4058, 5058, 6058. This configuration enables the male terminal assembly 50, 1050, 2050, 3050, 4050, 5050, 6050 to: (i) have a reduced length, which reduces the overall length of the connector system 10, 1010, 2010, 3010, 4010, 5010, 6010 and reduces the amount of materials, (ii) reduces the insertion distance, (iii) provides ergonomic advantages related to the insertion of the spring member in to the receiver 66, 1066, 2066, 3066, 4066, 5066, 6066, and (iv) reduces the complexity of the current flow and possible failure points that are associated with a complex current flow. In particular, a basic current flow 7000 path that is associated with a male terminal assembly 50 described herein is shown in FIG. 97, while a basic current flow path 7002 that is associated with a male terminal described within PCT/US2018/019787 is shown in FIG. 98. Comparing FIGS. 97 and 98, one of ordinary skill in the art would understand that the terminal assembly 50 shown in FIG. 97 has a simpler current flow 7000 then the current flow 7002 associated with the terminal assembly shown in FIG. 98. The simpler current flow 7000, 7002 will reduce failures of the terminal assembly 54. Additionally, this simpler current flow 7000, 7002 allows the terminal assembly 50 shown in FIG. 97 to carry approximately 30% more current than the terminal assembly shown in FIG. 98 while meeting industry specifications, including DIN EN 60512-5-2. In short, the terminal assembly 50 can be formed from less material, can be installed in narrower spaces, has a higher current carrying capacity, is easier to assemble, and has other beneficial features that are disclosed herein or can be inferred by one of ordinary skill in the art from this disclosure.

MATERIALS AND DISCLOSURE THAT ARE INCORPORATED BY REFERENCE

PCT Application entitled "Electrical Connector System With Internal Spring Component", which: (i) has attorney docket number 293506, (ii) was filed on Jun. 7, 2019, (iii) claims priority to U.S. Provisional Application 62/681,973, and (iv) is commonly owned with this application, PCT Application entitled Electrical Connector System With Internal Spring Component and Applications Thereof, which: (a) has attorney docket number 295896, (b) was filed on Jun. 7, 2019, (c) claims priority to U.S. Provisional Application 62/681,973, and (d) is commonly owned with this application, and PCT Patent Application No. PCT/US2018/019787, filed on Feb. 26, 2018, each of which are fully incorporated herein by reference and made a part hereof.

SAE Specifications, including J1742_201003 entitled, "Connections for High Voltage On-Board Vehicle Electrical Wiring Harnesses—Test Methods and General Performance Requirements," last revised in March 2010 and which is fully incorporated herein by reference and made a part hereof.

DIN Specification, including Connectors for electronic equipment—Tests and measurements—Part 5-2: Current-carrying capacity tests; Test 5b: Current-temperature derating (IEC 60512-5-2:2002), which is fully incorporated herein by reference and made a part hereof.

USCAR Specifications, including: (i) SAE/USCAR-2, Revision 6, which was least revised in February 2013 and has ISBN: 978-0-7680-7998-2, (ii) SAE/USCAR-12, Revision 5, which was last revised in August 2017 and has ISBN: 978-0-7680-8446-7, (iii) SAE/USCAR-21, Revision 3, which was last revised in December 2014, (iv) SAE/USCAR-25, Revision 3, which was revised on March 2016 and has ISBN: 978-0-7680-8319-4, (v) SAE/USCAR-37, which was revised on August 2008 and has ISBN: 978-0-7680-2098-4, (vi) SAE/USCAR-38, Revision 1, which was revised on May 2016 and has ISBN: 978-0-7680-8350-7, each of which are fully incorporated herein by reference and made a part hereof.

INDUSTRIAL APPLICABILITY AND DEFINITIONS

The above disclosure may represent an improvement in the art because it improves the mechanical and electrical connection between a male connector assembly and a female connector assembly. Such a connector assembly may be used in high-power, high-current and/or high-voltage conditions that may be found in the automotive industry or other applications (e.g., military equipment, space flight, electric vehicles, industrial machinery, etc.). It should be understood that these terms, as used herein, shall generally mean the following. "High power" shall mean an application experiencing: (i) a voltage of between 20 volts to 600 volts, regardless of the current or (ii) a current greater than or equal to 80 amps, regardless of the voltage. "High current" shall mean current greater than or equal to 80 amps, typically greater than 80 amps in the automotive industry, regardless of the voltage. "High voltage" shall mean between 20 volts to 600 volts, typically greater than 47 volts in the automotive industry, regardless of the current. "Substantially" shall mean essentially all of or without significant deviation from a stated value or amount.

While some implementations have been illustrated and described, numerous modifications come to mind without significantly departing from the spirit of the disclosure; and the scope of protection is only limited by the scope of the accompanying claims. For example, the overall shape of the connector system 10 may be changed to: a triangular prism, a pentagonal prism, a hexagonal prism, octagonal prism, sphere, a cone, a tetrahedron, a cuboid, a dodecahedron, a icosahedron, a octahedron, a ellipsoid, or any other similar shape. While the overall shape of the connector system 10 may be altered, the shape of the male terminal assembly 50 and the female terminal 30 may not be altered to match the shape of the overall connector system 10. For example, the shape of the connector system 10 may be a hexagonal prism, while the male terminal assembly 50 and the female terminal 30 may be substantially cubic. In other embodiments, the shape of the male terminal assembly 50 may be changed to: a triangular prism, a pentagonal prism, a hexagonal prism, octagonal prism, sphere, a cone, a tetrahedron, a dodecahedron, a icosahedron, a octahedron, a ellipsoid, or any other similar shape. If the shape of the male terminal assembly 50 is altered to be any one of the above shapes, then it should be understood that the female terminal 30 may be altered to facilitate insertion, electrical connection, and extraction of the male terminal assembly 50 from the female terminal 30. Additionally, as described above, while the shape of the male terminal assembly 50 and the female terminal 30 may be altered, the overall shape of the connector system 10 may not be altered to match the shape of the male terminal assembly 50.

In other embodiments, one or both of the rear spring wall 70, 134, 1134, 2134, 3134, 4134, 5134, 6134 or the front male terminal wall 60, 1060, 2060, 3160, 4160, 5160, 6160 may be omitted. The spring member 52, 130, 1130, 2130, 3130, 4130, 5130, and 6130 may have a different configuration, such as: (i) the width 106, 158, 1158, 2158, 3158, 4158, 5158, 6158 of the spring arms 84, 142, 1142, 2142, 3142, 4142, 5142, 6142 may be greater than the width 104, 156, 1156, 2156, 3156, 4156, 5156, 6156 of the base spring sections 82, 142, 1142, 2142, 3142, 4142, 5142, 6142, (ii) the width 168, 170, 1170, 2170, 3170, 4170, 5170, 6170 of the spring fingers 94, 152, 1152, 2152, 3152, 4152, 5152, 6152 may not match the width 193, 1193, 2183, 3193, 4193, 5193, 6193 of the contact arms 188, 1188, 2199, 3188, 4188, 5188, 6188 (e.g., spring fingers may be wider or narrower than the contact arms), (iii) may be made out of a different material (e.g., memory metal) or (iv) or any combination of these features.

In other embodiments, the male terminal body 56, 1056, 2156, 3156, 4156, 5156, 6156 may have a different configuration, such as: (i) the contact openings 189, 1189, 2189, 3189, 4189, 5189, 6189 may not be linear (e.g. curvilinear), may be different lengths, may have different widths, may extend past where the contact arms 188, 1188, 2199, 3188, 4188, 5188, 6188 intersect the intermediate segment 192, 1192, 3192, 4192, 5192, 6192, or may not span nearly (e.g., 95%) of the length of each contact arm 188, 1188, 2199, 3188, 4188, 5188, 6188, (ii) the contact arms 188, 1188, 2199, 3188, 4188, 5188, 6188 may not extent from the intermediate segment 192, 1192, 3192, 4192, 5192, 6192 at an outward angle, (iii) not gap 213, 1213, 2213, 3213, 4213, 5213, 6213 may not be formed between the spring member 94, 152, 1152, 2152, 3152, 4152, 5152, 6152 and the contact arms 188, 1188, 2199, 3188, 4188, 5188, 6188, (iv) may be comprised of different materials (e.g., c151 is plated with (a) silver, (b) tin, (c) ss301, (d) other similar materials, or (e) a combination of a plurality of these materials).

Headings and subheadings, if any, are used for convenience only and are not limiting. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

The invention claimed is:

1. An electrical connector assembly comprising:
    a male terminal body having a rear wall and an arrangement of side walls defining a receiver, wherein at least one side wall within the arrangement of side walls includes:

a first opening formed through the side wall;
an intermediate segment positioned between the first opening and the rear wall of the male terminal body;
a first end segment extending (i) from the intermediate segment, and (ii) along the first opening; and
a first deformable contact arm extending: (i) at an outward angle from the intermediate segment, (ii) along an extent of the first opening, and (iii) towards a front extent of the male terminal body.

2. The electrical connector assembly of claim 1, wherein the at least one side wall further includes: (a) a second opening formed through said side wall, and (b) a second deformable contact arm extending from the intermediate segment and along an extent of the second opening.

3. The electrical connector assembly of claim 1, wherein the at least one side wall further includes:
a second opening formed through the side wall and extending along the first deformable contact arm; and
an second end segment extending (i) from the intermediate segment, and (ii) along the second opening.

4. The electrical connector assembly of claim 1, wherein the male terminal body further includes a front wall with a frontal opening formed therein; and
wherein when the male terminal body is inserted into a female terminal assembly, the frontal opening of the male terminal body receives a portion of the female terminal assembly.

5. The electrical connector assembly of claim 1, wherein the male terminal body further includes a front wall, wherein a void is formed between a frontal portion of the first deformable contact arm and an inner surface of the front wall, and wherein the gap allows for deformation of the first deformable contact arm.

6. The electrical connector assembly of claim 1, further comprising an internal spring member: (i) dimensioned to reside within the receiver of the male terminal body, and (ii) including a first spring arm, a second spring arm, and a slot formed between the first and second spring arms; and
wherein the first deformable contact arm does not directly overlie the slot formed between said first and second spring arms when the internal spring member is positioned within the receiver of the male terminal body.

7. The electrical connector assembly of claim 1, further comprising an internal spring member dimensioned to reside within the receiver of the male terminal body; and
wherein the internal spring member includes a first side wall having a first base section and a first spring arm extending from the first base section, wherein an outer surface of the first base section is substantially coplanar with an outer surface of the first spring arm.

8. The electrical connector assembly of claim 1, further comprising an internal spring member dimensioned to reside within the receiver of the male terminal body, and wherein said internal spring member includes: (a) a rear wall, (b) a first spring arm, and (c) a curvilinear transition portion positioned between the rear wall and the first spring arm, wherein the curvilinear transition portion includes a recess formed in an outer surface of the curvilinear transition portion.

9. The electrical connector assembly of claim 1, further comprising an internal spring member dimensioned to reside within the receiver of the male terminal body, and wherein said internal spring member includes: (a) a rear wall, (b) a first spring arm, and (c) a curvilinear transition portion positioned between the rear wall and the first spring arm, wherein the curvilinear transition portion includes a strengthening rib formed along an inner surface of the curvilinear transition portion.

10. The electrical connector assembly of claim 1, further comprising an internal spring member dimensioned to reside within the receiver of the male terminal body,
wherein said internal spring member includes a rear wall that is configured to be positioned adjacent to the rear wall of the male terminal body when the internal spring member fully resides within the receiver of the male terminal body.

11. The electrical connector assembly of claim 1, further comprising an internal spring member dimensioned to reside within the receiver of the male terminal body; and
wherein a gap is formed between an extent of an outer surface of the internal spring member and a major extent of the first deformable contact arm of the male terminal body.

12. The electrical connector assembly of claim 1, further comprising a female terminal body with a female terminal receiver dimensioned to receive an extent of the male terminal body and the internal spring member to define a connected position.

13. The electrical connector assembly of claim 12, wherein inserting the male terminal body into the female terminal receiver causes an extent of the internal spring member to deform inward thereby creating a spring biasing force which keeps the first deformable contact arm engaged with an inner surface of the female terminal receiver during use of the electrical connector assembly.

14. The electrical connector assembly of claim 12, wherein the spring biasing force has an outward direction and said force increases when the electrical connector assembly is subjected to elevated temperatures.

15. The electrical connector assembly of claim 12, wherein inserting the male terminal body into the female terminal receiver causes an extent of both the first deformable contact arm and an extent of the internal spring member to deform inward thereby causing the first deformable contact arm to be wedged between the internal spring member and an inner surface of the female terminal receiver during the use of the electrical connector assembly.

16. The electrical connector assembly of claim 12, wherein inserting the male terminal body of the male terminal body into the female terminal receiver requires an insertion force that is less than an insertion force requirement in class 3 of USCAR 25 specification.

17. The electrical connector assembly of claim 12, wherein the male terminal body has a height and a width that are both less than 19 mm; and
wherein during operation of the electrical connector assembly, a current load of at least 280 amps can be transferred between the male terminal body and the female terminal body while meeting applicable DIN specifications for automobiles.

18. The electrical connector assembly of claim 12, the electrical connector assembly is 360 degree compliant due to the configuration and positional relationship of the male terminal body and the female terminal body.

19. An electrical connector assembly comprising:
a male terminal body having a rear wall, a front wall with an inner surface, and an arrangement of side walls defining a receiver, wherein at least one side wall includes:

a first opening formed in the side wall;

an intermediate segment positioned between the first opening and the rear wall of the male terminal body; and, a first contact arm extending forwardly: (i) from the intermediate segment, and (ii) across the first opening, wherein a void is formed between a frontal portion of the first contact arm and the inner surface of the front wall.

20. The electrical connector assembly of claim 19, wherein the male terminal body further includes:

a first fixed end segment extending (a) from the intermediate segment, and (b) along the first opening;

a second opening formed through the side wall;

a second fixed end segment extending (a) from the intermediate segment, and (b) along the second opening; and wherein the first contact arm is positioned between the first and second openings.

21. The electrical connector assembly of claim 20, wherein a combination of the intermediate segment and the first and second fixed end segments form a planer U-shaped structure.

22. The electrical connector assembly of claim 19, wherein the at least one side wall further includes: (a) a second opening formed through said side wall, and (b) a second contact arm extending from the intermediate segment and along an extent of the second opening.

23. The electrical connector assembly of claim 19, wherein the male terminal body further includes a fixed end segment that extends from the intermediate segment and along the first opening; and wherein when electrical current is applied to the male terminal body, electrical current is not required to flow through the fixed end segment to reach the first contact arm.

24. The electrical connector assembly of claim 19, further comprising an internal spring member dimensioned to reside within the receiver of the male terminal body, and wherein said internal spring member includes a rear wall that is configured to be positioned adjacent to the rear wall of the male terminal body when the internal spring member fully resides within the receiver of the male terminal body.

25. The electrical connector assembly of claim 19, further comprising an internal spring member dimensioned to reside within the receiver of the male terminal body; and wherein a gap is formed between an extent of an outer surface of the internal spring member and a major extent of the first contact arm of the male terminal body.

26. The electrical connector assembly of claim 19, further comprising a female terminal body with a female terminal receiver dimensioned to receive an extent of the male terminal body and the internal spring member in the connected position.

27. The electrical connector assembly of claim 26, wherein inserting the male terminal body into the female terminal receiver causes an extent of the internal spring member to deform inward thereby creating a spring biasing force which keeps the first contact arm engaged with an inner surface of the female terminal receiver during the use of the electrical connector assembly.

28. The electrical connector assembly of claim 26, wherein inserting the male terminal body of the male terminal body into the female terminal receiver requires a force that is less than an insertion force requirement in the class 2 of USCAR 25 specification.

29. The electrical connector assembly of claim 26, wherein the male terminal body has a height and a width that are both less than 10 mm; and wherein during operation of the electrical connector assembly, a current load of at least 100 amps can be transferred between the male terminal body and the female terminal body while meeting applicable DIN specifications for automobiles.

30. The electrical connector assembly of claim 26, wherein each of the side walls has a length and a width, wherein the male terminal body includes an outer perimeter defined by the combination of the widths of the side walls; and wherein said outer perimeter has: (a) a first uncompressed dimension when the male terminal body is not inserted within the female terminal body, and (b) a second compressed dimension when the male terminal body is inserted within the female terminal body, and wherein the second compressed dimension is less than the first uncompressed dimension.

31. The electrical connector assembly of claim 30, wherein the first uncompressed dimension is between 1% and 15% larger than the second compressed dimension.

* * * * *